US011196740B2

(12) United States Patent
Pacella et al.

(10) Patent No.: US 11,196,740 B2
(45) Date of Patent: Dec. 7, 2021

(54) METHOD AND SYSTEM FOR SECURE INFORMATION VALIDATION

(71) Applicant: Oath Inc., New York, NY (US)

(72) Inventors: Dante J. Pacella, Charles Town, WV (US); Mani Tadayon, Leesburg, VA (US); Lachlan Maxwell, Ashburn, VA (US); Jean M. McManus, Bernardsville, NJ (US); Ashish A. Sardesai, Ashburn, VA (US); Venkata Josyula, Ashburn, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 100 days.

(21) Appl. No.: 16/229,625

(22) Filed: Dec. 21, 2018

(65) Prior Publication Data

US 2020/0204545 A1   Jun. 25, 2020

(51) Int. Cl.
| | |
|---|---|
| *H04L 29/06* | (2006.01) |
| *H04L 9/32* | (2006.01) |
| *G06F 21/62* | (2013.01) |
| *G06F 21/60* | (2013.01) |
| *G06K 9/00* | (2006.01) |

(52) U.S. Cl.
CPC ........ *H04L 63/0861* (2013.01); *G06F 21/604* (2013.01); *G06F 21/6218* (2013.01); *G06K 9/00087* (2013.01); *G06K 9/00268* (2013.01); *G06K 9/00288* (2013.01); *G06K 9/00617* (2013.01); *G06K 9/00906* (2013.01); *H04L 9/3271* (2013.01); *G06F 2221/2141* (2013.01); *G06K 2009/00932* (2013.01)

(58) Field of Classification Search
CPC .............. H04L 63/0861; H04L 9/3231; G06K 2009/00932; G06F 21/32
See application file for complete search history.

(56) References Cited

U.S. PATENT DOCUMENTS

| | | |
|---|---|---|
| 5,629,980 A | 5/1997 | Stefik et al. |
| 7,869,627 B2 | 1/2011 | Northcott et al. |
| | (Continued) | |

OTHER PUBLICATIONS

Office Action dated Apr. 7, 2020 in U.S. Appl. No. 16/229,768.
(Continued)

*Primary Examiner* — Ellen Tran
(74) *Attorney, Agent, or Firm* — Venable LLP

(57) ABSTRACT

The present teaching relates to method, system, medium, and implementation for biometric authentication in secure data management. Authentication is initiated for a person claiming to be a record owner prior to a transaction between the record owner and a service provider. Biometric based authentication of the person is performed by detecting liveness of the person and authenticating an identity of the person based on biometric information of the person. Upon successful authentication of the person, a trusted party processes a request directed to a trusted entity to validate one or more data items related to the record owner in order to proceed with the transaction and forward a cloaked identifier obtained based on the request, where the cloaked identifier is to be used by the service provider to seek a validation response with regard to the one or more data items from the trusted party.

21 Claims, 66 Drawing Sheets

(56) References Cited

U.S. PATENT DOCUMENTS

| | | |
|---|---|---|
| 8,347,398 B1 | 1/2013 | Weber |
| 8,457,367 B1 | 6/2013 | Sipe et al. |
| 8,594,374 B1 | 11/2013 | Bozarth |
| 9,418,567 B1 | 8/2016 | Chen et al. |
| 2003/0046097 A1 | 3/2003 | LaSalle et al. |
| 2006/0245623 A1 | 11/2006 | Loiacono et al. |
| 2006/0274919 A1 | 12/2006 | Loiacono et al. |
| 2007/0217660 A1* | 9/2007 | Komura ............. G06Q 20/40 382/115 |
| 2012/0018511 A1 | 1/2012 | Hammad |
| 2012/0054847 A1* | 3/2012 | Schultz ............. G06F 21/33 726/9 |
| 2012/0179908 A1 | 7/2012 | Duma |
| 2012/0284783 A1 | 11/2012 | Jakobsson |
| 2013/0089240 A1 | 4/2013 | Northcott et al. |
| 2013/0111222 A1 | 5/2013 | Joyce, III |
| 2014/0068733 A1 | 3/2014 | Belisario et al. |
| 2014/0101453 A1 | 4/2014 | Senthurpandi |
| 2014/0181956 A1 | 6/2014 | Ahn et al. |
| 2014/0193045 A1 | 7/2014 | Otis et al. |
| 2014/0197922 A1 | 7/2014 | Stanwood et al. |
| 2014/0230033 A1 | 8/2014 | Duncan |
| 2014/0280936 A1 | 9/2014 | Nandagopal et al. |
| 2014/0372308 A1 | 12/2014 | Sheets |
| 2015/0084864 A1 | 3/2015 | Geiss et al. |
| 2015/0127547 A1 | 5/2015 | Powell et al. |
| 2015/0180836 A1 | 6/2015 | Wong et al. |
| 2015/0227735 A1 | 8/2015 | Chappell |
| 2016/0005050 A1 | 1/2016 | Teman |
| 2016/0063235 A1* | 3/2016 | Tussy ............. G06Q 20/40145 726/6 |
| 2016/0065541 A1 | 3/2016 | Winner et al. |
| 2016/0112401 A1 | 4/2016 | Jakobsson |
| 2016/0127359 A1* | 5/2016 | Minter ............. H04L 63/0861 726/6 |
| 2016/0182491 A1 | 6/2016 | Jia et al. |
| 2016/0241402 A1* | 8/2016 | Gordon ............. H04L 9/3231 |
| 2016/0300108 A1 | 10/2016 | Willis et al. |
| 2016/0335531 A1 | 11/2016 | Mullen et al. |
| 2016/0337569 A1 | 11/2016 | Prabhakar |
| 2016/0381560 A1 | 12/2016 | Margalot |
| 2017/0061210 A1 | 3/2017 | Ollila |
| 2017/0061251 A1 | 3/2017 | Fan et al. |
| 2017/0085592 A1 | 3/2017 | Chan et al. |
| 2017/0124312 A1 | 5/2017 | Inoue |
| 2017/0143241 A1 | 5/2017 | McBain |
| 2017/0161577 A1* | 6/2017 | Lee ............. G06K 9/0004 |
| 2017/0318019 A1 | 11/2017 | Gordon et al. |
| 2017/0344840 A1 | 11/2017 | Brown |
| 2018/0012007 A1 | 1/2018 | Kim et al. |
| 2018/0012014 A1 | 1/2018 | Sahin et al. |
| 2018/0039990 A1 | 2/2018 | Lindemann |
| 2018/0089403 A1 | 3/2018 | Watson et al. |
| 2018/0121724 A1 | 5/2018 | Ovsiannikov et al. |
| 2018/0197005 A1 | 7/2018 | Hunt et al. |
| 2018/0211020 A1 | 7/2018 | Fukuda |
| 2018/0234415 A1 | 8/2018 | Fukuda |
| 2018/0270065 A1 | 9/2018 | Brown et al. |
| 2018/0276674 A1 | 9/2018 | Ramatchandirane et al. |
| 2018/0332036 A1* | 11/2018 | Mokhasi ............. G06Q 20/32 |
| 2018/0337919 A1 | 11/2018 | Perna et al. |
| 2019/0034606 A1 | 1/2019 | Mapen et al. |
| 2020/0026831 A1 | 1/2020 | Alameh et al. |

OTHER PUBLICATIONS

Office Action dated Apr. 7, 2020 in U.S. Appl. No. 16/229,703.
Office Action dated Apr. 8, 2020 in U.S. Appl. No. 16/230,032.
Office Action dated May 15, 2020 in U.S. Appl. No. 16/229,871.
Office Action dated Jan. 30, 2020 in U.S. Appl. No. 16/229,871.
Office Action dated Dec. 23, 2019 in U.S. Appl. No. 16/230,032.
Office Action dated Nov. 12, 2019 in U.S. Appl. No. 16/229,768.
Office Action dated Nov. 12, 2019 in U.S. Appl. No. 16/229,703.
Office Action dated Jul. 27, 2020 in U.S. Appl. No. 16/229,768.
Notice of Allowance dated Jul. 29, 2020 in U.S. Appl. No. 16/229,703.
Office Action dated Aug. 4, 2020 in U.S. Appl. No. 16/230,032.
Office Action dated Aug. 27, 2020 in U.S. Appl. No. 16/229,871.
Office Action dated Oct. 9, 2020 in U.S. Appl. No. 16/229,933.
Office Action dated Nov. 5, 2020 in U.S. Appl. No. 16/229,768.
Office Action dated Nov. 13, 2020 in U.S. Appl. No. 16/230,032.
Office Action dated Dec. 8, 2020 in U.S. Appl. No. 16/229,871.
Office Action dated Jan. 6, 2021 in U.S. Appl. No. 16/229,476.
Office Action dated Jan. 21, 2021 in U.S. Appl. No. 16/229,933.
Office Action dated Feb. 16, 2021 in U.S. Appl. No. 16/229,768.
Notice of Allowance dated Feb. 26, 2021 in U.S. Appl. No. 16/230,032.
Office Action dated Mar. 2, 2021 in U.S. Appl. No. 16/229,034.
Office Action dated Mar. 16, 2021 in U.S. Appl. No. 16/229,871.
Office Action dated Mar. 30, 2021 in U.S. Appl. No. 16/229,316.
Office Action dated Apr. 26, 2021 in U.S. Appl. No. 16/229,933.
Office Action dated May 18, 2021 in U.S. Appl. No. 16/229,476.
Office Action dated May 21, 2021 in U.S. Appl. No. 16/229,768.
Office Action dated Jun. 24, 2021 in U.S. Appl. No. 16/229,567.
Office Action dated Jun. 25, 2021 in U.S. Appl. No. 16/229,034.
Office Action dated Sep. 2, 2021 in U.S. Appl. No. 16/229,158.
Office Action dated Sep. 7, 2021 in U.S. Appl. No. 16/229,933.
Office Action dated Oct. 4, 2021 in U.S. Appl. No. 16/229,316.
Notice of Allowance dated Oct. 18, 2021 in U.S. Appl. No. 16/229,768.

* cited by examiner

Validation Information Meta Information

P1-Info: Source ID/Access restriction/.../I-types/Auth-Info/TE ID/TE Auth....
P2-Info: Source ID/Access restriction/.../I-types/Auth-Info/TE ID/TE Auth....
   .
   .
Pk-Info: Source ID/Access restriction/.../I-types/Auth-Info/TE ID/TE Auth....

Fig. 3F

| Source ID | Access Restrictions | | | | | Inquiry Types | | | | Auth-Info | | |
|---|---|---|---|---|---|---|---|---|---|---|---|---|
| | Time | Count | ... | Party | Geo-Fence | ... | Boolean | Quest. | ... | Data | Biometric-1 | Biometric-2 | Security Questions |

Fig. 3G

Flowchart of a trusted entity when it is interacting with a transaction engine in phase 1

Flowchart of a trusted entity when it is interacting with a service provider in phase 2

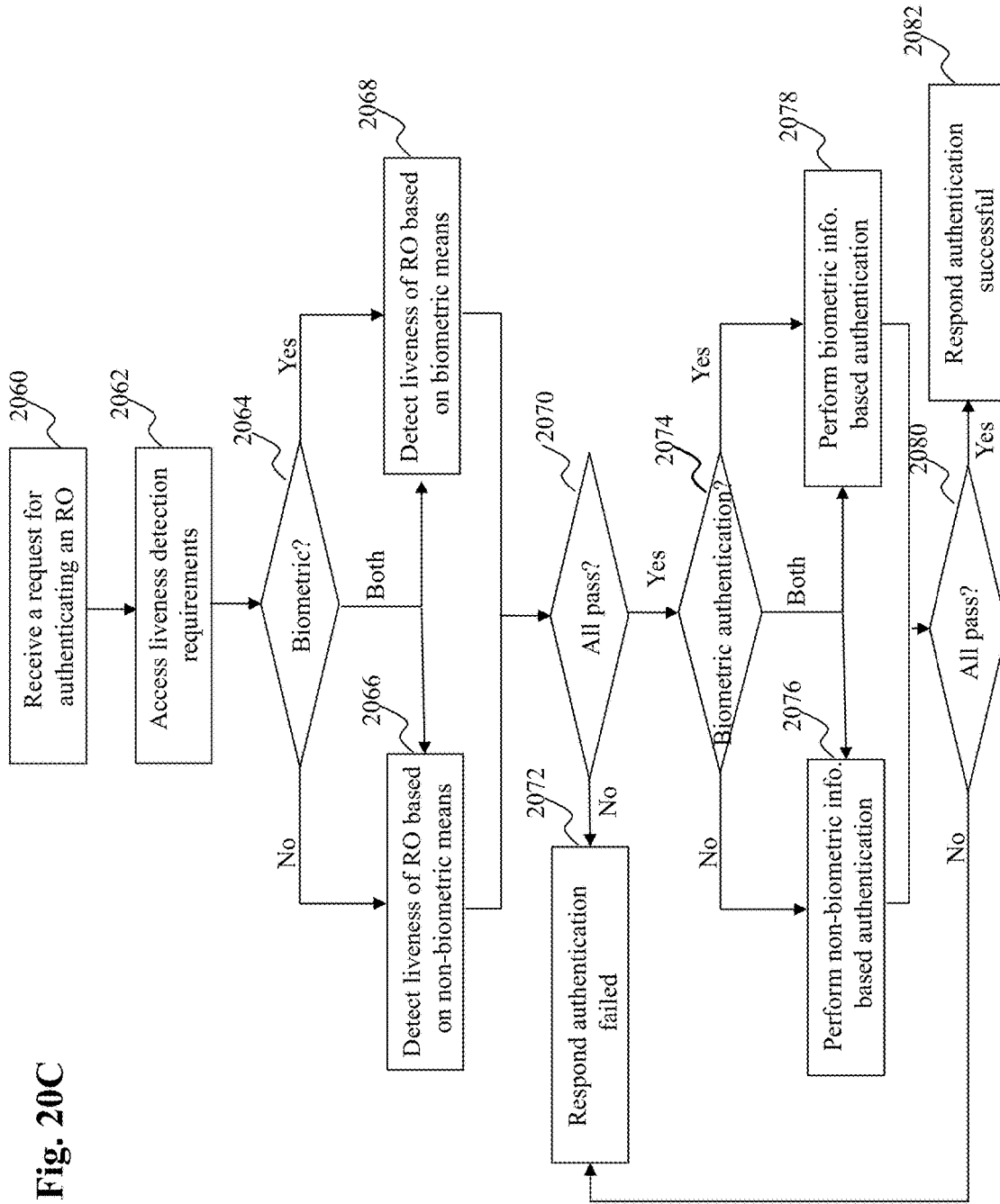

Exemplary types of high risk authentication info identified via Reverse image search

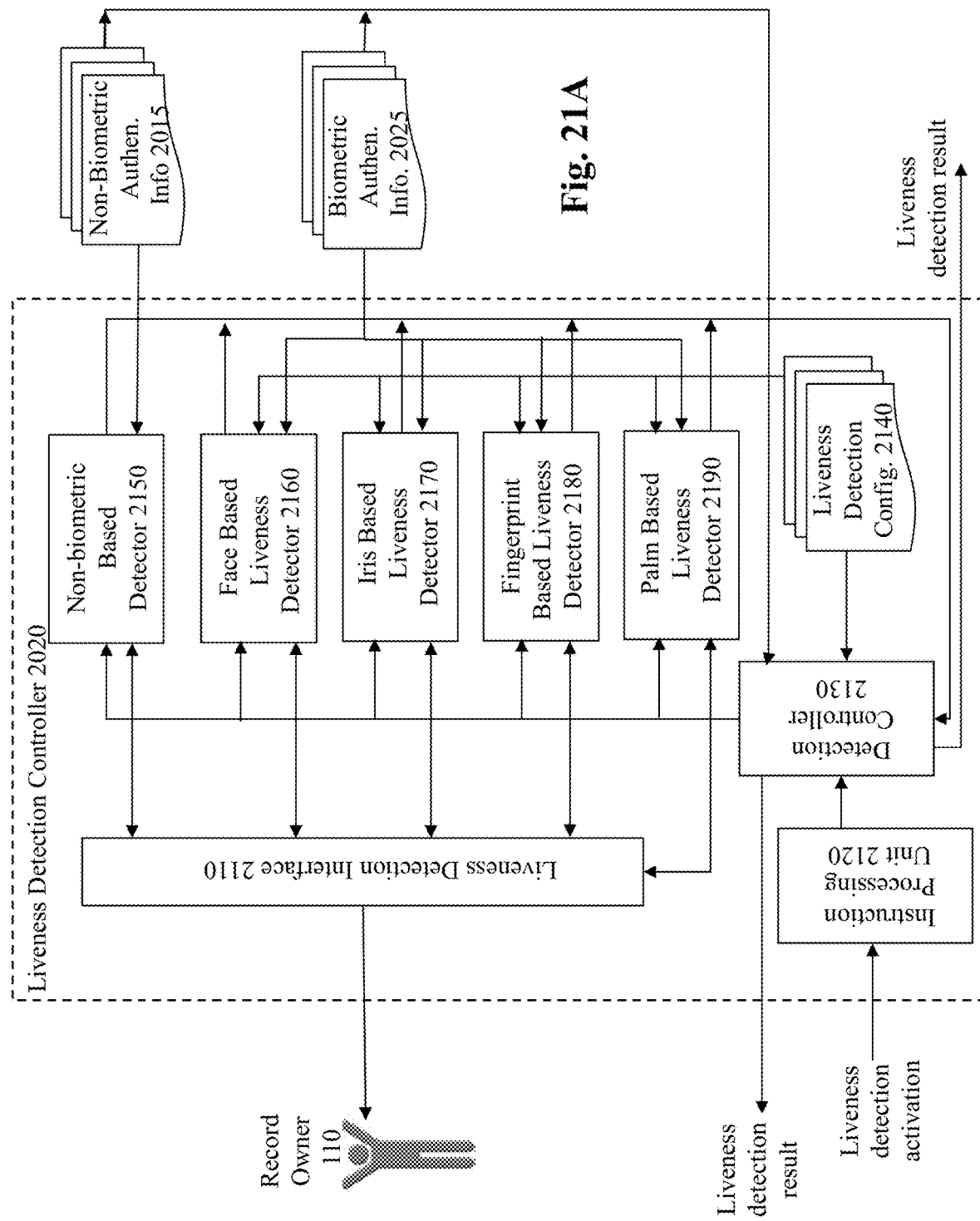

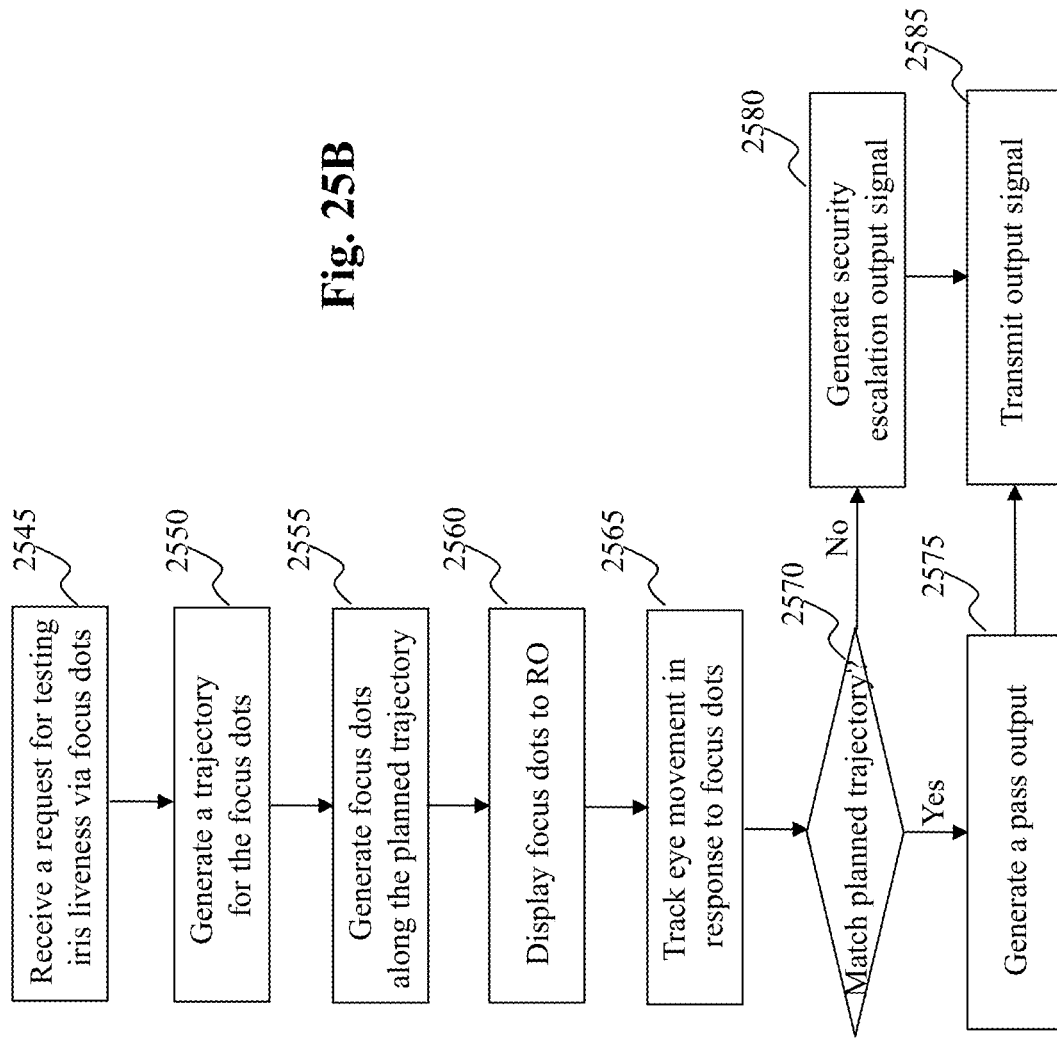

METHOD AND SYSTEM FOR SECURE INFORMATION VALIDATION

CROSS-REFERENCE TO RELATED APPLICATIONS

The present application is related to U.S. patent application Ser. No. 16/229,034, filed Dec. 21, 2018, U.S. patent application Ser. No. 16/229,158, filed Dec. 21, 2018, U.S. patent application Ser. No. 16/229,316, filed Dec. 21, 2018, U.S. patent application Ser. No. 16/229,476, filed Dec. 21, 2018, U.S. patent application Ser. No. 16/229,567, filed Dec. 21, 2018, U.S. patent application Ser. No. 16/229,703, filed Dec. 21, 2018, U.S. patent application Ser. No. 16/229,768, filed Dec. 21, 2018, U.S. patent application Ser. No. 16/229,871, filed Dec. 21, 2018, U.S. patent application Ser. No. 16/229,933, filed Dec. 21, 2018 and U.S. patent application Ser. No. 16/230,032, filed Dec. 21, 2018, which are hereby incorporated by reference in their entireties.

BACKGROUND

1. Technical Field

The present teaching generally relates to data management. More specifically, the present teaching relates to secure data management.

2. Technical Background

In the age of the Internet, more and more transactions are completed on the Internet. Such transactions may be commercial or non-commercial. Some transactions require one party to the transactions to validate certain information associated with the party. For example, in order for a person to buy beer, the person has to show that he or she is over 21 years old. A confidential transaction may require one or both parties to prove a certain level of security clearance. In another example, a transaction may require a party to the transaction to have some independent source to validate the stated income level. Yet another example is that some transaction may be personal in nature so that it requires a verification that the person who is engaged in the transaction is the person intended. In many transactions, the data that need to be validated involve personal or private data. In some instances, confidential or highly confidential information may be involved.

For traditional transactions that are conducted over the Internet, validation of certain information regarding a party to the transactions may be done via paper work or appearance in person. For example, to close a real estate transaction, the parties (seller and buyer) may physically go to an office designated for closing and present their personal identification information to validate, e.g., they are old enough to conduct the transaction or any other personal information such as approval for their income, etc. to the office. For an Internet transaction, much of the information that needs to be validated in order to proceed to the transaction likely needs to be transmitted over the network which increases the risk of such data being hijacked during the Internet transmission.

As society becomes more and more Internet based, security and privacy concerns have arisen significantly with respect to private information transmitted over the Internet. This is despite the fact that technologies have been continuously developed and deployed to secure the Internet traffic because means/tools seem to always emerge that are developed and deployed to circumvent the security measures to hijack confidential and private information while it is moving through the Internet. Thus, there is a need to devise a solution to address this problem.

SUMMARY

The teachings disclosed herein relate to methods, systems, and programming for information management. More particularly, the present teaching relates to methods, systems, and programming related to self-sovereign information management and utilization thereof.

In one example, a method, implemented on a machine having at least one processor, storage, and a communication platform capable of connecting to a network for biometric authentication in secure data management. Authentication is initiated for a person claiming to be a record owner prior to a transaction between the record owner and a service provider. Biometric based authentication of the person is performed by detecting liveness of the person and authenticating an identity of the person based on biometric information of the person. Upon successful authentication of the person, a trusted party processes a request directed to a trusted entity to validate one or more data items related to the record owner in order to proceed with the transaction and forward a cloaked identifier obtained based on the request, where the cloaked identifier is to be used by the service provider to seek a validation response with regard to the one or more data items from the trusted party.

In a different example, a system for biometric authentication in secure data management is disclosed, which includes an authentication request processor, an authentication controller, and a trusted party. The authentication request processor is configured for initiating authentication of a person claiming to be a record owner prior to a transaction between the record owner and a service provider. The authentication controller is configured for conducting biometric based authentication of the person by detecting liveness of the person and authenticating an identity of the person based on biometric information of the person. The trusted party is configured for processing, upon successful authentication of the person, a request directed to a trusted entity to validate one or more data items related to the record owner in order to proceed with the transaction and forwarding a cloaked identifier obtained based on the request for validating the one or more data items, where the cloaked identifier is to be used by the service provider to seek a validation response with regard to the one or more data items from the trusted party.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for biometric authentication in secure data manage, wherein the medium, when read by the machine, causes the machine to perform a series of steps. Authentication is initiated for a person claiming to be a record owner prior to a transaction between the record owner and a service provider. Biometric based authentication of the person is performed by detecting liveness of the person and authenticating an identity of the person based on biometric information of the person. Upon successful authentication of the person, a trusted party processes a request directed to a trusted entity to validate one or more data items related to the record owner in order to proceed with the transaction and forward a cloaked identifier obtained based on the request, where the cloaked identifier is to be used by the service provider to seek a validation response with regard to the one or more data items from the trusted party.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 3E-3G disclose exemplary secure data partitions and exemplary types of meta information, according to embodiments of the present teaching;

FIGS. 20B-20C are flowcharts of exemplary processes of an authentication unit in a self-sovereign information management framework, according to an embodiment of the present teaching;

FIG. 21A depicts an exemplary high level system diagram of a liveness detection controller, according to an embodiment of the present teaching;

FIG. 25B is a flowchart of an exemplary process of a focus dot based liveness detector, according to an embodiment of the present teaching;

DETAILED DESCRIPTION

Figure 1:
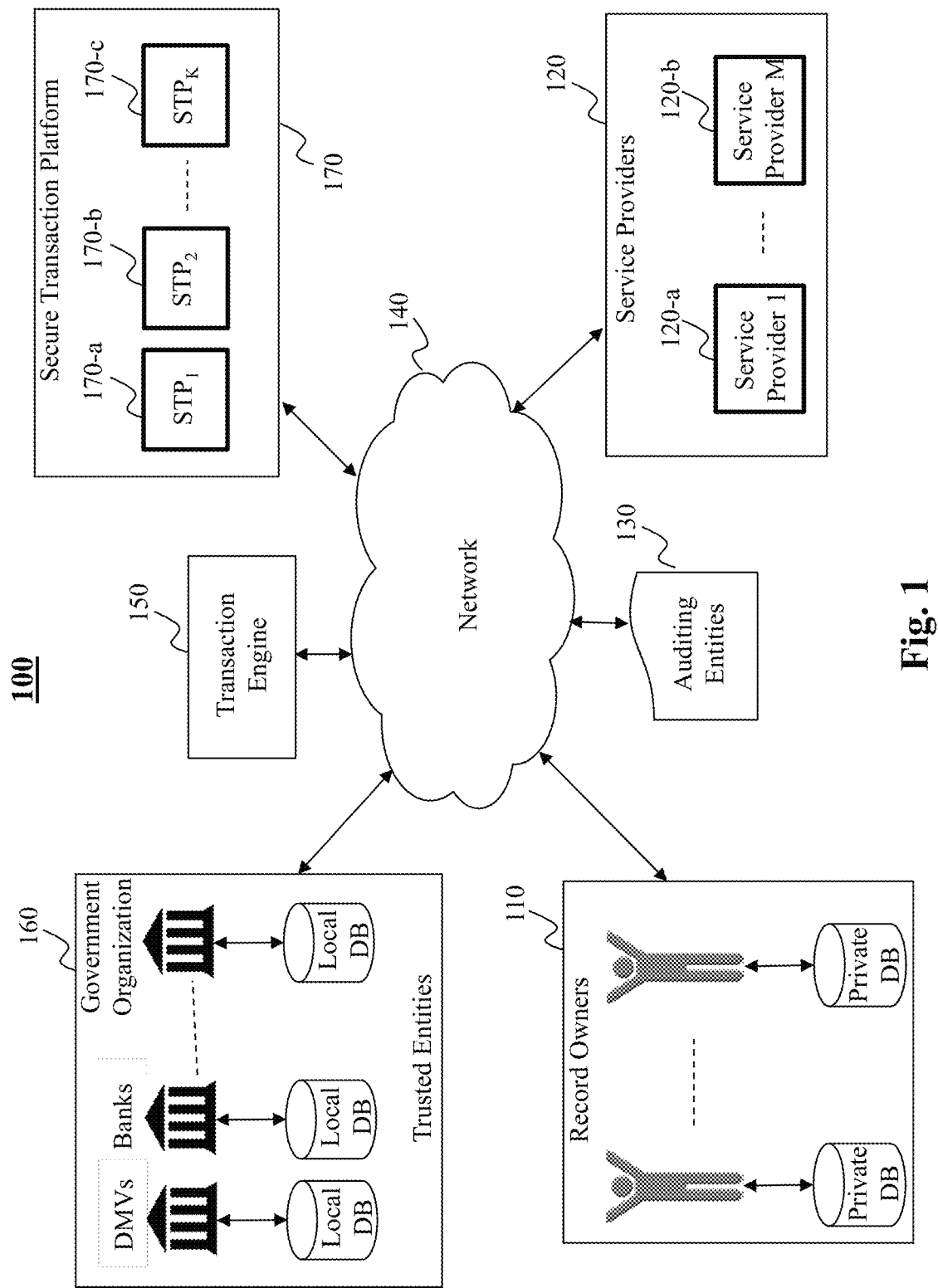
FIG. 1 depicts a framework for secure self-sovereign information management, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details or with different details related to design choices or implementation variations. In other instances, well known methods, procedures, components, and/or hardware/software/firmware have been described at a relatively high-level, without detail, in order to avoid unnecessarily obscuring aspects of the present teachings.

The present teaching generally relates to systems, methods, medium, and other implementations directed to different aspects of a framework for self-sovereign information management. In different illustrated embodiments of the present teaching, the related concepts are presented in the general networked operational environment in which the present teaching is deployed. However, it is understood that the present teaching can be applied to any networked setting including both a generic and special or proprietary network setting. In addition, although the present teaching may be presented in relation to service transactions, the concepts related to the present teaching can be applied to any other types of nonservice related transactions without limitation.

The present teaching discloses an ecosystem that includes various aspects of the data management to enable a comprehensive approach for self-sovereign identity and data management at a granularity level as needed by each specific underlying situation. The disclosed data management network includes a framework involving various parties relevant to a transaction as well as the scheme of validating secure/private information to facilitate the transaction with minimized risks of the secure/private being compromised. This solution provides individuals with more control over their data/records and issuers and recipients more trust over integrity of the data/records. It enables individuals to present digital records without revealing their true identity and, sometimes, the underlying data/records.

The solution disclosed herein empowers record owners with real ownership of their data/records and the ability of granular access control over their data/records. Via this framework, in each situation, a record owner needs to reveal only as much information they prefer to share on a transactional basis with the record consumer such as a service provider. Different aspects of the present teaching as disclosed herein include securing personally identifiable information and other sensitive data, facilitating data access at need-based granularity levels, exercising data access control via ephemeral operations, and pseudonymizing data using a cloaked identifier. The cloaked identifier is for cloaking the identity of a record owner. This feature allows a record consumer (such as a service provider) to trust a record without knowledge of the real identity of the record owner and, hence, achieving zero knowledge proof (ZKP). In some disclosure as described herein, the ZKP feature may be used for exercising verification attributes without access to the attributes in the relevant records.

To ensure secure data access, authentication schemes are also disclosed. Multi-factor authentication may be deployed to ensure that the person who requests to access secure data is whom the person claims to be. Multi-factor authentication may involve both biometric and non-biometric personal identification information. For biometric identification information, a series of templatized and coded biometric unique indictors may be used. Some countermeasures against biometric replay attacks are disclosed herein to detect fraudulent means in authentication. To further improve the strength of biometric information to be used for authentication, biometric ubiquity may be detected and exploited as an indicator for brute force or replay attacks.

The biggest vulnerability to biometrics is the replay attack, i.e., a nefarious party capturing biometric information through surreptitious surveillance, CCTV, background persons in selfies, self-streaming, through public records or social media or intercepting communications during verification. Such captured biometric information may then be reissued when the nefarious party attempts to access secure data points, duping a verification system into believing that the user has submitted the biometric information input "live." To prevent such prevalent problems, various solutions are disclosed herein to detect liveness in a "person" who sends "biometric" information to a verification system.

To validate secure/private information required for a transaction, the present teaching discloses a scheme by which minimum amount or no secure or private information is to be transmitted over the network, effectively minimizing or eliminating the opportunity for malicious hijacking of the secure/private data involved. The present teaching also discloses the mechanism of enforcing data access restrictions, which may be specified by either owners of such data or parties hosting such data, within the framework of self-sovereign data management as disclosed herein. The self-sovereign data management framework as disclosed herein is also capable of supporting data auditing at different granularity levels and facilitating secure data auditing without the risks of hijacking secure/private data.

FIG. 1 depicts a framework 100 for secure self-sovereign information management, according to an embodiment of the present teaching. In this exemplary framework 100, multiple parties are connected via a network 140 to facilitate transactions over the network 140. Such parties include record owners 110, service providers 120, a transaction engine 150, trusted entities 160, a secure transaction platform 170, and auditing entities 130. Via this framework 100, a record owner 110 can conduct a transaction with a service provider 120 across the network 140 so long as required secure or private information (e.g., driver license or date of birth) is validated by a trusted entity 160 (e.g., Division of Motor Vehicle) at a request of either the record owner 110 or the transaction engine 150 on behalf of the record owner 110.

Data validation, as a prerequisite of the underlying transaction between the record owner 110 and the service provider 120, may be carried out in compliance with certain data access restrictions. Examples of such restrictions may be imposed with respect to the transaction, e.g., the validation has to be completed within a specified time frame or the frequency of validating a particular piece of data may not exceed a certain limit. The data access restrictions with respect to each piece of data to be validated may be specified by the data owner or a trusted entity that has possession of the data. In some embodiments, restrictions as to data to be validated may also be provided by a service provider, e.g., requiring that the validation is to complete within 0.5 hours. For data access restrictions specific for each transaction, the trusted entity involved may generate a secure transaction package (STP) with such restriction information stored therein and save it on the secure transaction platform 170 for enforcement.

The transaction engine 150 is provided as a frontend interface for the trusted parties 160 to provide, e.g., validation related services to record owners 110. With the transaction engine 150, the correspondences between different secure/private data and the trusted entities that host or store such secure/private data may be established at the transaction engine 150 so that a record owner 110 does not have to bear the burden of remembering which piece of information can be validated by which trusted entity. Storing secure/private data with the transaction engine 150 also provides a shield to prevent the risks of any piece of secure/data being compromised.

FIG. 1 depicts a networked environment in which communications among different parties is through the network 140, which may correspond to a single network or a combination of different networks. For example, network 140 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In some embodiment, network 140 may include various network access points (not shown), which may provide both wired or wireless access for different parties involved in the framework 100.

Figure 2A:
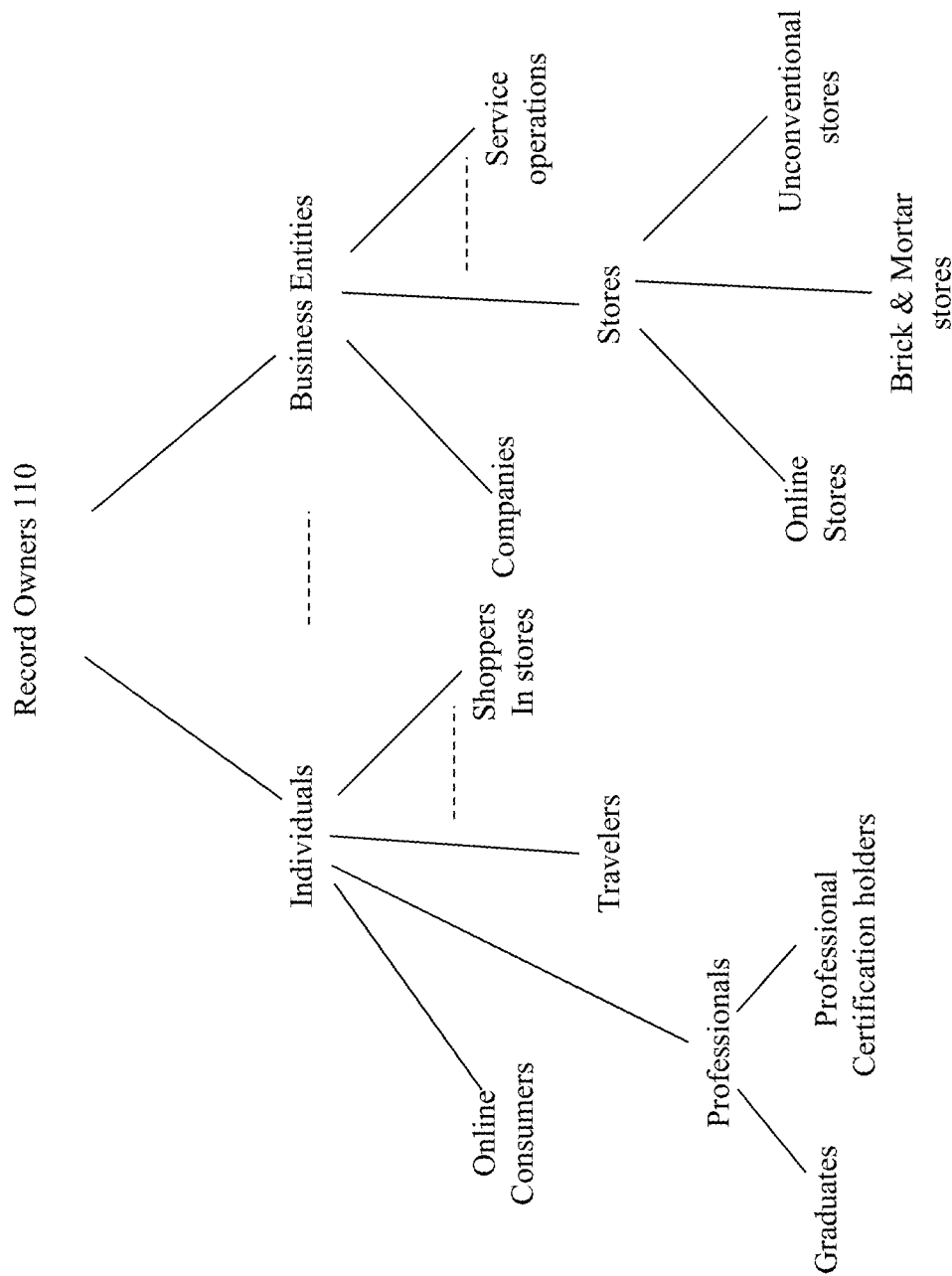
FIGS. 2A-2D illustrate exemplary types of parties that may operate in the secure self-sovereign information management framework, according to different embodiments of the present teaching.

FIGS. 2A-2D illustrate exemplary types of parties that may operate in the framework of secure self-sovereign information management, according to different embodiments of the present teaching. FIG. 2A illustrates exemplary types of record owner 110, according to an embodiment of the present teaching. A record owner may be an individual, a business entity, or anyone else that can act to conduct a transaction over the network. An individual record owner may include an online consumer, a customer or a shopper at a traditional store, a traveler, . . . , or a professional such as a graduate student or a professional certification holder, who can conduct a transaction. Business entities include companies, stores (whether online stores, Brick & Mortar stores, or any other types of unconventional stores) that consume services and are capable of conducting transactions with a service provider. These illustrated types serve merely as examples and it is understood that a record owner can be anyone who has (secure/private) data associated therewith and is able to conduct a transaction with another party. Details related to exemplary operation/implementation of a record owner via a record owner computing device are provided with respect to FIGS. 3A-3B, 8A-8B.

Figure 2B:
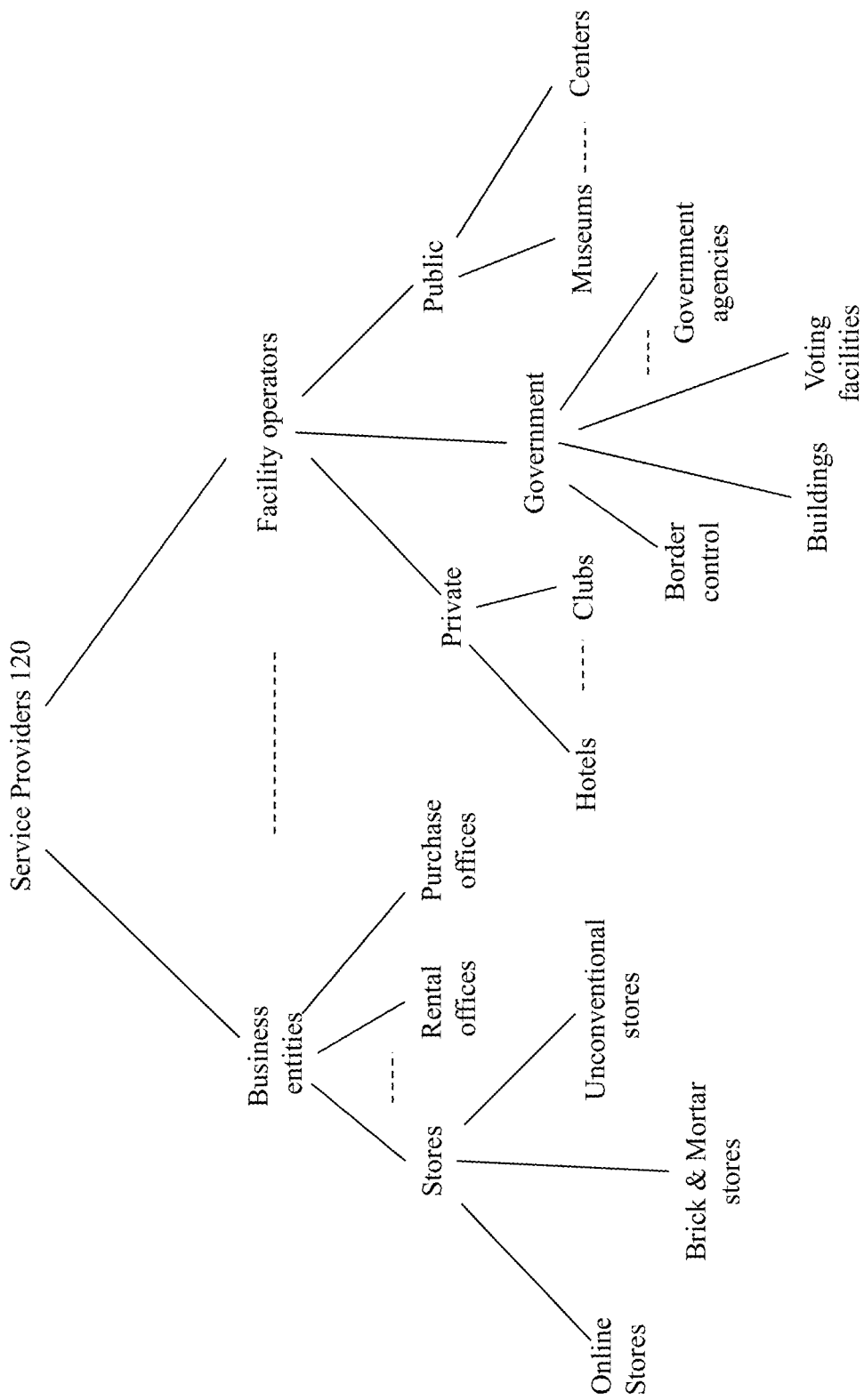

FIG. 2B illustrates exemplary types of service providers 120, according to embodiments of the present teaching. As illustrated, a service provider may correspond to business entities that offer products/services or facility operators that control access to facilities. Business entities may include stores, rental offices (car rental, apartment rental, etc.), . . . , or purchase offices (e.g., real estate agencies), . . . , or any facilities. As discussed herein, stores may be online stores, Brick & Mortar stores, . . . , or any type of stores that are unconventional, whether in the form or in the operation, so long as the store is capable of conducting a transaction with a record owner.

Facility operators refer to a party who job responsibility is to control access to a facility, which can be private, public, or a government facility. Examples of a private facility include a hotel, a club, a bar (not shown), or any place operated by a private person (an individual or a business entity) to provide services. Examples of a public facility include museums, . . . , and various centers such as Kennedy Center, Carnegie Hall, Zoos, etc. Government facilities may include various facilities for different governmental operations. Examples include border control facilities, governmental buildings, governmental agencies such as immigration agency, internal revenue services (IRS), National Institute of Health (NIH), National Science Foundation (NSF), etc. In some situations, some facilities, although generally not considered as governmental facilities, may also be considered as such when designated for some governmental functions. An example is voting facilities set up at normally open access places with access control. Similarly, these illustrated types serve merely as examples without limitation. It is understood that a service provider can be anyone who is designated to provider certain service and is able to conduct a transaction with another party by requesting validation of certain secure/private information. Details about exemplary operations and implementations of a service provider are provided with respect to FIGS. 4A, 9A-9B.

Figure 2C:
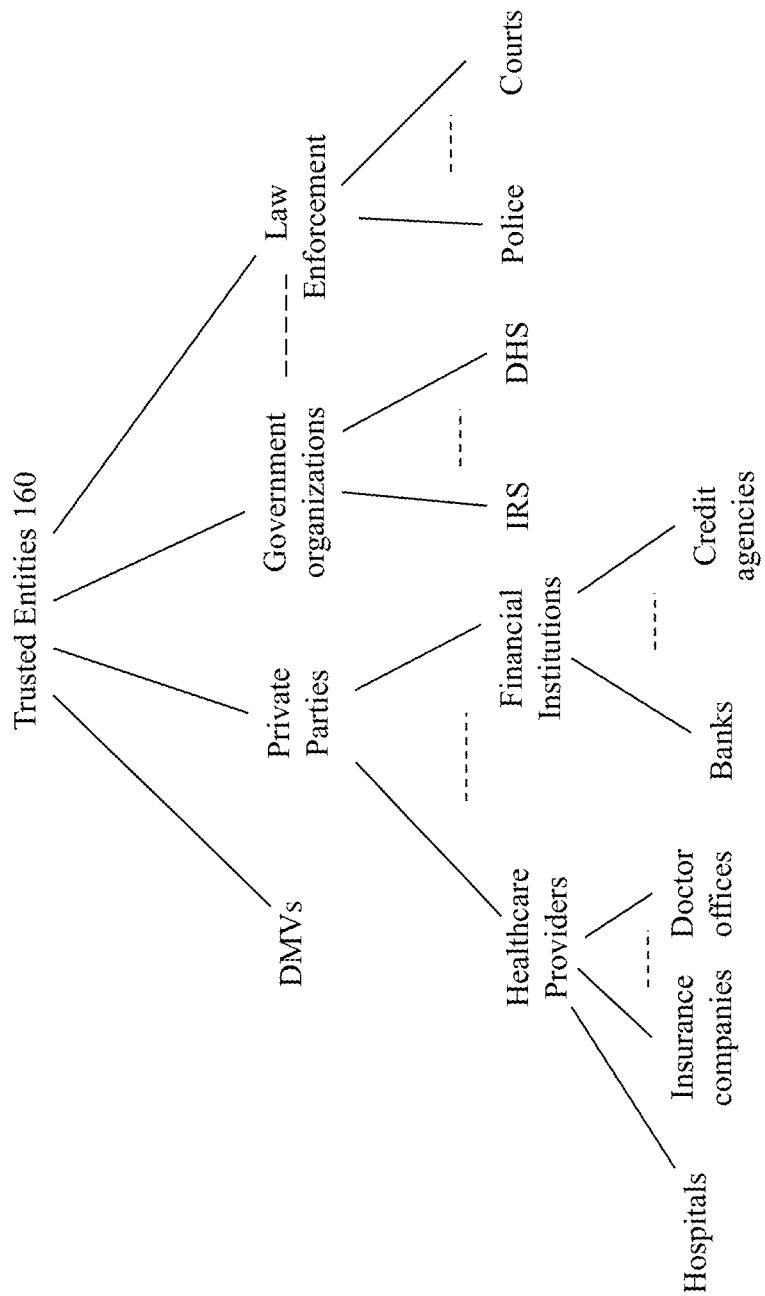

FIG. 2C illustrates exemplary types of trusted entities 160, according to embodiments of the present teaching. A trusted entity is a party that is designated to store some secure data associated with a record owner and is in a position to validate the stored secure data, either as to its status or as to its value. For example, either a hospital or DMV has data about a person's birth date and is in a position to be able to validate the person's age so that they are both trusted entities. As illustrated in FIG. 2C, a trusted entity may be DMVs, private parties, government organizations, . . . , or law enforcement entities. Examples of private trusted entities include healthcare providers (such as hospitals, insurance companies, . . . , doctor offices, etc.), . . . , and financial institutions (such as banks, . . . , credit agencies, etc.). Examples of government organizations as trusted entities may include IRS, . . . , department of homeland services (DHS), etc. Examples of law enforcement may include police departments of different states, . . . , and the courts (either state or federal) throughout the country.

Each of these exemplary trusted entities is in possession of certain data related to some record owners and is in a position to validate such data. For example, a DMV of a certain state has data related to the status of each license related to a licensed driver in the state; an insurance company providing services to a record owner possesses the data related to the past claim history of the insured and is in a position to validate the same; a doctor's office is in possession of some health information related to its patient and is in a position to validate such health information; a police department is in possession of criminal arrest information of some record owners and can validate as such; a bank may hold financial information about its customers and can validate, e.g., delinquent status of its customers; IRS has records of all naturalized citizens and is in a position to validate any details of the naturalization related information, etc. Thus, any party that is in possession of some secure/private data of a person (either an individual or a business entity) may be considered as a trusted entity. Details about exemplary operations and implementations of a trusted entity are provided with respect to FIGS. 5, 10-11F.

Referring back to FIG. 1, the framework 100 also includes auditing entities 150. An auditing entity is a party that is tasked to audit another. In the context of the framework 100 as depicted in FIG. 1, an auditing entity may audit a service provider 120, a trusted entity 160, the transaction engine 150, or even a record owner 110. Depending on the role of an audited party in transaction being audited, the manner by which the auditing is conducted may differ. For example, an auditing entity may audit a grocery store (a service provider) to ensure that all sales related to alcohol complied with the drinking age regulations. In this case, the auditing entity may audit based on records related to alcohol sales with a particular focus on the information in the records that all such sales passed the validation of buyers' ages or birth dates. In another example, an auditing entity may want to find out the statistics of under-age purchases or attempted purchases of alcohol products prohibited by the drinking age regulations. In this case, the audit entity may audit DMVs to see how many birth date validation requests related to alcohol purchases had been invalidated. Some audit entities may be record owners who try to find out how often its private data have been requested and by whom.

Figure 2D:
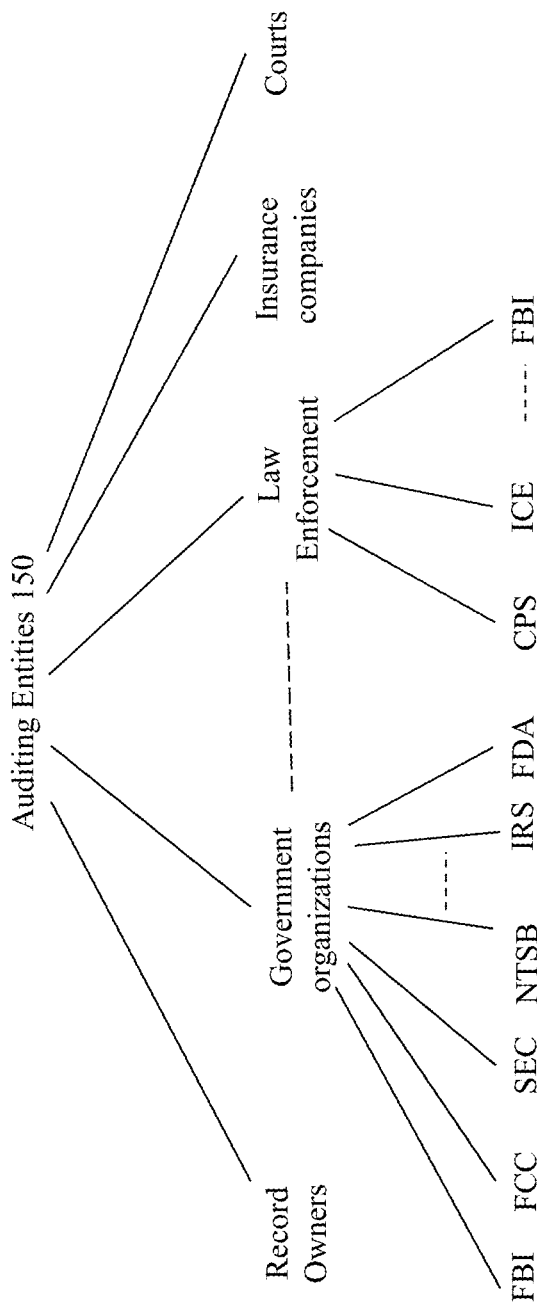

FIG. 2D illustrates exemplary parties that may serve as an auditing entity, according to embodiments of the present teaching. As shown, an auditing entity may be a record owner 110, a government organization, a law enforcement organization, an insurance company, . . . , or a court, etc. In government investigations, depending on the nature of the investigation, a government agency may audit different parties directed to different types of secure or private data related to a record owner. Such government organizations include, but are not limited to, the Federal Bureau of Investigation (FBI), the Federal Communications Commission (FCC), the Securities and Exchange Commission (SEC), the National Transportation Safety Board (NTSB), the IRS, . . . , and the Food and Drug Administration (FDA). Examples of law enforcement may include Child Protection Services (CPS), the U.S. Immigration and Customs Enforcement (ICE) agency, . . . , or the FBI. Examples of an insurance company acting as an auditing entity may involve investigation of cause of an accident involving its insured customer to check how often the customer purchases alcohol products in what volume and particularly whether the customer purchased a large quantity of alcohol products within a certain number of hours prior to the accident.

The transaction engine 150 as disclosed herein may be a service provider itself for servicing record owners in self-sovereign data management and facilitating service providers in validating secure/private data needed for conducting transactions with its customers (record owners). Although utilizing the transaction engine 150 in data management is not a necessity (a record owner may elect to manage the data himself/herself), it may be more efficient and effective for a record owner to interface with the transaction engine 150 whenever the need arises. Each record owner may have different types of data created and maintained by different trusted entities. For instance, one or more DMVs may have the information related to the birth date of a record owner, certain banks may have the information related to the financial information of the record owner, some doctor offices may have the information related to the health of the record owner, etc. Such allocation of information may also change over time. Managing the distribution of private information and maintaining over time by the record owners may give rise to the need for the transaction engine 150.

A record owner may sign up the services offered by the transaction engine 150 and provide the information related to how his/her secure/private data are distributed to the transaction engine 150 and specify the access rights/restrictions with respect to each piece of the secure/private data. The data distribution information as well as associated access restrictions may be modified whenever needed. For each record owner, the transaction engine 150 may maintain the information related to the distribution of the record owner's data and the associated access restrictions. When the transaction engine 150 is called on for facilitating validation of certain information needed between the record owner 110 and a specified service provider, the transaction engine 150 identifies the source trusted entity (or entities) of the information to be validated based on the designated allocation provided by the record owner, interfaces with each source trusted entity to facilitate the validation. To serve the record owner, the transaction engine 150 may also interface with the specified service provider. Although the transaction engine 150 is illustrated as a single engine, in deployment, the transaction engine 150 may be distributed in different geographical locations and may operate as a cloud based solution. This is to accommodate the possibly wide spread distribution of record owners. Details related to exemplary operation and implementations of the transaction engine 150 are provided with reference to FIGS. 6-7, 12-14.

The secure transaction platform 170 is an independently deployed and operated platform for securely storing smart contracts associated with different transactions, including transactions in the context of self-sovereign data management disclosed herein. To ensure security and identifiability of such smart contracts, the secure transaction platform 170 may be required to possess certain characteristics. Some examples of such characteristics include high security as to platform, distributed in nature, uniqueness in identifying smart contracts, decentralized generation of such unique identifiers for distributed smart contracts to ensure overall uniqueness, immutable data (including both immutable ledger and tampering proof), etc. The secure transaction platform 170 may be implemented using any currently existing or future developed platform so long as the utilized platform possesses the required characteristics for the purpose of the self-sovereign data management as disclosed herein. Details of exemplary operation and implementations of the secure transaction platform 170 are provided with reference to FIGS. 16A-17D.

Within the ecosystem of the self-sovereign data management framework 100, a trusted entity may create and securely store personal data/records and enable other authenticated persons to access such personal data/records. In some embodiments, a trusted entity may store personal data/records along with a transaction identifier in a record owner's personal storage system with the record owner's authorization. The trusted entity may also store a copy of such data/records in its own archives with the record owner's permission. In some situations, a record owner may provide a long-term access permission to the trusted entity to full or partial data/records at the record owner's behest. Depending on the nature of data/records, in some embodiments, a hash template for biometric information of the record owner may be associated with certain data/records, especially for more sensitive personal data/records. Via this mechanism, it is feasible to associate different biometric information with different pieces of data/records so that each piece of data/record needs to be unlocked based on its associated biometric information. In accessing personal data/records at a trusted entity, in some embodiments, a trusted entity may be pre-authorized by a record owner to provide data/records to a set of specified data consumers (service providers).

A service provider such as a medical facility, a pharmacy, or an insurance company may request conditioned access and receive conditioned access to the personal data/records of a record owner upon the authorization of the record owner. The conditions associated with each access may be set forth by the record owner which may change from transaction to transaction. The conditions associated with each access may be stored in a cloaked identifier which may be a hash code per transaction corresponding to an issued limited use token. Access may be granted by a record owner to an individual service provider or to a class of service providers with respect to different pieces of data/records, providing the record owner the ability to achieve granular access control based on needs.

With the disclosure on different parties involved in the framework 100, additional details are provided herein to describe how parties cooperate with each other and in what sequence they do so in order to complete a transaction in a self-sovereign data management scheme with need-based granular operation. Referring back to FIG. 1, an example transaction is described to illustrate the overall information flow to complete a transaction. Assume that a shopper (a record owner) desires to buy beer (either in a Brick & Mortar store or online shopping) from a grocery store (a service provider operating either a Brick & Mortar grocery store or an online store). The grocery store (service provider 120) requests that the shopper (record owner 110) validate that he/she is above the regulated drinking age of 21. The shopper may then send, via his/her personal computing device with a relevant application deployed and running thereon, the request to a relevant trusted entity 160, e.g., a relevant DMV holding necessary information to independently prove the shopper's age, to provide a proof to the grocery store in order for his/her to proceed with the purchase. Alternatively, the shopper may subscribe to a service from the transaction engine 150 that is engaged to act on behalf of the shopper to select an appropriate trusted entity (whoever is capable of providing the proof based on some known distribution of the shopper's information) for the needed validation and request such selected trusted entity to validate that the shopper is above the drinking age.

Upon receiving the electronic request to validate that the shopper (e.g., identified via proper identification information) is above a certain drinking age (e.g., 21 years old), the selected DMV, e.g., after authenticating that the shopper is a valid user, generates a cloaked identifier for this request and sends the cloaked identifier to the shopper (either directly or via the transaction engine). The cloaked identifier may include different types of information, including, but not limited to, a string of pseudo-random characters that may be ephemeral in nature and represents some contextual identity of the identity of the shopper. The contextual identity may comprise some parameters that may be required for the underlying transaction between the shopper and the grocery store. In some embodiments, such parameters may set forth access restrictions to the private data specific to this transaction, including time period permitted to access such information, . . . , and a number of times to access the information. In some embodiments, the contextual identity may also include information indicating the nature of the personal information to be validated such as the legal age and residency of the shopper. In this case, what is included in the contextual identity may not be the private information itself but rather the type of information (age) to be validated for this transaction.

In some embodiments, the cloaked identifier may specify the private data to be validated without the private data itself provided therein. In most situations, the cloaked identifiers related to a particular transaction specify only some of the private data about a record owner. Thus, the self-sovereign data management framework as disclosed herein allows a need-based granularity data validation scheme. Because a cloaked identifier can include access restrictions, it serves as a limited use token so that when the access violates the access restrictions specified in the cloaked identifier, the cloaked identifier itself serves as an authorization tool and may be effectively purged when the specified access conditions are not met. In some embodiments, a cloaked identifier is generated using a hash function that can be used to cloak information with secure and unique means.

In some embodiments, with respect to the same service provider, a cloaked identifier may provide information that is a combination of a newly computed root hash per transaction (including all previously generated limited use tokens). Such a newly issued limited use token may be used to correlate with previous requests from the same party, thus achieving zero knowledge proof. With the cloaked identifier, the identity of the record owner is masked from the service provider. Via the self-sovereign data management framework as described herein, validating private information of record owners does not result in personally identifying information being stored or possessed by service providers.

Figure 2E:
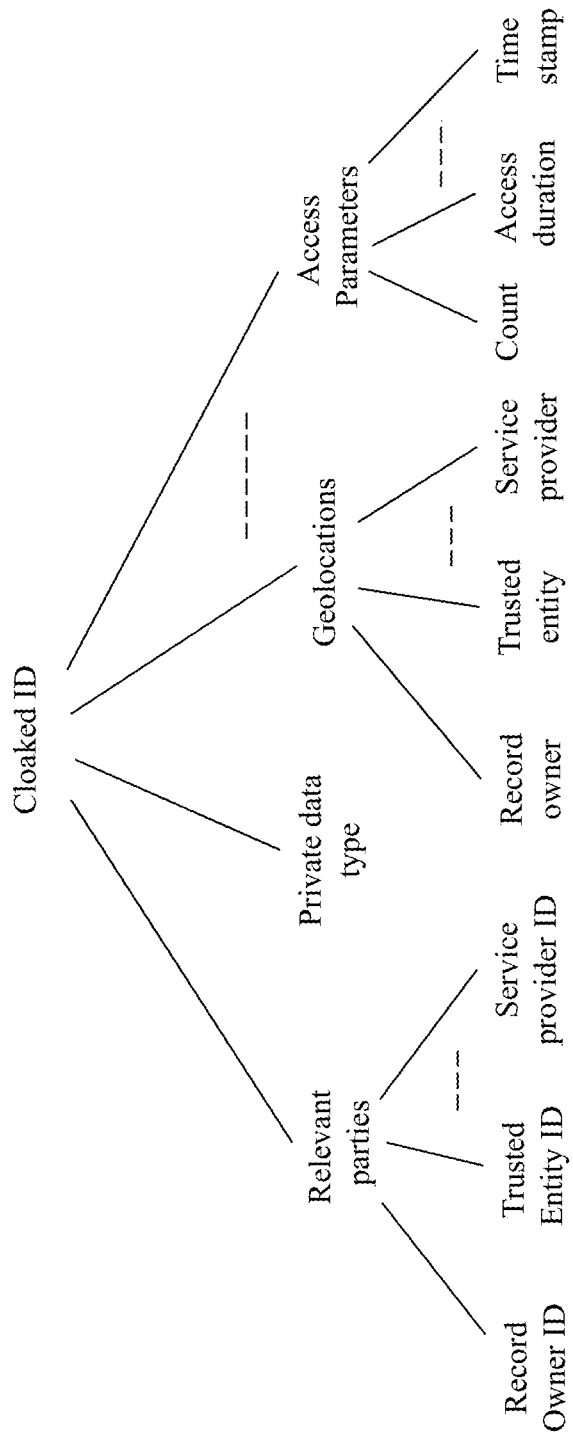
FIG. 2E depicts an exemplary construct of a cloaked identifier, according to an embodiment of the present teaching.

FIG. 2E provides an exemplary construct of a cloaked identifier, according to an embodiment of the present teaching. In this illustration, a cloaked identifier may include information that specify parties relevant to the transaction, the private data to be validated, geo locations of the parties, . . . , and access parameters that make the cloaked identifier a limited use token. With respect to relevant parties, the cloaked identifier may include the record owner, the service provider, and/or the trusted entity that is to validate the specific private data for the transaction. The geo locations of such parties, especially the record owner and the service provider may also be provided. The private data type involved may be defined based on the limited information required by the underlying transaction. For example, it may indicate a set of attributes that need to be validated in the transaction such as residency, valid professional/governmental licenses, age. Such specified types limit what the service provider can seek to verify with the designated trusted entity. In this illustrated embodiment, access restrictions may be specified which will limit the use of the cloaked identifier as a token. In addition to a number of times to use the token and the access duration (e.g., 2 hours), other limitations may also be specified such as parameters that can serve as a geofence (not shown in FIG. 2E).

Limitations to access certain private data may be defined based on multiple considerations. In some situations, there may be legal restrictions as to the access rights to certain types of data so that the trusted entities need to comply with the relevant laws to restrict the access. In some situations, record owners may desire to limit the access of others to his/her private data and accordingly specify certain access limitations, which will be within the confines of the legal requirements yet may go beyond on restrictions. For example, a record owner may further restrict access of his/her private data from certain states even though the governmental regulation does not impose such restrictions. In some embodiments, the access limitations imposed by a trusted entity may be a combination of compliance of both governmental regulations as well as the desires of the record owners.

The access parameters specified in a cloaked identifier may be further refined with respect to the particular transaction. That is, a record owner may further restrict the access by the service provider for the transaction. For example, if a trusted entity generally restricts the access to a piece of private data of a record owner to a period of one month and such access restriction is stored with the private data at the trusted entity. When the record owner sends a request to validate the piece of private data for a transaction with a service provider A, the record owner may request that the access of service provider A to this piece of private data is to be limited to one hour. In this case, the more restricted access to one hour specified by the record owner for this transaction is used to be included in the cloaked identifier created for the transaction.

Continuing the previous grocery shopping example, to enforce the access restrictions applied to a particular transaction, a trusted entity (e.g., DMV here) may also generate a secure transaction package (STP) that incorporates the transaction information (the identities of the grocery store and shopper, date, time of creation of the STP, etc.), the data to be validated, the nature of the response required (e.g., yes or no to the age instead of sending the age or birth date over the network), and/or access restrictions related to the data and then save the STP at the secure transaction platform 170. The STP may be saved for future verification of access restrictions.

Upon receiving the cloaked identifier, the shopper may use his/her personal device to forward a cloaked identifier pack to the grocery store. In some embodiments, the shopper's device or application running on the device may incorporate additional information with the cloaked identifier (e.g., information identifying the DMV or the transaction engine) to generate a cloaked identifier pack and send the cloaked identifier pack to the grocery store with information indicating where the grocery store may contact using the cloaked identifier to validate the age of the shopper.

Upon receiving the cloaked identifier (and the incorporated additional information) from the shopper, the grocery store may send the cloaked identifier to the DMV (based on the additional information in the cloaked identifier pack related to the DMV) asking for a validation response (e.g., yes or no to the required drinking age). In sending the cloaked identifier from the shopper to the DMV, the grocery store may also incorporate additional information such as date and time of forwarding the cloaked identifier (so that the DMV may check against the access restrictions). In some embodiments, the network may also mark the date and time when the cloaked identifier is transmitted over the network so that the access time is independently provided.

When the DMV receives the cloaked identifier from the grocery store, it may then retrieve the STP previously stored and check against the access restrictions before it proceeds to generate a validation response. Such a STP may be accessed multiple times and each time the access restrictions stored therein may be used to ensure that each access is to comply with the access restrictions. For example, the same shopper may go to different stores to purchase alcohol products (products may differ from store to store) and each store may require him/her to prove the drinking age. In this case, the shopper may directly forward the previously received cloaked identifier related to proving legal drinking age to different stores and all such stores may then contact the same DMV for validating the same personal data.

However, each of such requests from a store is subject to the access restriction request. For example, as discussed herein, exemplary access restrictions may be a time window by which the related private data (e.g., age) may be accessed and what is the maximum number of times such information may be accessed. If the number of times the information may be accessed is limited within the specified time period, the access restrictions may effectively restrict the shopper's ability to buy alcohol products within a certain time period in a limited number of times.

When the request from the grocery store is within the access restrictions, the DMV then generates a validation response, which may be a yes or no answer without any personal information (e.g., birth date or actual age) incorporated in the response and send the validation response to the grocery store. Upon receiving the validation response from the DMV, the grocery store then proceeds to determine whether the transaction can proceed. If the validation result is positive, the grocery store proceeds with the transaction with the shopper. Otherwise, the grocery store refuses to proceed with the shopper in compliance with the regulation. Such transaction data (either with the transaction or not) are then recorded to facilitate future potential audits.

Figure 3A:
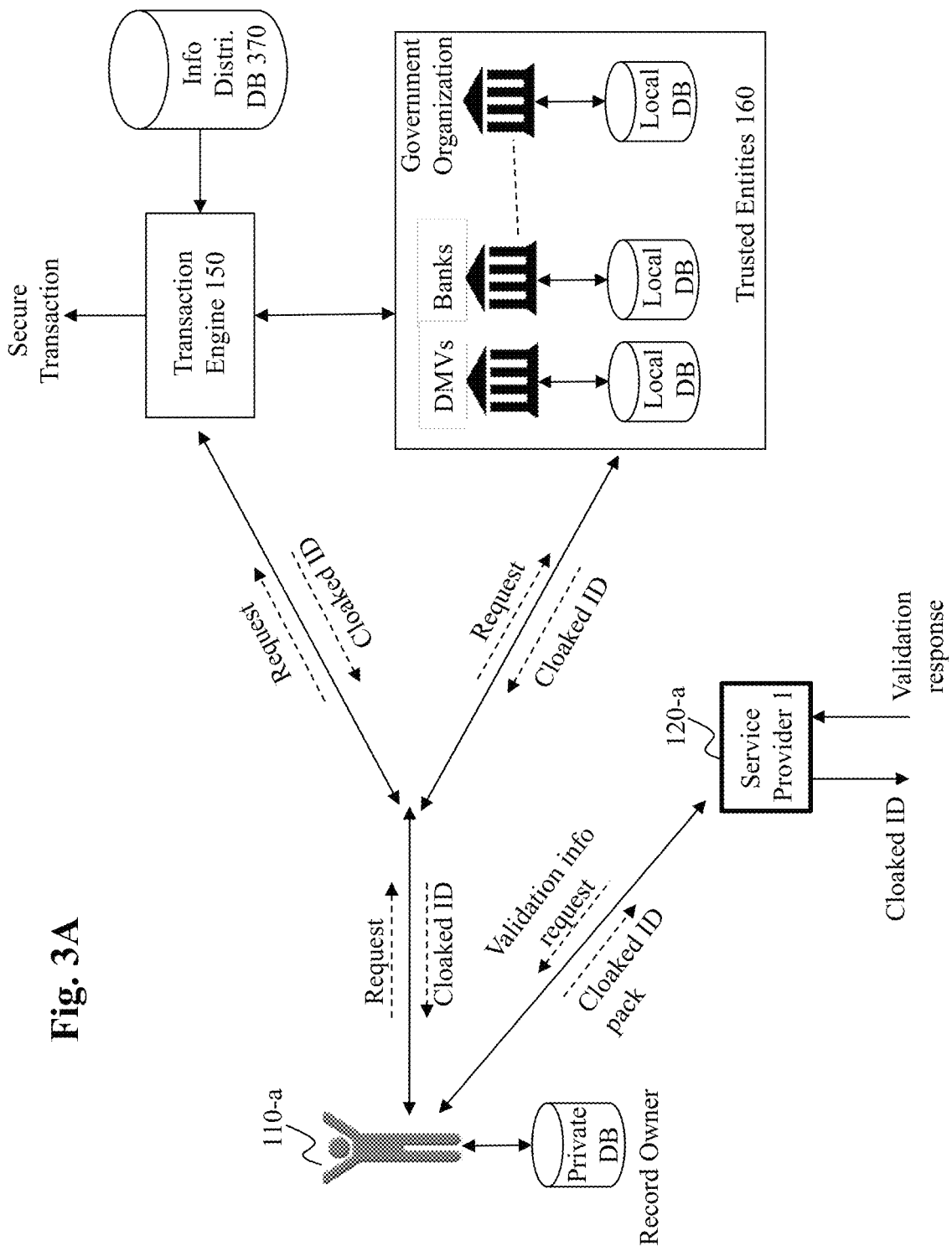
FIG. 3A depicts a record owner, via a record owner device, connected with different parties operating in a secure self-sovereign information management framework and information flow thereof, according to an embodiment of the present teaching.

As depicted in FIG. 1, different parties are connected via network 140 to conduct transactions with secure data management. To further detail the role of each party and the information flows among participating parties, FIGS. 3A-7 depict the connections among different parties from the perspective of each of the parties, including a record owner, a service provider, the transaction engine, and a trusted entity. Below, centered around each of the parties in the framework 100, disclosure is provided as to whom the party interact with, how, and the role such a party plays in the overall framework 100 for self-sovereign data management. FIG. 3A depicts a record owner, via a record owner device (not shown), with connections to different parties in framework 100, operating to play a role in the secure self-sovereign information management and information flows, according to an embodiment of the present teaching. A record owner may connect to other parties in the framework 100 via a record owner device. In the disclosure provided herein, a record owner or a record owner device may sometimes be used interchangeably referring to an operation conducted by the record owner via his/her device.

Figure 3B:
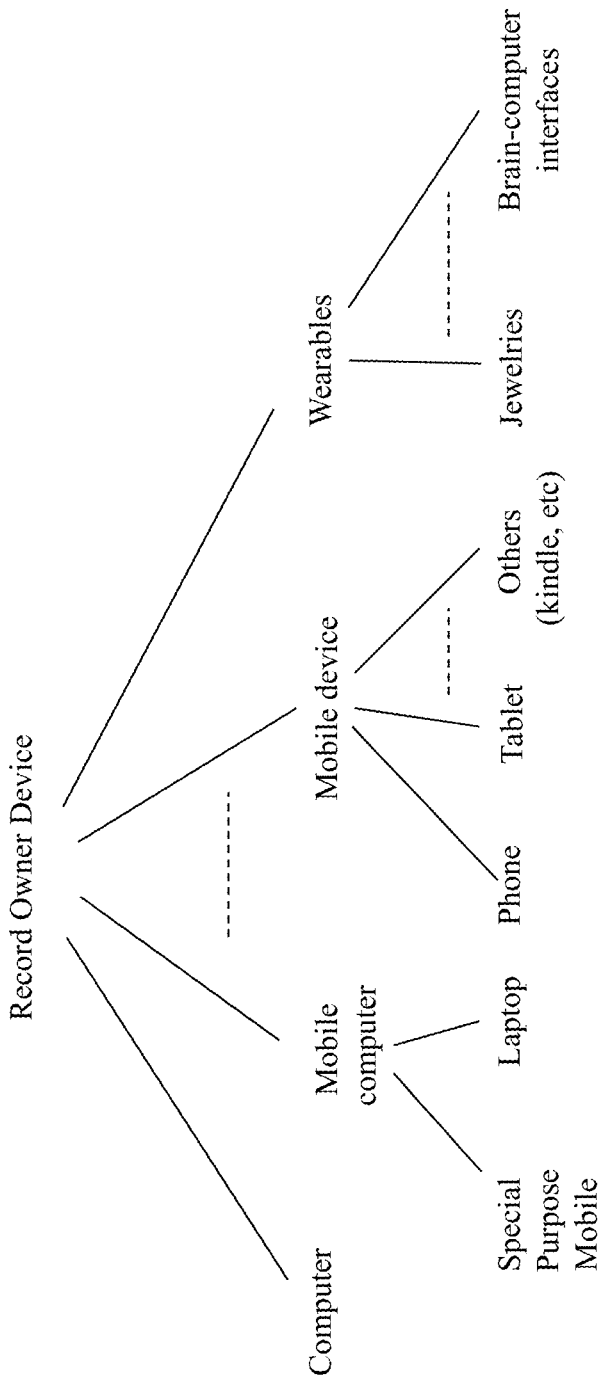
FIG. 3B illustrates exemplary types of a record owner device, according to some embodiments of the present teaching.

A record owner device may be of different types to facilitate the connectivity to and operation with others via network 140. FIG. 3B illustrates exemplary types of record owner devices, according to some embodiments of the present teaching. As illustrated, a record owner device may include a computer, a laptop, a mobile device, which can be any of a smart phone, a tablet, . . . , or any other smart devices such as a kindle, etc., or a wearable device such as a wrist watch/band, jewelries, . . . , or any type of wearables serving as brain-computer interfaces. There may be any other types of suitable electronic or even inorganic or organic chemical based computing devices, presently existing or developed in the future.

Those illustrated in FIG. 3B are exemplary types and there may be other types of devices that, although today may not possess the capability of being used as a communication device to achieve the operations of self-sovereign data management, may be configured or modified to serve as a record owner device within the meaning of the present teaching. Examples of such additional devices (not shown in FIG. 3B) include a personal display device, a personal digital assistant or PDA, a gaming console/device, a headset, a device embedded in, e.g., a transportation vehicle (e.g., cars, trucks, motorcycles, boats, ships, trains, airplanes), other smart devices such as set top boxes, smart televisions, household appliances (e.g., refrigerators, microwaves, etc.), and/or smart accessories (e.g., light bulbs, light switches, electrical switches, etc.).

Referring back to FIG. 3A, with the record owner device, a record owner, 110-a, may communicate with a service provider, e.g., 120-a, for a desired transaction. As a condition of the transaction, the service provider 120-a sends a request indicating the information that needs to be validated to the record owner. The record owner 110-a then forwards the request for validating certain information to either the transaction engine 150 or one or more relevant trusted entities, depending on whether the record owner has signed up for the service from the transaction engine. As disclosed herein, the record owner 110-a may be required to authenticate himself/herself before actually initiating the validation process to improve security. In some embodiments, the authentication may be performed on the record owner device. In some embodiments, the authentication may be performed with respect to either the transaction engine 150 (if the record owner 110-a signs up for services from the transaction engine) or with respect to a trusted entity that is to validate the private data at issue. In some embodiments, the authentication may be needed on both the record owner device and with a trusted entity and/or the transaction engine 150. Without being authenticated, the record owner 110-a may not be allowed to proceed with the validation process and, hence, without being able to conduct the underlying transaction with the service provider 120-a.

The authentication is to make sure that the record owner is whom he/she claims to be. To authenticate with the record owner device may be the minimum security needed. The increased security precaution may be implemented to require that the record owner also authenticate with the trusted entity or the transaction engine 150. In this manner, the trusted entity or the transaction engine may store authentication information of the record owner at the time of establishing the validation services and such stored authentication information may then be used at the time of services to ensure security. In this way, even if a record owner's device is tampered with and compromised, the person who is using the record owner's device still must pass the authentication with the party he/she is communicating with, i.e., either the trusted entity or the transaction engine, thereby providing another level of security. Details related to authentication are provided with reference to FIGS. 18A-27B.

If the record owner sends the request for validating certain information directly to a relevant trusted entity, it receives, as a response from the trusted entity, a cloaked identifier associated with the validation. If the record owner sends the request for validating certain information to the transaction engine 150, it receives, as a response, the cloaked identifier associated with the requested validation. As disclosed herein, the transaction engine 150 in this case acts on behalf of the record owner to select a trusted entity, forward the request to the selected trusted entity, receive the cloaked identifier for the validation request, and forward the cloaked identifier to the record owner. In some embodiments, the transaction engine 150 may be configured to be able to generate a cloaked identifier upon receiving a request from a record owner. In some embodiments, depending on the service terms agreed upon with different record owners, the transaction engine 150 may sometimes rely on trusted entities to generate cloaked identifiers and forward to corresponding record owners but in other situations, may generate cloaked identifiers based on information from the record owners and corresponding trusted entities. In some embodiments, whether a cloaked identifier is to be generated by a trusted entity or the transaction engine 150 may depend on what the trusted entity permits. In any variation, the transaction engine 150, when implicated, sends a cloaked identifier to each record owner during its services.

Upon receiving the cloaked identifier, the record owner 110-*a* generates a cloaked identifier pack (detailed later) incorporating both the cloaked identifier and certain information, e.g., indicating either the transaction engine 150 or a trusted entity for validation, to the service provider 120-*a*. With the received cloaked identifier pack from the record owner 110-*a*, the service provider 120-*a* sends the cloaked identifier to the designated recipient (either the transaction engine 150 or the selected trusted entity), requesting a validation response with respect to the certain information involved in the anticipated transaction. The service provider 120-*a* then receives, as a response to its request, a validation response. Based on the validation response, the service provider 120-*a* then either proceeds with the transaction with the record owner 110-*a*, if the validation response satisfies the prerequisite of the transaction or rejects the transaction if the validation response indicates that the prerequisite of the transaction is not satisfied.

Figure 3C:
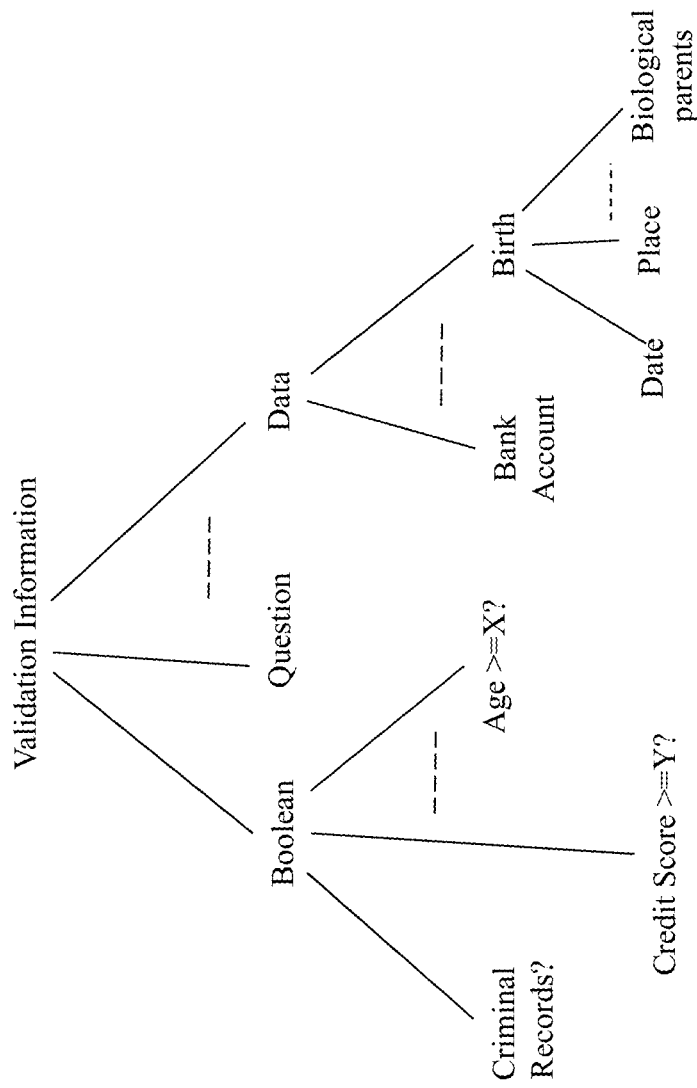
FIG. 3C illustrates exemplary types of validation information that can be validated via a secure self-sovereign information management framework, according to some embodiments of the present teaching.

During the above described process of self-sovereign data management, the secure or private information of the record owner 120-*a* may not be transmitted through the network 140 even though it can be validated (or invalidated) via such a process. When no secure/private information is transmitted over the network, the risks that the information be hijacked during the transmission is eliminated or minimized. This is made possible particularly when the request (from the service provider) to obtain a validation response does not ask for the secure/private data itself. FIG. 3C illustrates exemplary types of validation information that can be validated via the secure self-sovereign information management framework 100, according to some embodiments of the present teaching. As illustrated, there are exemplary types of information that can be validated. For example, criminal records, credit scores, age, bank account, . . . , birth related information such as birth date, birth place, . . . , and biological parents. Validation for such information may be sought and the validation via the self-sovereign data management framework 100 may not yield transmission of the private information over the network. For instance, as shown in FIG. 3C, if a validation request asks for a yes or no answer over the private information related to whether a person's age is older than X, then the validation response may be simply yes or no without revealing the age information.

In some embodiments, a service provider may request that the private data to be validated be sent over in the cloaked identifier and then the service provider may forward the cloaked identifier with the private data embedded therein to a designated party (either a trusted entity or the transaction engine 150) together with its request for a validation response and information surrounding the access (e.g., date, time, and the type of validation response sought). In this case, the service provider may request that the designated party to affirm the private data. In such an operation, although the private data is sent to the service provider in the cloaked identifier, the service provider does not have access to the private data in the cloaked identifier but the cloaked identifier nevertheless enables the service provider to receive a validation answer that it needs.

Many types of prerequisite conditions to a transaction may be expressed as a confirmation request with a Boolean answer, e.g., "does the record owner have a criminal record," "does the record owner have a credit score of a certain level," . . . , or "is the record owner older than a certain age." When a request for a validation response is directed to a Boolean response, even though the service provider may make clear on what the prerequisite condition is (which does not reveal private information) in its request, a relevant trusted entity holding private data may simply compare the private data with the prerequisite condition to be validated and generate a validation response without inclusion of any private information.

In some situations, a request may be for an answer to a question. For instance, a question may be "which year did he travel to Europe" directed to, e.g., the State Department of the U.S. government (a trusted entity). In this case, the trusted entity being posed the question may check the secure data archive and provide an answer, e.g., "1971," which is not the secure data itself (e.g., the precise date may be "Jul. 24, 1971").

Figure 3D:
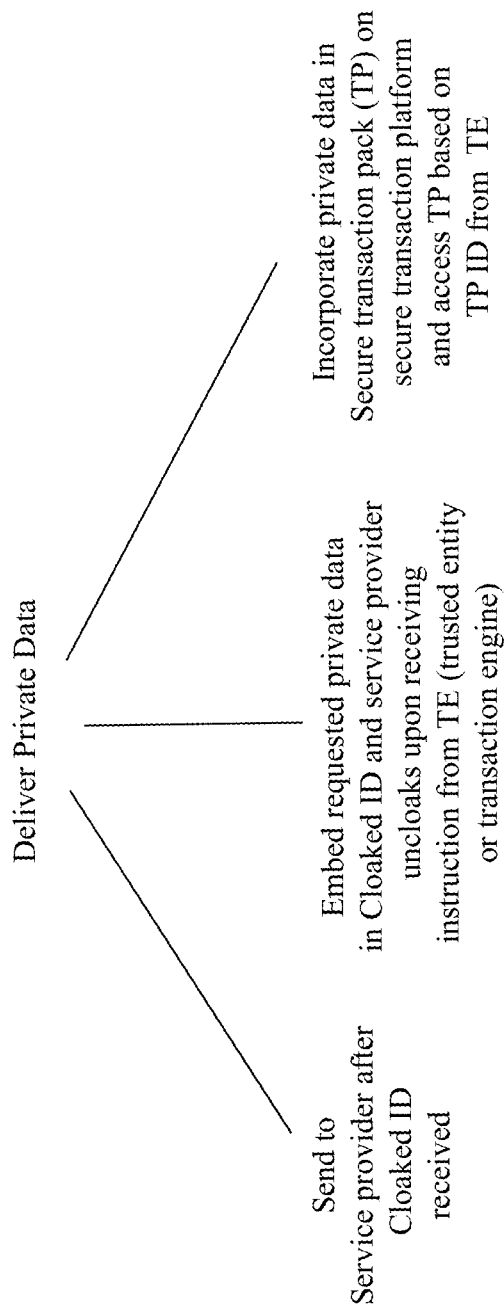
FIG. 3D illustrates exemplary approaches to deliver requested private data, according to some embodiments of the present teaching.

In some situations, a service provider may request the actual secure/private data be sent over. For example, a service provider, e.g., a credit bureau, may need to know all bank account information before it proceeds to check the credit history. Another service provider may be required to receive information associated with a record owner's birth such as birth date, birth city, and the names of the biological parents of the record owner. When actual secure/private data is requested, there may be different secure means to send such information. FIG. 3D illustrates some exemplary means to transmit secure data in the context of self-sovereign data management, according to embodiments of the present teaching. As shown, private data may be delivered from a trusted entity to a service provider via a secure channel between the trusted entity and the service provider. For example, a service provider may, via the cloaked identifier, provide information (either directly or via the transaction engine 150) to the trusted entity related to a secure channel to be used to deliver secure/private data. As such a channel is dynamic and maybe transient in nature (established for each transaction) and the information related to the secure channel is transmitted via the cloaked identifier, it is more secure.

Another exemplary means to deliver private data to a service provider is, as illustrated in FIG. 3D, by embedding the requested private data in the cloaked identifier. In this alternative, when a service provider forwards the cloaked identifier (received from the record owner) to a trusted entity (directly or via the transaction engine 150), the trusted party may respond with the information specifically for uncloaking the cloaked identifier to extract the private data. In this manner, as the cloaked identifier and the information to uncloak the cloaked identifier are transmitted at different times, thereby minimizing the risks that the private data can be hijacked from the network 140.

Yet another exemplary alternative to deliver private data to a service provider is, as shown in FIG. 3D, by incorporating the private data in a secure transaction package (STP) and storing the STP on the secure transaction platform 170 based on a unique STP identifier (STP ID), which uniquely identifies the STP associated with the invalidation request. The STP is generated based on a request from a record owner to validate certain private data so that relevant private data may then be coded and stored in the STP before it is saved on the secure transaction platform 170. As disclosed herein, the secure transaction platform is secure with the mechanism of uniquely identifying each smart contract (STP) wherein the data stored therein is immutable. The STP ID may then be sent to the service provider for secure access. In this option, the service provider may provide its secure credential to the trusted entity so that the trusted entity may incorporate the credential of the service provider in the STP so that at the time of access to the STP, authentication is performed on the service provider to minimize the risks.

When a record owner performs self-sovereign data management via the transaction engine 150, the record owner may communicate with the transaction engine 150 on various matters, including what are the sources of different pieces of private data, i.e., which trusted entity has which piece(s) of private data and the access restrictions to be applied to the private data. In different situations, private data may be held by different trusted parties, e.g., DMV with information on birth date, license status, residence, driving record, etc.; doctor offices with health-related information; banks with financial information, police department with criminal offense information; . . . , credit bureau with credit related information. Information related to which piece(s) of private data are possessed by which trusted party may be provided to the transaction engine 150 so that a data partitions corresponding to each record owner may be generated and used for future services.

Figure 3E:
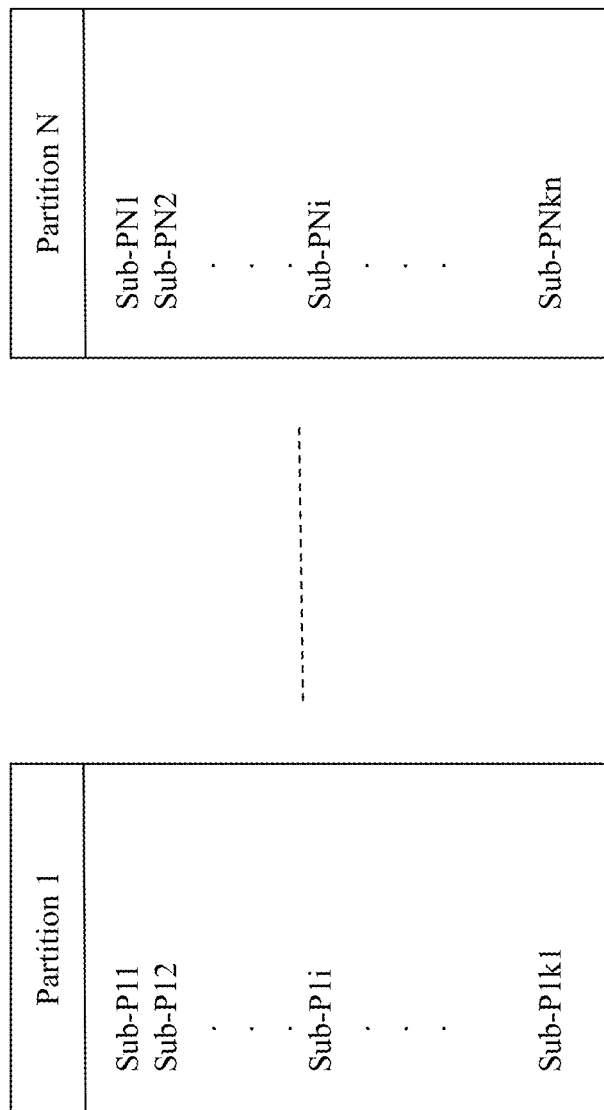

FIGS. 3E-3G disclose exemplary secure data partitions with links to host sources and illustrative meta information thereof, according to embodiments of the present teaching. FIG. 3E shows partitions of private data of a record owner, in which each partition includes one or more pieces of private data. For example, in this example, there are N partitions of private data, with partition 1 having multiple pieces of private data sub-P11, sub-P12, . . . , sub-P1$i$, . . . , sub-p1$k$1, . . . , partition N having multiple pieces of private data sub-PN1, sub-PN2, . . . , sub-PNi, . . . , sub-PNkn. Each of these partitions may be linked to a trusted entity and such information may be recorded in some meta information associated with the record owner. The partitions may be recorded by the transaction engine 150 so that when the record owner requests to validate a particular piece of private data, the transaction engine 150 may determine, based on the recorded partitions as shown in FIG. 3E, to which trusted entities the transaction engine 150 needs to contact for the validation.

As discussed herein, meta information for the partitions of the private data associated with each record owner may also be archived to facilitate services. FIG. 3F illustrates exemplary types of meta information associated with each partition, according to embodiments of the present teaching. As illustrated, meta information for each partition may include information related to the source (trusted entity) of the private data in the partition, access restrictions to be applied to each access attempt of any piece of private data, validation inquiry types permitted, type of authentication information to be used to authenticate the record owner, the identifier of the trusted entity (data source), and optionally the information to be used to authenticate the transaction engine 150 with the trusted entity.

FIG. 3G shows an exemplary construct for meta information for a partition of private data, according to some embodiments of the present teaching. In this exemplary construct for meta information, source ID is provided to identify the trusted entity that hosts the private data in the partition, access restrictions to be applied to any access to any piece of private data in the partition, . . . , the inquiry types that are permitted with respect to any piece of private data in the partition, and the authentication information to be used to authenticate the record owner. In some embodiments, the access restrictions may include restriction on access time, e.g., restricted to a period of time after the initial request is made, the number of times the data can be accessed after the initial request, . . . , the party or parties that can request to validate the data, and/or conditions related to geographical limitations or geofence. As discussed herein with reference to FIG. 3D, the permitted inquiry types may also be limited, e.g., to Boolean type, question type, . . . , or data type. The authentication information specifies the type of information to be used to authenticate the record owner, including biometric and/or non-biometric information and each may involve multiple pieces of authentication information. Biometric information may include fingerprint/palm or veins thereof, face, iris, etc. Non-biometric authentication may involve password, security code, security questions, etc. In some embodiments, the authentication information may be generated with either trusted parties involved or the transaction engine 150.

In some embodiments, access restrictions may be specified for an entire partition. In alternative embodiments, different access restrictions may be specified for different pieces of private data in the same partition. In yet other exemplary embodiments, some access restrictions may be applied to the entire partition and some of the access restrictions may be applied to a portion of the private data in the partition. The construct of the meta information may be accordingly designed to facilitate such different embodiments. In some situations, the access restrictions may also be established at the time of the request for validating any piece of data so that the dynamic access restrictions may be applied to that relevant piece of data for the specific validation. Such dynamic access restrictions may be specified by the record owner in making the request. In yet other embodiments, the access restrictions may be set to default initially with respect to the partition or different pieces of data in the partition but may be modified from request to request. In some embodiments, the access restrictions of some pieces of private data may be set by the trusted entities that host the private data (instead of by the record owner), e.g., the more private the data is, the more restrictions apply. But such restrictions may be updated when certain criteria are met.

Figure 4A:
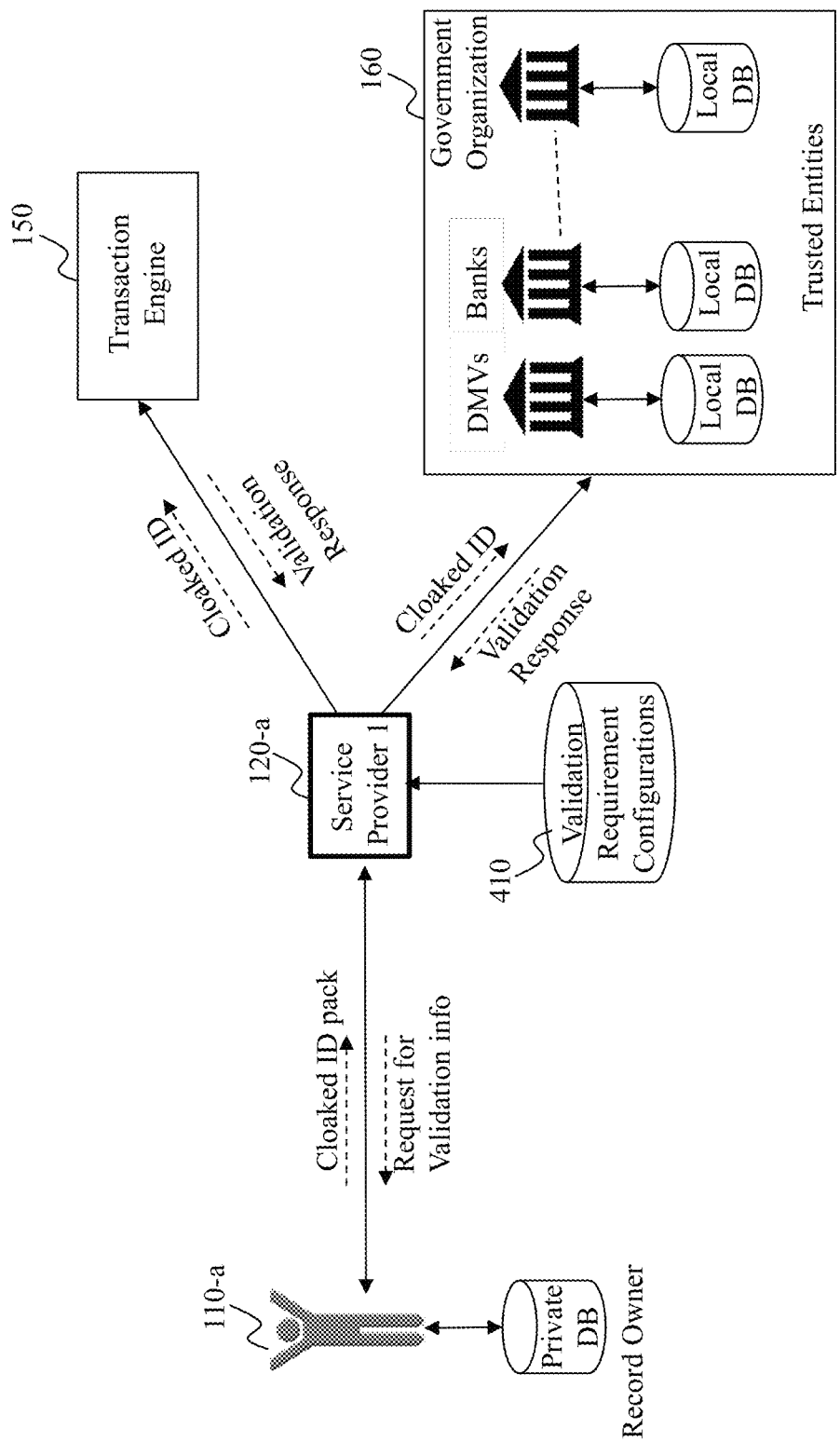
FIG. 4A depicts a service provider connected with different parties operating in a secure self-sovereign information management framework and information flows thereof, according to an embodiment of the present teaching.

FIG. 4A depicts the connections between a service provider (120-$a$) with other parties operating in the secure self-sovereign data management framework 100 and information flows among relevant parties, according to an embodiment of the present teaching. As shown, the service provider 120-$a$ is connected to a record owner 110-$a$ and they operate in the similar manner as what is disclosed with respect to FIG. 3A, i.e., when contemplating a transaction with the record owner 110-$a$, the service provider 120-$a$ requests that the record owner 110-$a$ validate certain information as a prerequisite to the desired transaction. The certain information to be validated is determined based on information in a database 410 storing validation requirement configurations with respect to different transactions. For example, if the service provider is a grocery store and a record owner 110-$a$ desires to buy beer, the validation requirement configuration corresponding to this transaction may be that the record owner has to be at least 21 years old.

After sending the request to the record owner 110-$a$, the service provider 120-$a$ receives, from the record owner 110-$a$, a cloaked identifier pack which provides both the cloaked identifier from a trusted entity that hosts the private data to be validated as well as information related to where the service provider 120-$a$ is to send the cloaked identifier to in order to seek a validation response.

As disclosed herein with reference to FIG. 1, a service provider may be connected to both a trusted entity or to the transaction engine 150. In some embodiments, it may depend on whether the record owner 110-*a* manages data via the transaction engine 150. For example, if the record owner does use the transaction engine 150, the service provider 120-*a* may be directed to send the cloaked identifier to the transaction engine 150 so that the transaction engine may act on behalf of the record owner to complete the rest of the steps in validating the information. If the record owner handles data management directly with different trusted entities, it may direct the service provider to request for a validation response directly from some specified (e.g., in the cloaked identifier pack) trusted entities. It may also be that the record owner sometimes handles the data management directly with some trusted entities but in some transactions, the record owner handles via the transaction engine 150. In each situation, the record owner may accordingly generate the cloaked identifier pack with information specifically directing the service provider how to proceed.

As shown in FIG. 4A, the service provider 120-*a* may send the received cloaked identifier to the transaction engine 150 with a request for validation response and subsequently receive the requested validation response from the transaction engine 150. In an alternative route, the service provider 120-*a* may send the received cloaked identifier to one or more specified trusted entities for a validation response from each and then subsequently receives, from each of the trusted entities, a validation response to the inquiry to that trusted entity. When the service provider 120-*a* sends a request for a validation response to a party (the transaction engine 150 or a trusted party), the request may also incorporate additional information related to the inquiry so that such additional information may be used to check against the access restrictions related to the piece of data to be validated. For example, if an access restriction demands that the validation request has to be made within 0.5 hour after the record owner 110-*a* requested for the cloaked identifier and the number of inquiries starting from the time of the initial request from the record owner 110-*a* cannot exceed 5. In this case, the service provider may be required to time stamp its request to a designated party (a trusted entity or the transaction engine) for a validation response so that the time represented by the time stamp may be used to compare against the set access restrictions. If the time stamp indicates that it has exceeded the permitted time period for access, the request for a validation response may be denied.

Figure 4B:
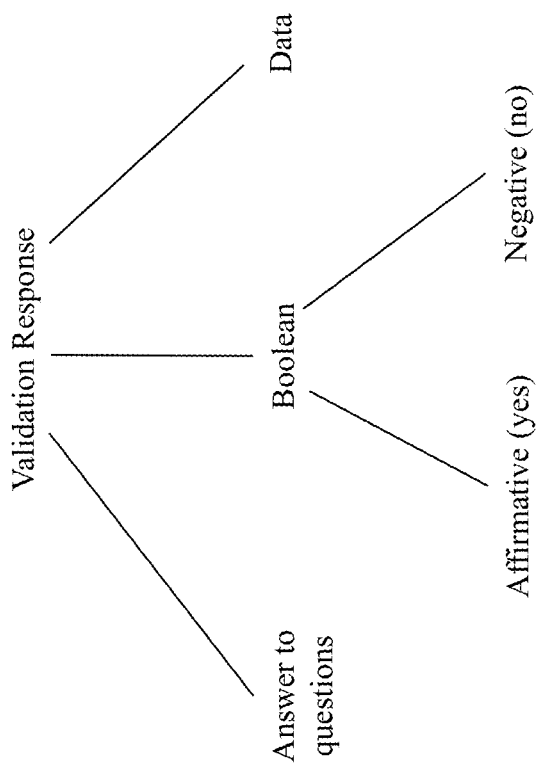
FIG. 4B illustrates exemplary types of a validation response, according to an embodiment of the present teaching.

The service provider 120-*a* may also specify the type of validation response to seek. For instance, the inquiry related to the validation may seek for a Boolean response, e.g., "is the record owner 110-*a* at least 21?" The inquiry may also seek an answer for a question such as "when did the record owner visit Europe?" As discussed herein, in some situations, the inquiry from the service provider 120-*a* may also seek data in a validation response, e.g., "in which city was the record owner born?" Based on the specified inquiry type, a trusted entity that ultimately receives the request may also examine against the permitted inquiry types for the private data and makes a determination as to whether the requested validation response can be provided to the service provider. FIG. 4B illustrates exemplary types of validation response, according to an embodiment of the present teaching.

Figure 5:
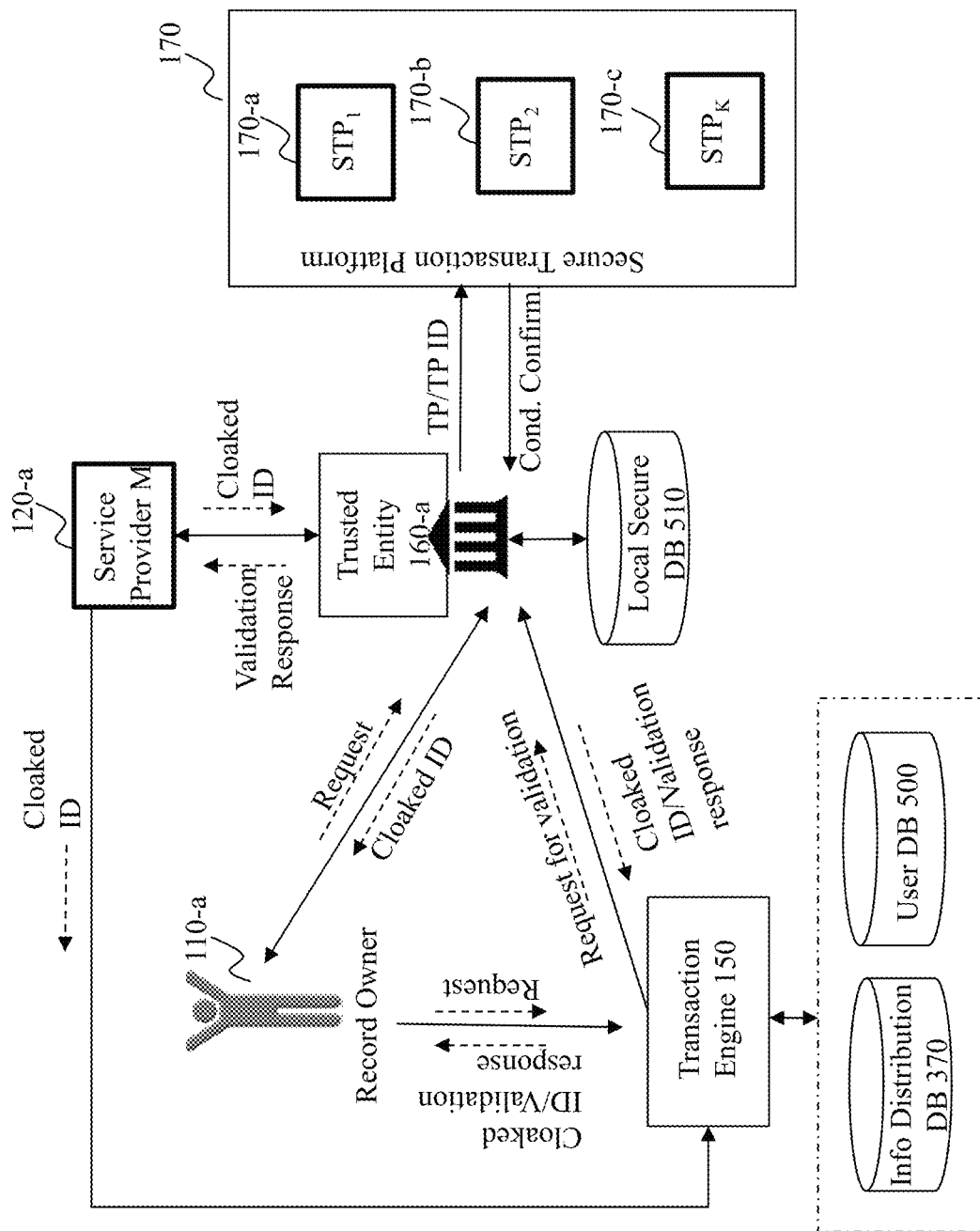
FIG. 5 depicts a trusted entity connected with different parties operating in a secure self-sovereign information management framework and information flows thereof, according to an embodiment of the present teaching.

FIG. 5 depicts how a trusted entity connects to different parties operating in the secure self-sovereign information management framework 100 and information flows thereof, according to an embodiment of the present teaching. As discussed herein, a trusted entity is a party that hosts some secure/private data of some customers (record owners) and whenever it is called upon by a customer to validate the private data hosted therein, it is able to validate the private data in question. In FIG. 5, the trusted entity 160 is connected to three parties via the network 140 (not shown here), including a record owner (customer) 110-*a*, the transaction engine 150, a service provider 120-*a*, as well as the secure transaction platform 170. In addition, as discussed herein, in operation, the trusted entity 160-*a* may interface directly with a record owner 110-*a* or may interface with the transaction engine 150 that acts on behalf of the record owner 110-*a*.

When the record owner 110-*a* desires to conduct a transaction with a service provider 120-*a*, the record owner 110-*a* receives a request from the service provider 120-*a* asking the record owner to validate some private information. When the record owner 110-*a* interacts directly with trusted entities in its data management, to initiate the validation process, the record owner 110-*a* may contact directly an appropriate trusted entity (e.g., trusted entity 160-*a*) for validating the private data hosted by the selected trusted entity at its local secure database 510. This is achieved by directing the request from the service provider indicting the private data to be validated, to the trusted engine 160-*a*. Upon receiving the request from the record owner 110-*a*, the trusted entity 160-*a* generates accordingly a cloaked identifier associated with the validation request and sends the cloaked identifier to the record owner 110-*a*.

When the record owner 110-*a* uses the services from the transaction engine 150 for its secure data management, the record owner 110-*a* instead sends a validation request to the transaction engine 150 with information indicative of what needs to be validated. Upon receiving the validation request from the record owner 110-*a*, the transaction engine 150 acts on behalf of the record owner. In doing so, the transaction engine 150 may first determine an appropriate trusted entity based on the information stored in the information distribution database 370 (see discussion with reference to FIGS. 3E-3G). Once the trusted entity is determined based on meta information, the transaction engine 150 may send a request for validating the secure/private data at issue to such determined trusted entity.

Upon receiving the request for validation from the transaction engine 150, the trusted entity 160-*a* then generates accordingly a cloaked identifier associated with the validation request and sends the cloaked identifier to the transaction engine 150, which then forwards the cloaked identifier to the record owner 110-*a*. In either of the situations described above (contacting directly with a selected trusted party or via the transaction engine 150), the record owner 110-*a* may be required to authenticate himself/herself before initiating the validation process. Without passing the authentication, the record owner 110-*a* or the person who is operating a record owner's device to attempt to initiate the validation process may be denied of the request. Details related to authentication are provided with reference to FIGS. 18A-27B.

When the trusted entity 160-*a* ascertains the private data to be validated (based on the request for validation, either directly from the record owner or from the transaction engine 150), it may also proceed to retrieve the access restrictions and/or permitted inquiry types associated with the private data from, e.g., the local secure database 510, and incorporate such specified limitations into the cloaked identifier and/or into a secure transaction package STP. Such generated STP may be stored, with a unique identifier TP ID, on the secure transaction platform for future access. The cloaked identifier and the TP ID may be linked as a pair and stored as such so that when the cloaked identifier is received later with specifics related to the access with inquired validation response, the STP may be retrieved to check if any of the future access meet the specified access limitations.

As discussed with reference to FIG. 4A, when the record owner 110-a receives the cloaked identifier (either from a selected trusted entity or from the transaction engine), the record owner generates a cloaked identifier pack and sends it to the service provider 120-a. The cloaked identifier pack may incorporate both the cloaked identifier as well as additional information indicting, e.g., which party (the selected trusted entity or the transaction engine) the service provider 120-a is to contact to seek a validation response. When the service provider 120-a receives the cloaked identifier pack, it may extract the cloaked identifier and send a request for a validation response with the cloaked identifier to either the selected trusted entity 160-a or to the transaction engine 150. The request for a validation response may also include additional information such as time stamp, geographical location of the service provider, etc. The request for a validation response, together with the additional information, may ultimately be received by the trusted entity 160-a (either from the record owner directly or from the transaction engine 150).

Once receiving the request for a validation response, the trusted entity 160-a retrieves the STP stored on the secure transaction platform 170 based on the TP ID corresponding to the cloaked identifier and checks whether the request satisfies the access limitations imposed on the private data to be validated. For example, the trusted entity may compare the additional information related to the request with the access limitations stored in the STP (including, e.g., restrictions, inquiry types, etc.) and see, e.g., whether the inquiry type is permitted, whether the time stamp is within the restricted access time period, whether the request is from a locale within the geofence specified, . . . , whether the access exceeds the allocated count. If the request is within the access limitations, the trusted entity 160-a generates the requested validation response and sends to either the service provider 120-a or the transaction engine 150, which then forwards the validation response to the service provider 120-a. If the validation response indicates that the private data is validated, the transaction between the record owner 110-a and the service provider 120-a may proceed. Otherwise, the transaction may not be conducted.

Figure 6:
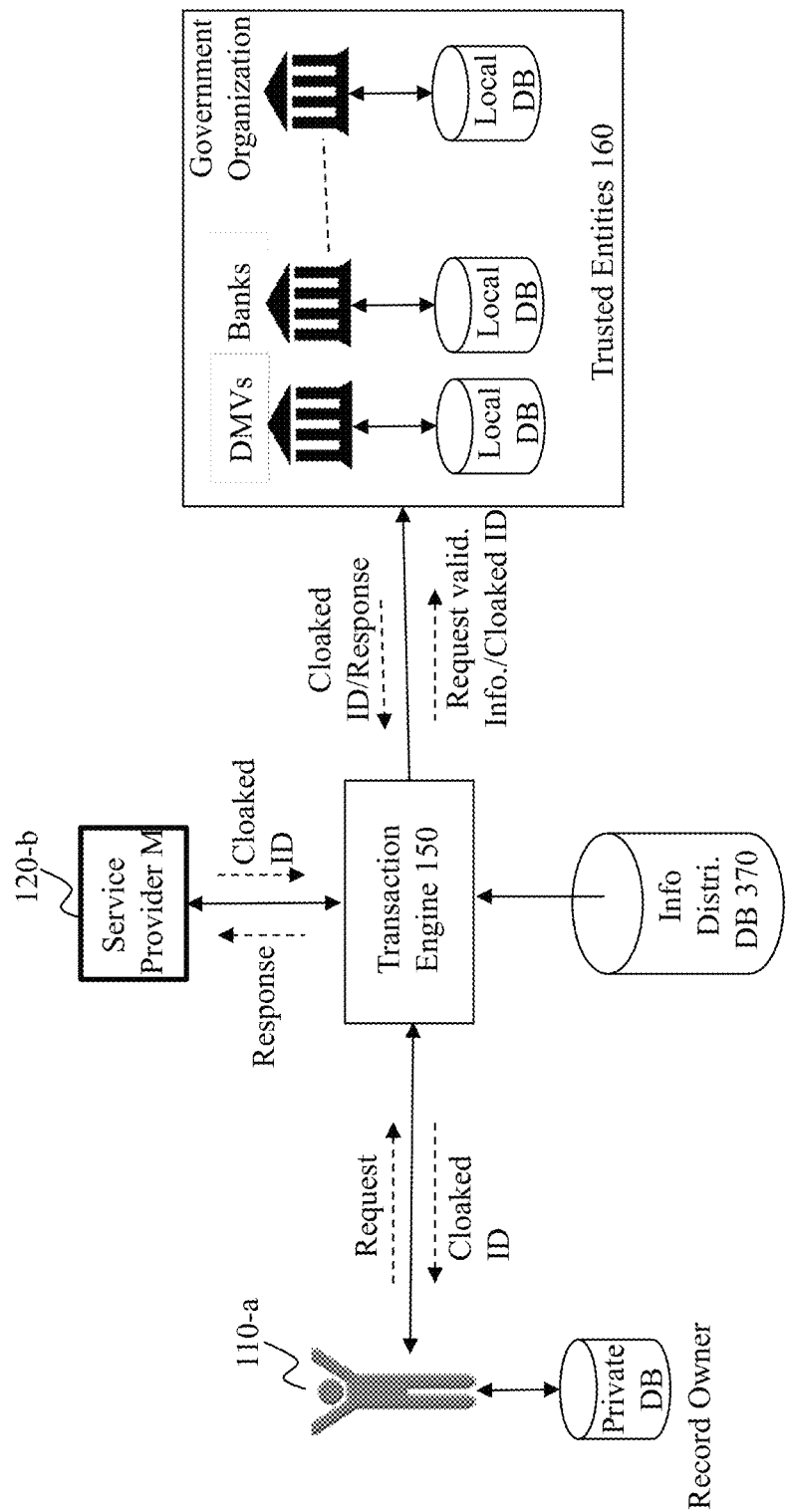
FIG. 6 depicts a transaction engine connected with different parties operating in a secure self-sovereign information management framework and information flows thereof, according to an embodiment of the present teaching.

FIG. 6 depicts how the transaction engine 150 connects with different parties operating in the secure self-sovereign information management framework 100 and information flows thereof, according to an embodiment of the present teaching. As discussed herein, the role of the transaction engine 150 is to provide services to different parties, including record owners and service providers and act on behalf of them to interface with trusted entities to accomplish secure data management and validation.

As such, FIG. 6 shows that the transaction engine 150 connects to all three types of parties, record owners, service providers, and trusted entities and plays a role of interfacing between record owners and service providers who are on the side of needing to validate certain secure/private data in order to conduct transactions and the trusted entities who are on the side of being able to provide the needed validation of secure/private data at issue. As discussed above on the information flow among different parties, when a record owner uses the transaction engine 150 for services, whenever the need arises (e.g., validation of private data in order to conduct a transaction with a service provider), the record owner sends a request for validating certain private data to the transaction engine. With the request, the transaction engine 150 determines an appropriate trusted entity that hosts the private data at issue and sends a validation request to such determined trusted entity.

When the transaction engine 150 receives a cloaked identifier from the trusted entity for the validation request, it forwards the cloaked identifier to the record owner, who subsequently sends a cloaked identifier pack to the service provider (see discussion with respect to FIGS. 3A, 4A). Based on the cloaked identifier pack, the service provider extracts the cloaked identifier and sends the extracted cloaked identifier to the transaction engine 150 with additional information included which may specify the inquiry intended with respect to the private data and access information such as time stamp and geographical location of the service provider.

Upon receiving the cloaked identifier and the additional information associated with the inquiry from the service provider, the transaction engine 150 sends the cloaked identifier as well as the additional access related information to the trusted entity. Subsequently, the transaction engine 150 receives a validation response from the trusted entity as a response to the request from the service provider. The transaction engine then forwards the validation response to the service provider.

Figure 7:
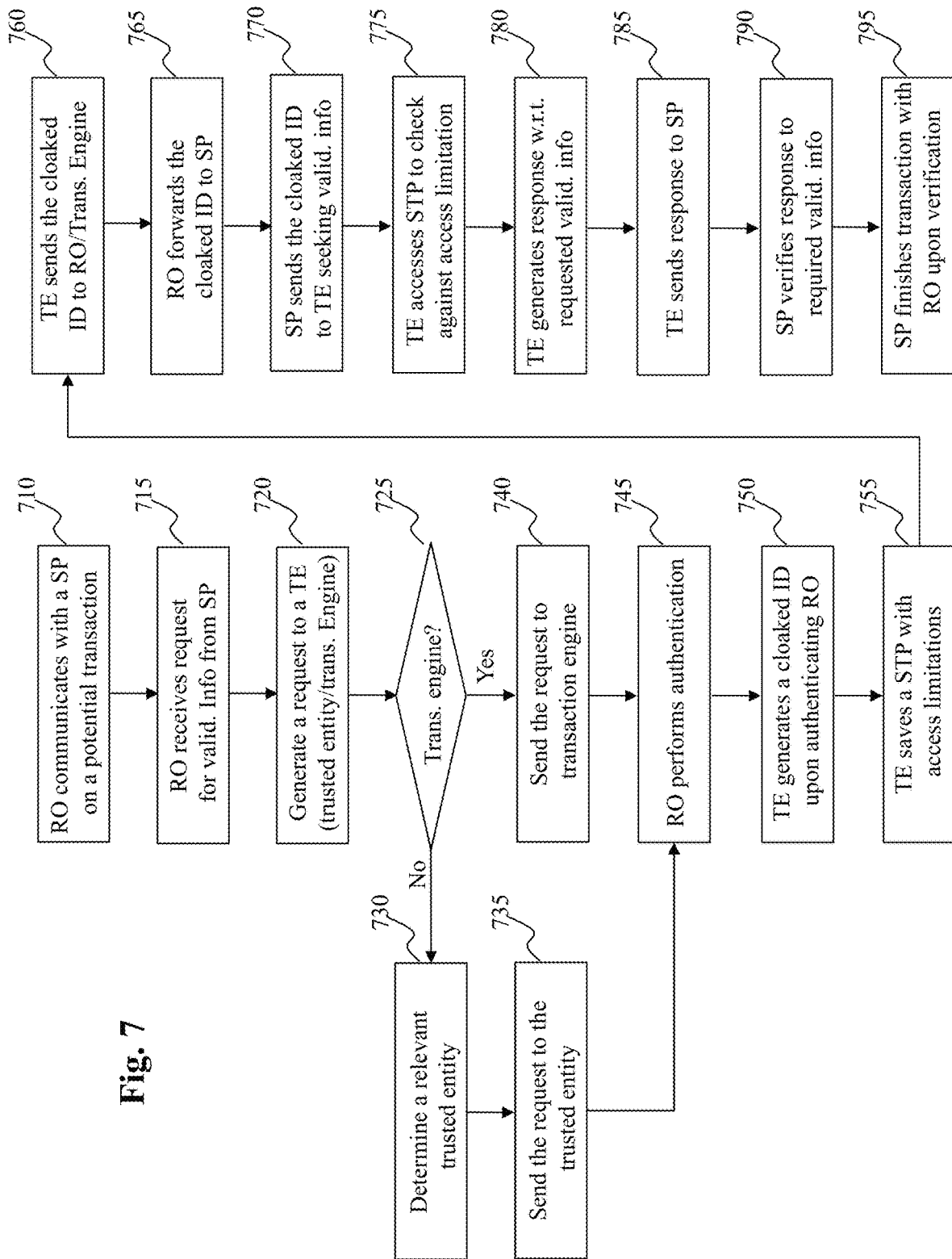
FIG. 7 is a flowchart of an exemplary process of a secure self-sovereign information management framework, according to an embodiment of the present teaching.

The above disclosure specifies the connections and operations from the perspective of each of the parties involved in the framework 100. FIG. 7 is an overall flow of information corresponding to an exemplary process of the secure self-sovereign data management framework 100, according to an embodiment of the present teaching. This flow summarizes the information flows from the perspectives of different parties. Specifically, at 710, a record owner communicates with a service provider on a potential transaction. To proceed, the record owner receives, at 715 from the service provider, a request for the record owner to validate certain information as a condition to the transaction. The record owner initiates the process of validation by generating, at 720, a request to validate the required private data and determining, at 725, whether the transaction engine 150 is involved. If the record owner is to use the services from the transaction engine 150, the record owner sends, at 740, the request for validating certain private data to the transaction engine. Otherwise, the record owner is to interface with an appropriate trusted entity directly. In this case, the record owner determines, at 730, a trusted entity that hosts the private data at issue and then sends, at 735, the request for validating the private data to the trusted entity.

At 745, the record owner is authenticated in order to move forward with the validation request. The authentication may be performed as a security measure. As discussed herein, although the authentication step is presented in FIG. 7 after the request for validation is sent, the authentication may also be performed at a different time or with respect to different party (or parties). For instance, the authentication may be performed on the record owner's device prior to the step 720, i.e., ascertaining the person operating the device is whom he/she claims to be before generating a validation request. The authentication may also be performed with the trusted entity or the transaction engine prior to the request for validating private data is sent so that the request is sent only after the receiving side (either the trusted entity or the transaction engine) makes sure that the person who intends to initiate the validation process is whom he/she claims to be. The authentication may also be performed after the request for validation is sent to the recipient so that the recipient side (a trusted entity or the transaction engine) can ascertain that the person who sends the request is whom he/she claims to be before the recipient moves forward with the next steps.

Upon successful authentication, the trusted entity (either as the direct recipient of the request or the ultimate recipient of the request from the transaction engine) generates, at 750, a cloaked identifier corresponding to the request and saves, at 755, a STP with access limitations (access restrictions, inquiry types, etc.) at the secure transaction platform 170. The generated cloaked identifier is then sent out, at 760, to the record owner (if direct) or the transaction engine. When the record owner receives the cloaked identifier, either directly or indirectly via the transaction engine, it forwards it to the service provider at 765. Upon receiving the cloaked identifier, the service provider sends, at 770, the cloaked identifier with additional information related to the access to either the trusted entity or the transaction engine to seek a validation response to its inquiry related to the private data at issue.

Upon receiving (either from the service provider directly or indirectly via the transaction engine) the cloaked identifier and the additional information specifying the inquiry directed to the private data at issue and the access information, the trusted entity accesses, at 775, the STP previously stored so that the access limitations associated with the private data may be evaluated based on the inquiry specified as well as the access information associated with the service provider. The trusted entity then generates, at 780, a validation response with respect to the private data and sends, at 785, such generated validation request to the service provider (either directly or via the transaction engine). The validation response may be either a rejection, if any of the access limitations is violated, or a response directed to the validity of the private data and formulated based on the inquiry (e.g., Boolean or an answer to a question or the private data itself).

Upon receiving the validation response, the service provider then verifies, at 790, whether the validation response satisfies the transaction requirement and completes, at 795, the transaction if the validation response indicates that the prerequisite conditions associated with the transaction have been met. If the validation response indicates that the prerequisite conditions are not met, the service provider may not proceed with the transaction (not shown).

FIG. 7 is a general operational flow of the framework 100 and it may not include all other possible operational steps needed such as how the transaction engine 150 plays a middle man role, etc. However, such possible operational arrangements have been discussed throughout the disclosure of the present teaching so that the specific steps as listed in FIG. 7 are not to be used as limitations to the present teaching but rather merely serve as an illustration.

In the above paragraphs, various functional roles and relationships among different parties or sub-groups of parties in the context of self-sovereign data management framework 100 are described. Below, exemplary implementations of each of the parties involved in the framework 100 will be provided. The illustrated exemplary implementations of different parties to be presented herein are merely illustrative and do not serve as limitations to the present teaching. It is understood that any alternative embodiment, operational flow, implementations of any of the parties in framework 100, and relationships among them devised to achieve the disclosed roles of the parties is within the scope of the present teaching.

Figure 8A:
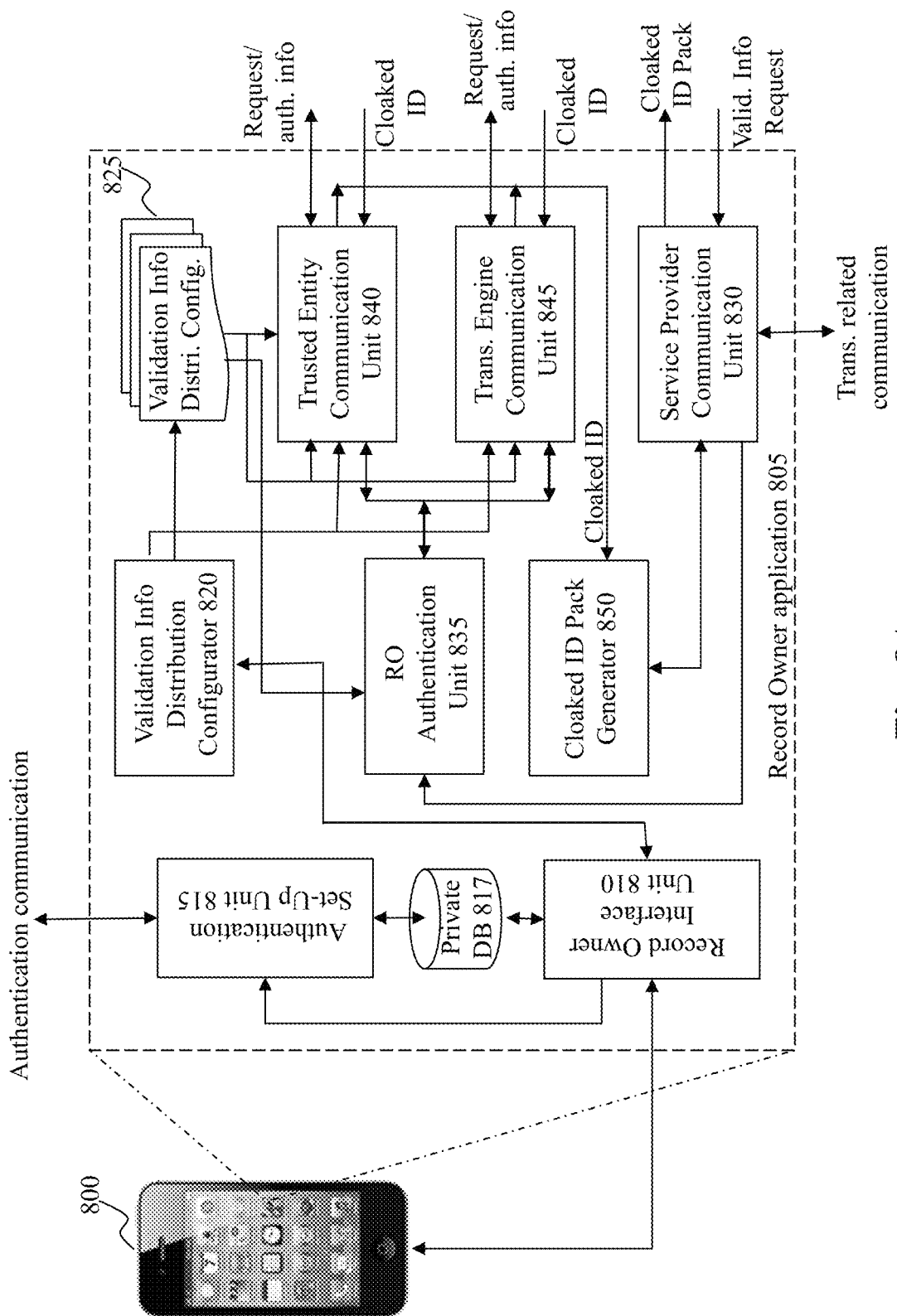
FIG. 8A depicts an exemplary high level system diagram of a record owner application for secure self-sovereign information management, according to an embodiment of the present teaching.

FIG. 8A depicts an exemplary high level system diagram of the record owner system, according to an embodiment of the present teaching. As discussed previously, the record owner 110 operates to play a role in the context of self-sovereign data management framework 100 via a record owner device or an application running on the record device to perform the functions of the record owner to manage secure data and transactions related thereto. So, the record owner system as disclosed herein may correspond to such an application provided for facilitate the record owner to play the role as disclosed. It may also correspond to a specialized device as a special purpose record owner device enabling its user to play the role as a record owner in the context of the self-sovereign data management framework 100.

In this illustrated embodiment, a record owner device 800 may have a record owner application 805 installed thereon which, when running on the device 800, facilitates a record owner's interface with other parties in framework 100 (see FIG. 1) and to carry out different tasks associated with a record owner in data management in a self-sovereign manner. The record owner application 805 comprises a record owner interface unit 810, an authentication set-up unit 815, a validation information distribution configurator 820, a record owner authentication unit 835, a cloaked ID pack generator 850, and various communication units with other parties, including a trusted entity communication unit 840, a transaction engine communication unit 845, and a service provider communication unit 830.

Among these components, some are provided for interface with the record owner for, e.g., setting up required operational parameters (partitions of secure/private data, access restrictions for different pieces of data, authentication information/parameters, etc.). This includes the record owner interface unit 810, the validation information distribution configurator 820, and the authentication set-up unit 815. During the set up time, the record owner may communicate with the record owner application 805 via the record owner interface unit 810, which connects with, e.g., the validation information distribution configurator 820 to specify which secure/private data reside where with what access restrictions.

As disclosed herein, the record owner may elect to manage the secure data his/herself. In this case, the record owner may achieve that by interact with the validation information distribution configurator 820 (via the record owner interface unit 810) that may connect with different trusted entities via the trusted entity communication unit 840 to provide any specified information by the record owner to any of the trusted entities. If the record owner is to subscribe to services from the transaction engine 150 for self-sovereign data management, the record owner interfaces with the record owner application 805 via the interface 810, which connects with the validation information distribution configurator 820 to facilitate the record owner to set up data partitions with meta information for each of such partitions. Such set up information is then provided by the validation information distribution configurator 820 to the transaction engine 150 via the transaction engine communication unit 845. The data partition distribution configurations that are set up in this manner may also be stored locally at the record owner device in addition to being stored at the relevant parties (e.g., at the trusted entities or at the transaction engine 150). This will assist the record owners in identifying the source of each piece of private data whenever validation of the piece of data is required.

During the setup, the record owner may also set up the authentication information to be used for future authentication. As discussed previously, the authentication may be performed at the record owner application 805 on record owner device 800 or with respect to a service provider, e.g., the transaction engine or a trusted entity. To set up the authentication with the record owner application 805, the record owner interfaces with the record owner interface unit 810, which connects with the authentication set-up unit 815 to establish the authentication information. As discussed herein, the user may elect to apply biometric or non-biometric authentication information or any combination thereof. Non-biometric authentication information may include password and Q&As and biometric information for authentication may include fingerprint, palm, veins, face, or iris. Such established authentication information and the authentication protocol may be saved in the local private database 817 and later such information may be retrieved for authentication of a record owner at the application level.

The authentication information and protocol may also be established with respect to a service provider, whether it is a trusted entity or the transaction engine 150. In this case, the authentication set-up unit 815 communicates with the service provider to achieve the set up. This may also be accomplished via the trusted entity communication unit 840 or the transaction engine communication unit 845, respectively (the connections internal to the application 805 are not shown). In some embodiments, to set up the authentication information with a service provider, the form (biometric or non-biometric or a combination thereof) and base authentication information (e.g., password, Q&As, biometric information for authentication) may be stored at the service provider so that the record owner may present any authentication information the service provider requests on-the-fly for authenticating a record owner during a validation session. Details on authentication are provided with references to FIGS. 18A-27B.

Figure 8B:
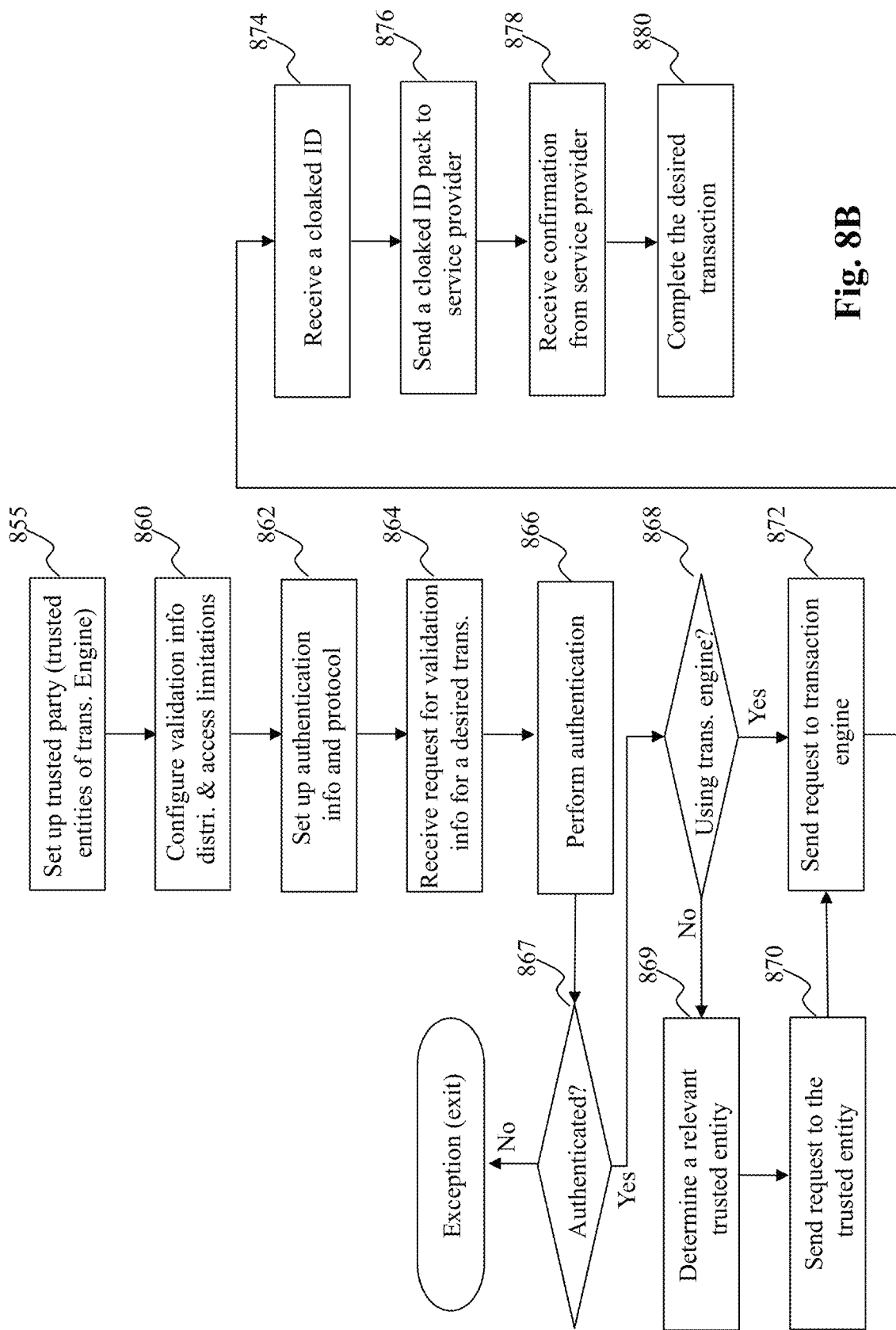
FIG. 8B is a flowchart of an exemplary process of a record owner application for secure self-sovereign information management, according to an embodiment of the present teaching.

FIG. 8B is a flowchart of an exemplary process of a record owner system, according to an embodiment of the present teaching. Steps 855-862 are performed for the initial set up. Specifically, at 855, the record owner may specify whether he/she will conduct self-sovereign data management directly with trusted entities or via the transaction engine 150. In some embodiments, the record owner may elect to use the transaction engine on all data management tasks. In some embodiments, the record owner may be permitted to manage some secure data via direct communication with relevant trusted entities but some secure data via the transaction engine. For each party the record owner elects to handle secure data management, the record owner sets up, at 860, validation information distribution configurations by specifying the source (trusted entity) of secure data and setting up access limitations (including restrictions as to time, count, geofence, permitted inquiry types, etc.). At 862, the record owner establishes authentication information either with the record owner application 805 or with respect to a party, e.g., either trusted entities and/or transaction engine.

In some embodiments, after the initial set up, in operation, when the record owner receives, at 864, a request from a service provider via the service provider communication unit 830 for validating certain private data for a desired transaction, the service provider communication unit 830 invokes the record owner authentication unit 835 to perform authentication of the record owner. If the authentication fails, determined at 867, the process goes to exception handling and the operation exits so that the person who interacts with the record owner application is considered invalid and not permitted to operate further. The authentication may be performed locally at the record owner device or remotely with respect to a party (either a trusted entity or the transaction engine) that hosts the secure/private data to be validated.

If the authentication is successful, determined at 867, it is further determined, at 868, to which party (a trusted entity or the transaction engine) the request to validate the private data is to be sent. When the secure/private data management is via the transaction engine, the transaction engine communication unit 845 is invoked to send, at 872, a request for validating the secure/private data at issue to the transaction engine 150. This may be determined based on the archived validation information distribution configurations stored in 825. If the secure/private data to be validated is via a trusted entity directly, also determined based on validation information distribution configurations in 825, the trusted entity communication unit 840 is invoked to send a request for validating the secure/private data at issue to a designated trusted entity.

After the request for validation is sent out, the record owner application 805 receives, at 874, a cloaked identifier from the recipient of the request transmitted earlier. The record owner application 805 then invokes the cloaked identifier pack generator 850 to create a cloaked identifier pack which includes the received cloaked identifier as well as, e.g., information related to the source from which the cloaked identifier is received (a trusted entity or the transaction engine). The cloaked identifier pack is sent, at 876, to the service provider via the service provider communication unit 830. When the service provider communication unit 830 subsequently receives, at 878, a confirmation from the service provider as to the validity of the secure/private data, the record owner application proceeds to complete, at 880, the intended transaction.

The record owner device and record owner application 805 are described to achieve certain functionalities to enable a record owner to play his/her role in the self-sovereign data management scheme as disclosed herein. These are merely illustrative and exemplary and do not limit the record owner device and application by any means. Additional features and functionalities may be incorporated in the record owner application to provide additional capacities to handle more potential related tasks.

Figure 9A:
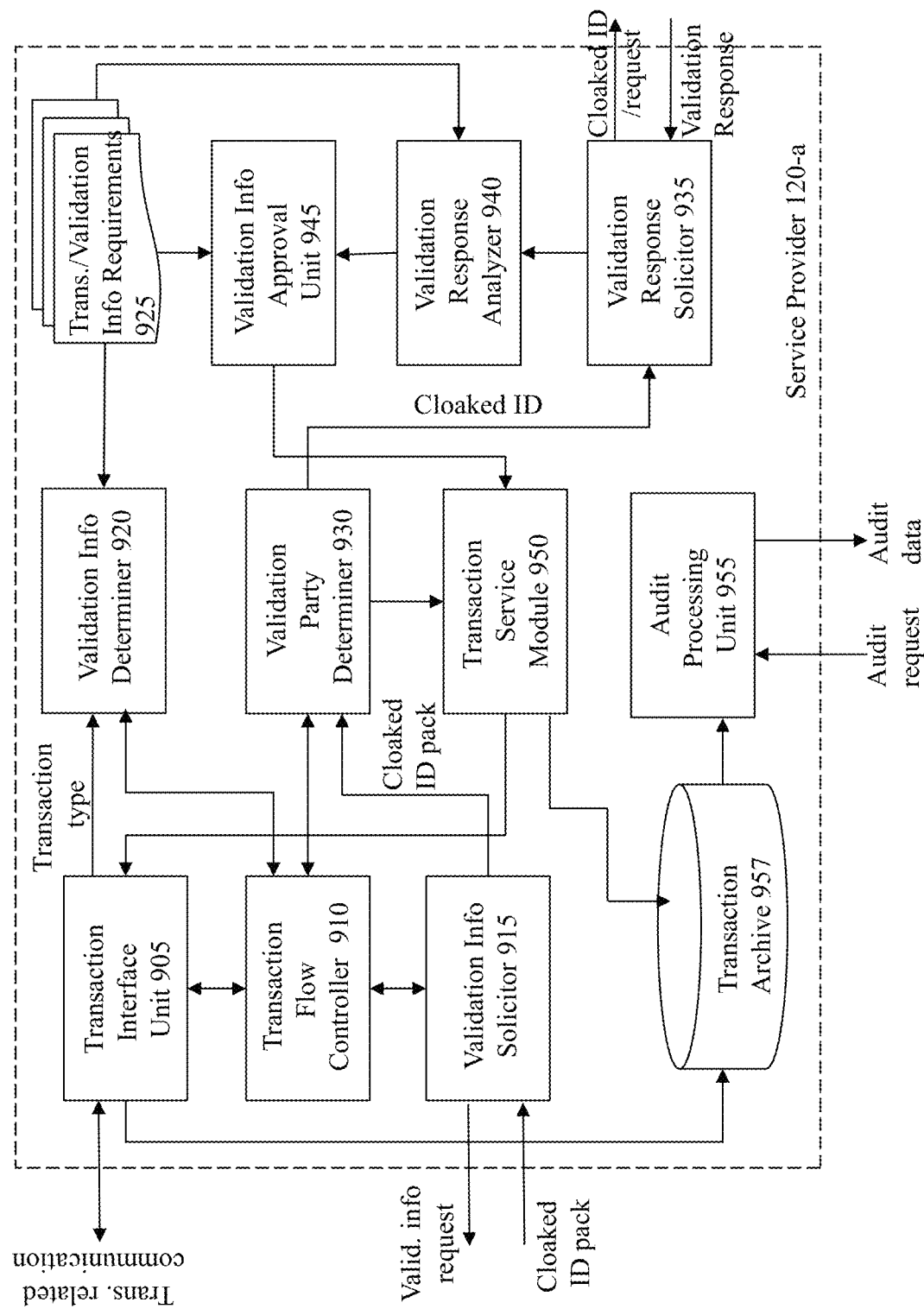
FIG. 9A depicts an exemplary high level system diagram of a service provider system operating for secure self-sovereign information management, according to an embodiment of the present teaching.

FIG. 9A depicts an exemplary high level system diagram of the service provider system, such as service provider 120-*a*, according to an embodiment of the present teaching. As described in several embodiments, service providers, such as service provider 120-*a*, interface with multiple parties in the self-sovereign data management framework 100, including a record owner, a trusted entity, and optionally the transaction engine. To achieve that, the service provider 120-*a* may be implemented with certain functional modules which may include a transaction interface unit 905, a transaction flow controller 910, a validation information solicitor 915, a validation information determiner 920, a validation party determiner 930, a transaction service module 950, a validation information approval unit 945, a validation response analyzer 940, and a validation response solicitor 935. In some embodiments, there is an optional audit processing unit 955.

Figure 9B:
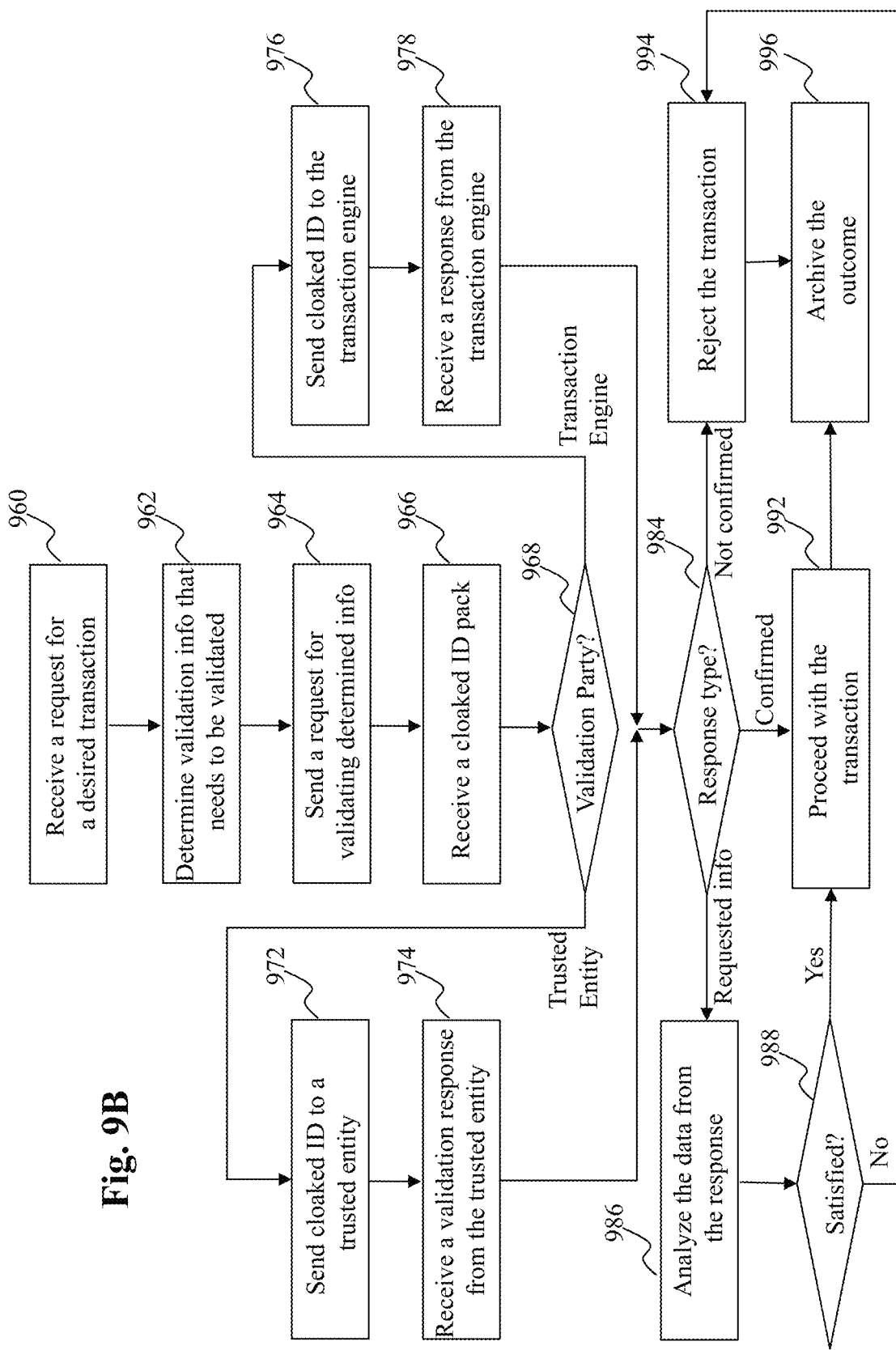
FIG. 9B is a flowchart of an exemplary process of a service provider system operating for secure self-sovereign information management, according to an embodiment of the present teaching.

FIG. 9B is a flowchart of an exemplary process of the service provider system 120-*a*, according to an embodiment of the present teaching. The exemplary flow is devised consistent with the system diagram as depicted in FIG. 9A. As the system diagram and implementation shown in FIG. 9A are merely illustrative, rather than limiting, the flow as provided in FIG. 9B is also illustrative in order to allow a service provider to play a role in the self-sovereign data management framework 100. Additional features and flow steps may be incorporated to achieve additional functionalities within the framework and such additional steps and flows are still within the scope of the present teaching.

As shown in FIG. 9B, at step 960, the transaction interface 905 receives a request from a record owner for a desired transaction. The desired transaction may be communicated to the transaction flow controller 910 to carry out steps needed to conduct the transaction. As described herein, to proceed with the transaction, certain private data may need to be validated. To do so, the transaction flow controller 910 may invoke the validation information determiner 920 to check with stored transaction/validation information requirements stored in 925 in order to determine, at 962, certain private information that needs to be validated for the desired transaction. The determination may be made based on, e.g., the transaction type, the state and regulations that are applicable to the type of transaction, etc. For example, if a record owner desires to buy a case of beer in the state of Maryland, according to the requirements related to drinking age of Maryland stored in the transaction/validation information requirements in 925, it may be determined that the record owner has to satisfy the drinking age of 21. Such determined validation information may then be sent to the transaction flow controller 910 to proceed to the next step.

To seek validation of the relevant private data, the transaction flow controller 910 may invoke the validation information solicitor 915, which then sends, at 964, a request to the record owner to initiate the validation process. As discussed above with respect to record owner in FIGS. 8A-8B, the record owner may then contact appropriate party (a trusted entity or the transaction engine 150) to seek the validation of private data. In the illustrated embodiments, the record owner will receive a cloaked identifier from the party, generate a cloaked identifier pack, and sent to the service provider.

When the validation information solicitor 915 of the service provider receives, at 966, the cloaked identifier pack, it may invoke the validation party determiner 930, which may extract, from the cloaked identifier pack, information that specifies to whom (a trusted entity or the transaction engine), determined at 968, the service provider is to send a validation request. If the record owner specifies a specific trusted entity to which the service provider will contact, the validation party determiner 930 invokes the validation response solicitor 935 to send, at 972, the cloaked identifier (e.g., extracted also from the cloaked identifier pack) in a request that may indicate, e.g., the private data to be validated and/or the type of validation response sought (e.g., Boolean, answer, or data). After the request is sent to the specified validation party, the validation response solicitor 935 receives, at 974, a validation response from the trusted entity as a response to the validation request.

If the record owner specifies that the service provider is to contact the transaction engine 150 for requesting a validation response, the validation party determiner 930 invokes the validation response solicitor 935 to send, at 976, the cloaked identifier (e.g., extracted also from the cloaked identifier pack) in a request that may indicate, e.g., the private data to be validated and/or the type of validation response sought (e.g., Boolean, answer, or data). After the request is sent to the specified validation party, the validation response solicitor 935 receives, at 978, a validation response from the transaction engine 150 as a response to the validation request Upon receiving the validation response, the validation response solicitor 935 may invoke the validation response analyzer 940 to assess whether the validation response satisfies the required prerequisite condition for the desired transaction. To do so, the validation response analyzer 940 may invoke the validation information approval unit 945, which may first determine, at 984, the type of the validation received. When the validation response is a Boolean response corresponding to a Boolean response request, it is further determined whether the validation response satisfies what is required. Continuing with the same example of the required drinking age when purchasing beers, if the requested validation is whether the record owner is older than 21 years old, a validation response of "yes" (or confirmed) indicates that the prerequisite is met. Otherwise, the prerequisite for the transaction is not met.

When the validation response confirms the prerequisite condition, the validation information approval unit 945 may invoke the transaction service module 950 to proceed, at 992, with the desired transaction. In this case, the transaction service module 950 may coordinate with the transaction interface unit 905 to carry out the transaction with the record owner. If the Boolean validation response does not confirm the prerequisite condition of the transaction, the transaction service module 950 may then reject, at 994, the transaction request and via the transaction interface unit 905 inform the record owner of the decision. Whether the transaction is carried out or rejected, the transaction service module 950 archives, at 996, the outcome of the session in a transaction archive 957. What is being archived may include, e.g., the type of transaction, the record owner involved, the type of private data that need to be validated based on which regulation under which jurisdiction, the received validation response, the decision made by the service provider as to how to proceed based on the validation response, and the subsequent actions taken to carry out the decision (proceed with the transaction or reject the transaction). Such archives may also include other peripheral information such as the time of the session, the validation entity involved (a specific trusted entity or the transaction engine), the criteria used at the time to reach the decision, etc. Such archived data may later be retrieved for different purposes such as for auditing purposes to ensure, e.g., enforcement of regulations.

As discussed herein, in some situations, the requested validation response may involve a non-Boolean response. In such situations, the validation response is analyzed by the validation information approval unit 945, e.g., based on the requirements stored in 925. For example, if the validation response requested is an answer to a question, the name of a city in which the record owner was born, the answer may then be compared with an expected answer, e.g., stored in 925. The outcome of the comparison may then be used to determine, at 988, whether the prerequisite to the transaction is satisfied. If the prerequisite is satisfied, the transaction service module 950 may proceed with the transaction, at 992, with the record owner via, e.g., the transaction interface unit 905. Otherwise, the transaction service module 950 rejects, at 994, the transaction. Similarly, whether the transaction is carried out or rejected, the transaction service module 950 archives, at 996, the outcome of the session in a transaction archive 957.

In some embodiments, a request for validation response may specify more than one type of response directed to, e.g., more than one piece of private data. For example, in order for a record owner to receive a certain benefit under some government regulation, the record owner may be required to show that he is both under 18 years old and the city he/she lives in. If that is the case, the cloaked identifier pack may incorporate information specifying one or more parties for providing the validation and the service provider may formulate the request for validation response in order to solicit both a Boolean request, e.g., on whether the record owner is under 18 years old, and a request for an answer as to the name of the city the record owner lives in. With such a request for multiple validation responses, especially different types of responses, the steps of 984-996 may be repeated (not shown) until all responses satisfy the required prerequisite conditions or any one of the validation responses does not meet the requirements so that the transaction is rejected.

The archived information in 957 related to any transaction sessions (whether concluded with transactions or not) may be retrieved according to needs for different purposes. One example of such use is for auditing. In the illustrated embodiment, the audit processing unit 955 may handle such tasks. Upon receiving an audit request, the audit processing unit 955 may access the transaction archive 957 based on the request and then return the retrieved transaction records related to the audit request. Such retrieved audit data is then returned to the party who makes the audit request. Examples of such a party requesting an audit include law enforcement organization such as health service department to enforce the drinking age law, security related organizations to enforce security related regulations, e.g., who can enter which parts of certain federal government buildings with what level of security clearance certification. A more detailed operational flow related to the auditing function of different parties operating in the self-sovereign data management framework 100 are provided with reference to FIG. 14.

Figure 10:
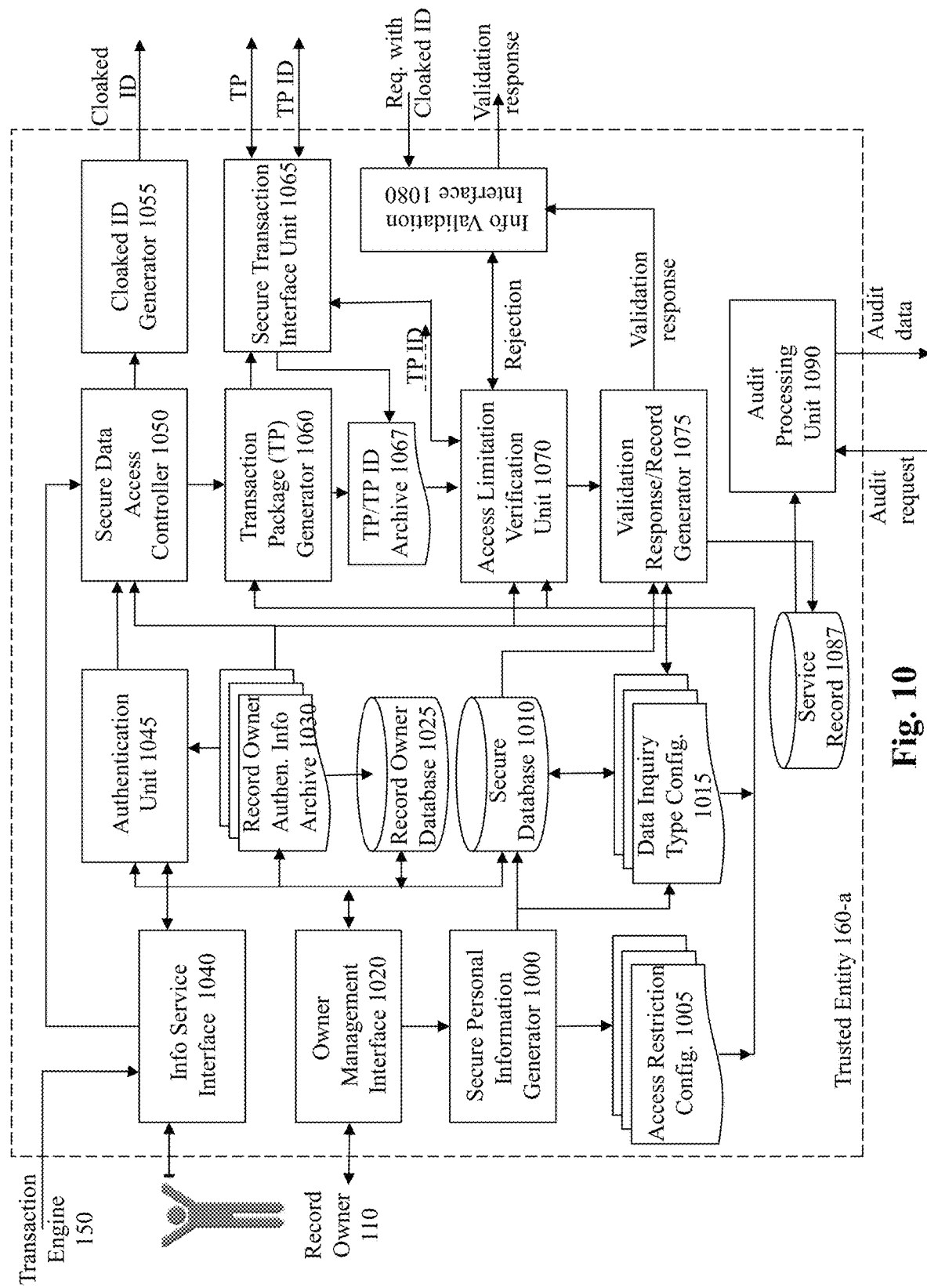
FIG. 10 depicts an exemplary high level system diagram of a trusted entity system for secure self-sovereign information management, according to an embodiment of the present teaching.

FIG. 10 depicts an exemplary high level system diagram of a trusted entity system, say 160-*a*, according to an embodiment of the present teaching. A trusted entity is one that has some secure/private data of record owners in its possession and is in a position to provide different types of validation responses with respect to corresponding types of inquiries. In some embodiments, a trusted entity interfaces directly with a record owner and a service provider to validate, to the service provider, certain data associated with the record owner to facilitate a potential transaction desired by the record owner and the service provider. In other embodiments, a trusted entity may instead interface with the transaction engine 150 when a record owner and, hence, a service provider carry out the prerequisite validation session by operating in a mode whereby all communication with the trusted entity is via the transaction engine 150.

A trusted entity may perform functions involved in different stages of the private data validation services. In some embodiments, there may be three stages. A first stage may be for creating secure/private data for record owners, setting up access restrictions as well as permitted types of inquiries for different piece of private data, and establishing required authentication information for record owners for security reasons. A second stage may involve operations in response to a validation request from and sending a cloaked identifier for the request to the record owner or the transaction engine 150 (on behalf of the record owner) that made the request. A third stage may involve operations to process a request for validation response from and providing the requested validation response to either a service provider or the transaction engine 150 (on behalf of the service provider).

Figure 11A:
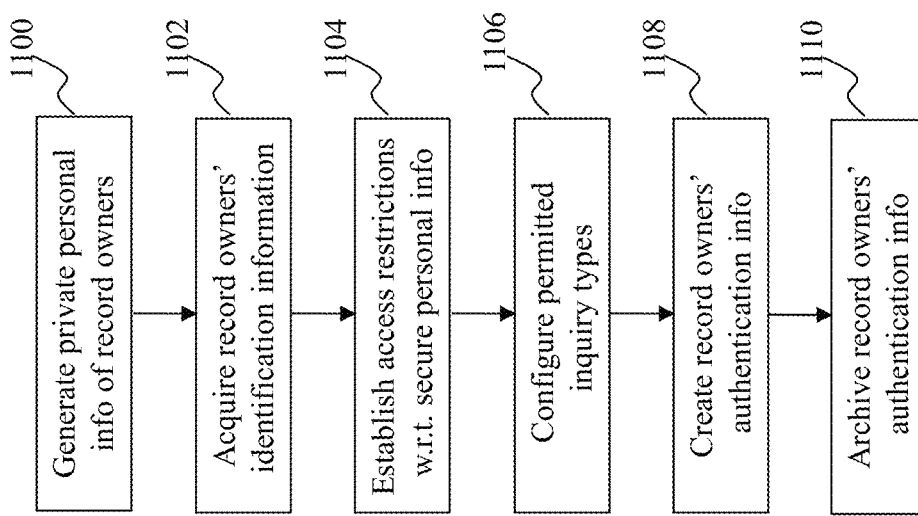
FIGS. 11A-11D are flowcharts of exemplary processes of a trusted entity system for secure self-sovereign information management, according to an embodiment of the present teaching.

In some embodiments, for the operations in the first stage, the trusted entity 160-*a* includes various components to accomplish related functions. For example, the trusted entity 160-*a* comprises an owner management interface 1020, a secure personal information generator 1000, and an authentication unit 1045. At this stage, owner secure/private data may be generated and securely stored, access limitations (access restrictions and permitted inquiry types, etc.) may be set up for individual information pieces, and authentication information may also be established. FIG. 11A is a flowchart of an exemplary process of the first stage processing of a trusted entity, according to some embodiments of the present teaching. At 1100, secure/private information of record owners may be generated via either the secure personal information generator 1000 or via the owner management interface 1020. In some situations, the trusted entity may create personal private data such as a hospital creating the birth information for each new baby born at the hospital. In other situations, personal private data may be provided by the record owners via, e.g., the owner management interface 1020. For example, a record owner may go to a bank to open a saving account with, e.g., personal information such as different types of financial information.

When some private data is generated for a record owner, identification information of the record owner is acquired at 1102. For example, identification information of each baby born at a hospital is usually taken at birth as personal identification of the baby. Such identification information may also be provided by a record owner via the owner management interface 1020. For instance, a person goes to a bank to set up an account may provide personal identification information to the bank. Once such secure/private data is created, whether by the trusted entity or provided by record owners, may then be stored at the trusted entity. As illustrated, a secure database 1010 (managed by the trusted entity) may be used to store secure/private data of different record owners and a record owner database 1025 may be used to store information related to the services, e.g., user identification information, service terms, etc. that may include indices to the secure database 1010 to different pieces of secure/private data related to each corresponding record owner.

During this first operational stage, the trusted entity 160-*a* may also interface with a record owner to set up access limitations related to the data such as access restrictions to the secure/private data as well as the types of inquiries permitted. Such limitations may be specified by the record owner, e.g., via the owner management interface 1020, or by the trusted entity based on, e.g., a service terms for the service provided to the record owner. For example, some service offered may allow only Boolean inquiries and does not permit release of any secure/private data. As discussed herein with respect to FIGS. 3E-3G. The access restrictions with respect to each record owner and each piece of data are set up at 1104 and may be stored in access restriction configurations 1005. Configurations for permitted types of inquiries with respect to each piece of secure data stored for each record owner are set up at 1106 and may be stored in storage 1015.

To enable future services, the trusted entity may also set up, at 1108 of FIG. 11A, the authentication protocol for each record owner via the authentication unit 1045. The authentication information may include non-biometric and biometric information. The created authentication information and authentication protocol may then be saved, at 1110, in record owner authentication information archive 1030, which may store authentication information and/or the authentication protocol information. For example, the stored authentication information may include biometric information of record owners such as visual representations for iris, fingerprints, faces, palms, etc. of the record owners, or non-biometric information such as Q&As, security passcode, etc. The record owner authentication information archive 1030 may also store other relevant information such as information linking authentication information of a record owner to appropriate records in both the record owner database 1025 (e.g., identification information) and the secure database (e.g., where the secure/private data is actually stored).

Figure 11B:
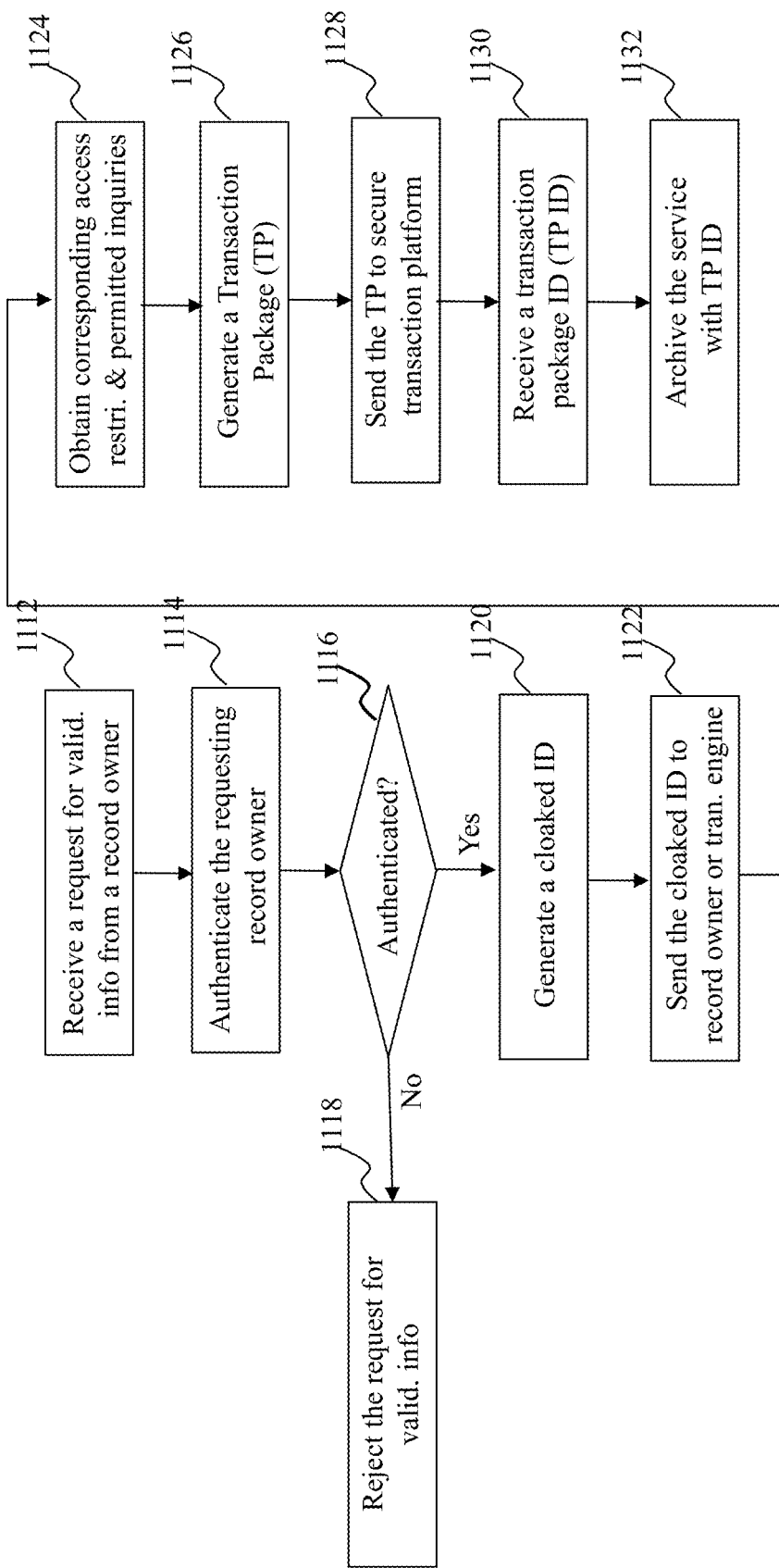

The operations of the second stage at a trusted entity involve the initial processing of a request for validating certain private of a specific record owner. The request can be from the record owner or from the transaction engine 150 on behalf of the record owner. To facilitate the operations of this stage, the trusted entity comprises an information service interface 1040, the authentication unit 1045, a secure data access controller 1050, a cloaked identifier generator 1055, a transaction package generator 1060, and a secure transaction interface unit 1065. FIG. 11B is a flowchart of an exemplary process for processing in the second stage of the trusted entity, according to some embodiments of the present teaching. In operation, when the information service interface 1040 receives, at 1112, a request (from either a record owner or from the transaction engine on behalf of the record owner) for validating some private data associated with the record owner, the information service interface 1040 invokes the authentication unit 1045 to authenticate, at 1114, the record owner based on the authentication information and/or authentication protocol stored in the record owner authentication information archive 1030. If the authentication fails, determined at 1116, the trusted entity rejects, at 1118, the request for validation.

If the authentication of the record owner is successful, the process proceeds to invoke the secure data access controller 1050 to initiate the requested invalidation. To do so, the secure data access controller 1050 invokes the cloaked identifier generator 1055 to generate, at 1120, a cloaked identifier associated with the request and to send, at 1122, to the party that sent the request (either the record owner or the transaction engine on behalf of the record owner) the cloaked identifier. The secure data access controller 1050 may also invoke the transaction package (TP) generator 1060 to generate a transaction package to facilitate the processing at the third stage. As discussed herein, access limitations, including access restrictions and permitted inquiry types with respect to the private data at issue as illustrated in FIGS. 3E-3G, may be packaged into the TP corresponding to the cloaked identifier (or the request) and stored so that during the operation of the third stage can be checked against to ensure appropriate access.

To generate a TP corresponding to the cloaked identifier for the request, the transaction package generator 1060 retrieves, at 1124, access restrictions and/or permitted inquiry types associated with the piece(s) of private information to be validated and then generates, at 1126, a TP based on such relevant limitations. The secure transaction interface unit 1065 is then invoked to send, at 1128, the generated TP to the secure transaction platform 170 and receive, at 1130, a TP ID as a unique identifier to identify the TP from the secure transaction platform 170. The received TP ID is then archived, at 1132, in a TP/TP ID archive 1067. In some embodiments, the cloaked identifier and the TP ID may be stored as a pair to facilitate the operation of verifying whether the access conditions present satisfy the access limitations related to the private data at issue (during the operation at the third stage as discussed below).

In some situations, the trusted entity 160-a interfaces with the transaction engine 150 in handling requests for validation responses from service providers associated with record owners that use services from the transaction engine. In this case, the transaction engine 150 may interface with the trusted entity for the service providers (e.g., because the record owners who desire transactions with the service providers use services from the transaction engine). In this case, the trusted entity may be made aware of the arrangement by such record owners. In some embodiments, the trusted entity may even store some authorization information from the record owners to permit the transaction engine to act on behalf of the record owners. In this case, each time, when the trusted entity receives a request from the transaction engine, it may first make sure that the request received from the transaction engine is authorized by the record owner associated with the request.

Figure 11C:
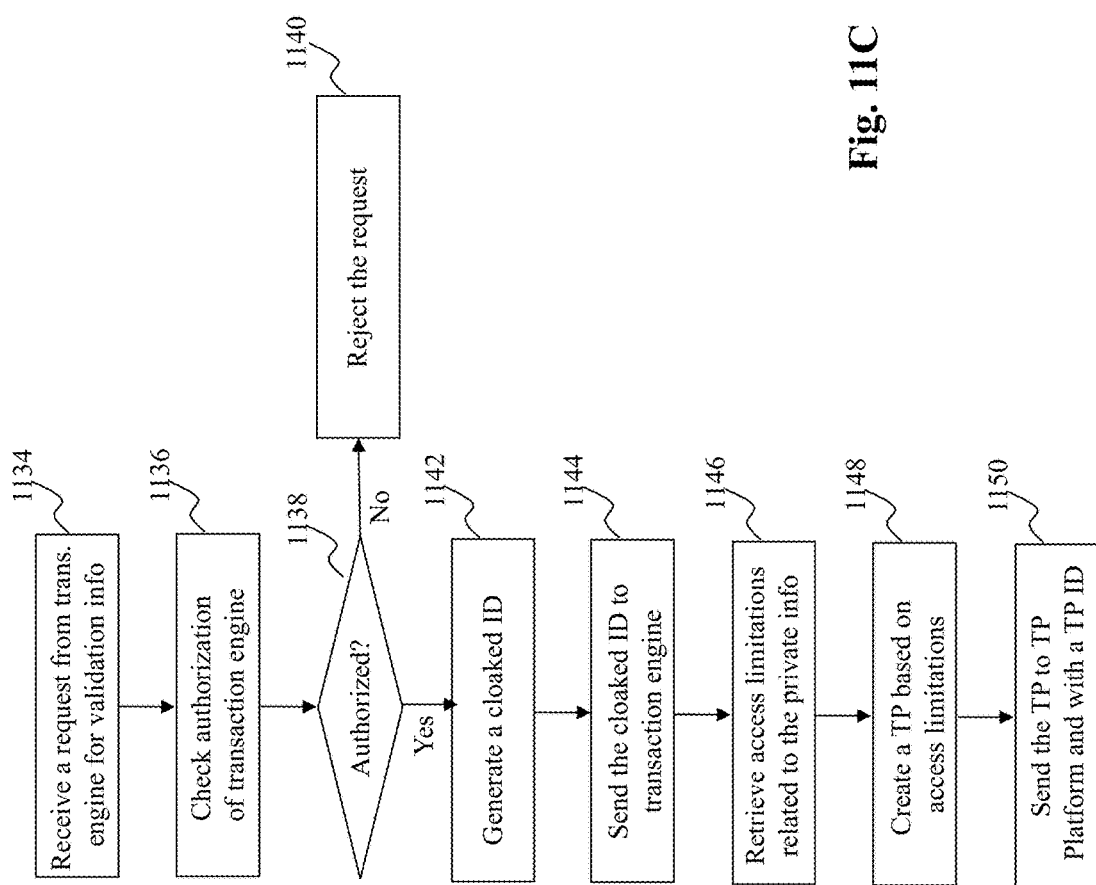

FIG. 11C is a flowchart of an exemplary process of the trusted entity when receiving a validation request from the transaction engine 150, according to some embodiments of the present teaching. When the trusted entity receives, at 1134, a validation request from the transaction engine 150, it may first check, at 1136, whether the transaction engine is authorized to represent the record owner associated with the request. If the transaction engine is authorized, determined at 1138, the trusted entity generates, at 1142, a cloaked identifier associated with the request and sends, at 1144, the cloaked identifier to the transaction engine 150. To facilitate operations in the third stage, the trusted entity then retrieves, at 1146, access limitations associated with the private data of the record owner in questions and creates, at 1148, a TP based on the retrieved limitations. The TP is then sent to the secure transaction platform and with a received TP ID, which is then stored with the cloaked identifier in the TO/TP IS archive 1067 (as described above).

The operations of the third stage at a trusted entity involve processing of a request for a validation response with a previously issued cloaked identifier directed to some inquiry of some type(s) specified in the response. In the third stage, the trusted entity interfaces with either a service provider that desires to enter into a transaction with the record owner or with the transaction engine 150 that sends the request on behalf of the service provider. To facilitate the operations of the third stage, the trusted entity 160-a comprises an information validation interface 1080, the secure transaction interface unit 1065, an access limitation verification unit 1070. And a validation response/record generator 1075.

Figure 11D:
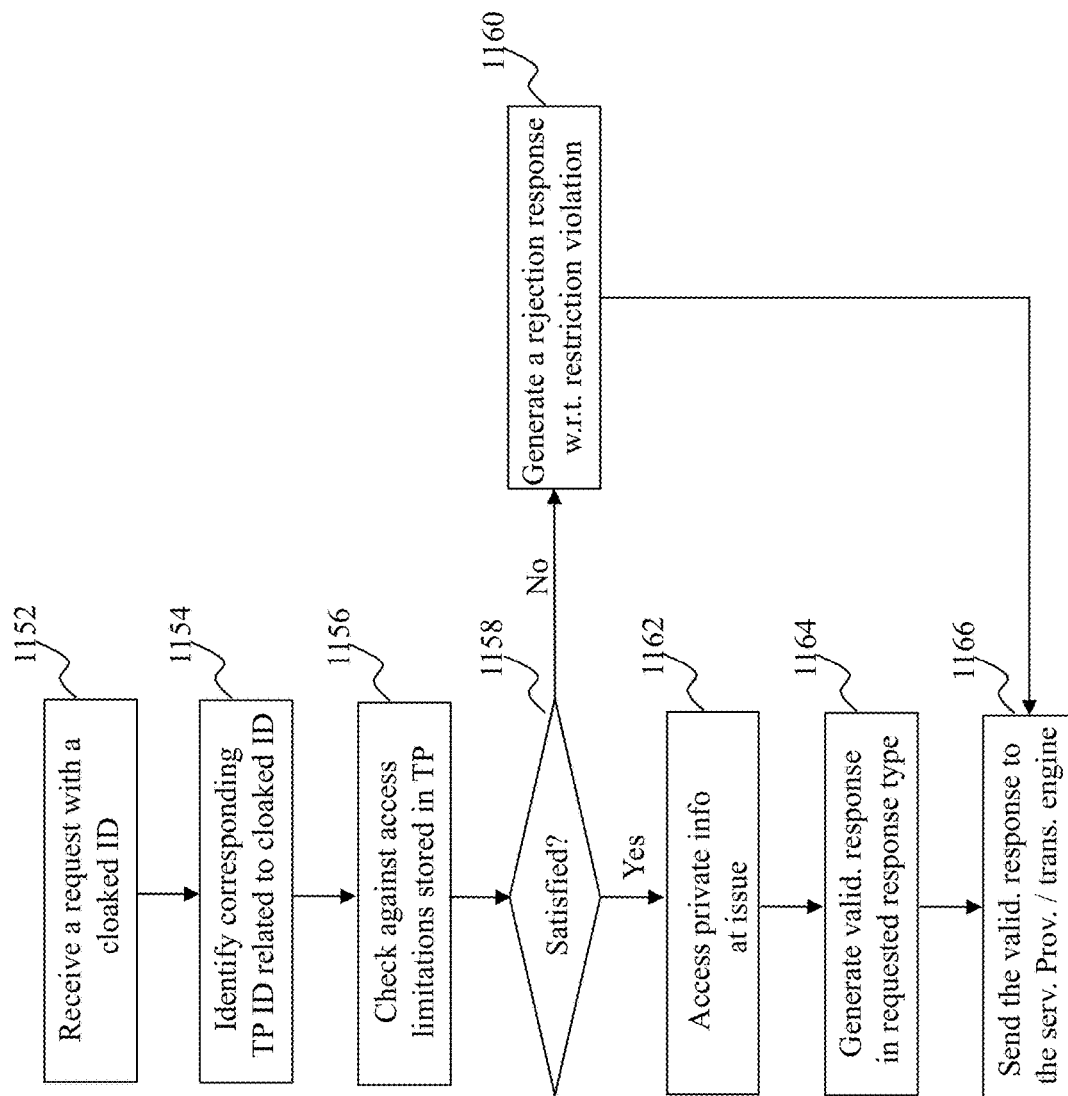

In operation, the third stage processing is initiated when the information validation interface 1080 receives a request for a validation response with a cloaked identifier. FIG. 11D is a flowchart of an exemplary process of a trusted entity in response to the request for a validation response with a cloaked identifier, according to some embodiments of the present teaching. The received request may be from a service provider or from the transaction engine 150. As discussed previously, the request may include various peripheral or meta data, e.g., information related to the access, the inquiry directed to certain private data of a record owner, the type of validation response sought. Examples of peripheral data related to the access may include, e.g., date/time, a current number of requests for the same inquiry, the geographical locale where the request is originated, . . . , etc. Examples of the inquiry directed to certain private data of a record owner can be, e.g., inquiries about whether the record owner with a certain identification information is 21 years old or older. An example of the type of validation response is a Boolean response (yes or no).

Upon receiving the request at 1152, the information validation interface 1080 invokes the access limitation verification unit 1070 to check whether the peripheral information related to the access (contained in the request) satisfies the access limitations stored in the previously stored TP corresponding to the cloaked identifier received. To do so, the access limitation verification unit 1070 identifies, at 1154, the TP ID that corresponds to the received cloaked identifier (based on information stored in the TP/TP ID archive 1067. Based on the retrieved corresponding TP ID, the access limitation verification unit 1070 invokes the secure transaction interface unit 1065 to access the TP on the secure transaction platform 170 and check, at 1156, whether the access limitations stored in the TP are satisfied. If the access limitations are violated, determined at 1158, the access limitation verification unit 1070 creates, at 1160, a rejection response and sends it to the information validation interface 1080, which then sends to the party who sends the request for a validation response (either a service provider or the transaction engine).

If the request for a validation response meets the access limitations, the access limitation verification unit 1070 invokes the validation response/record generator 1075 to generate the requested validation response. To do so, the validation response/record generator 1075 determines, at 1162, the requested validation response type and then proceeds to generate, at 1164, the validation response based on the private data stored therein. For example, if the request seeks a Boolean response that validates whether the record owner is 21 years old, the validation response/record generator 1075 accesses the private age (or birth date) data stored in the secure database 1010 and compares that with the age (21) indicated in the inquiry. Based on the comparison result, the validation response/record generator 1075 generates the validation response accordingly and sends, at 1166, the validation response to the party who sent the request.

To keep a record of the validation, the validation response/record generator 1075 may also create a record for the validation request and save such a record in a service record database 1087. Such a record may include the information related to the request (parties involved, private date involved, date/time, geo information, inquiry made, response type requested, . . . , or the nature of the transaction if known), the actual private data as stored at the trusted entity, . . . , the outcome of the validation, and/or the validation response actually sent. Such service records may be retrieved in the future for, e.g., auditing purposes.

Figure 12:
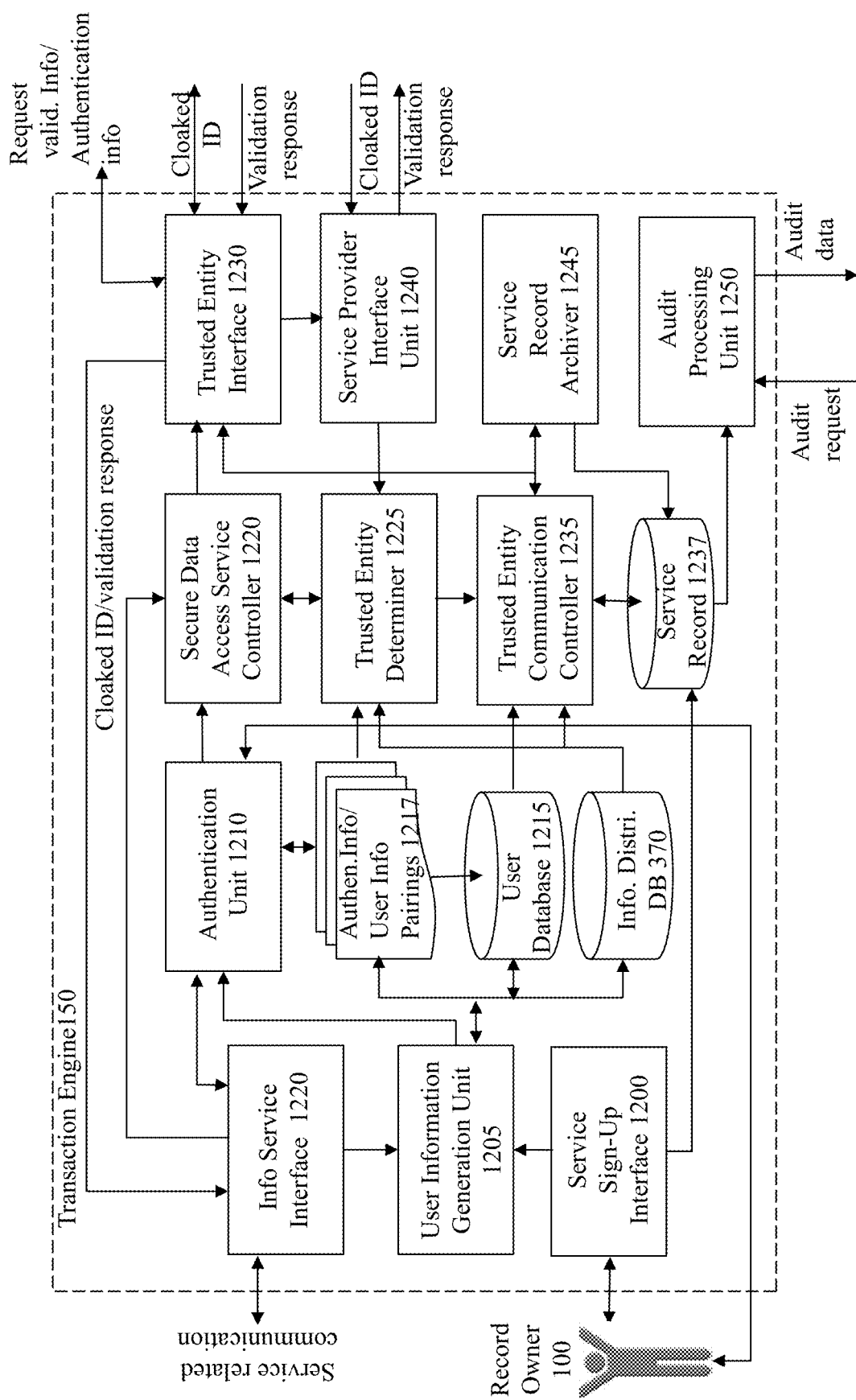
FIG. 12 depicts an exemplary high level system diagram of a transaction engine for secure self-sovereign information management, according to an embodiment of the present teaching.

FIG. 12 depicts an exemplary high level system diagram of the transaction engine 150, according to an embodiment of the present teaching. As disclosed herein, the transaction engine 150 provider services to record owners (and the service providers) related to information validation needed for transactions between record owners and service providers. That is, it is a middle man between the transaction parties (record owner and service provider) and trusted entities. Similar to a trusted entity, the transaction engine may perform its functions in different stages. In some embodiments, there may be three stages. A first stage may be for signing up record owners for information validation services, creating distribution information of secure/private data for record owners, setting up access restrictions as well as permitted types of inquiries for different pieces of private data, and establishing required authentication information for record owners for security reasons. A second stage may involve operations in response to a validation request from and sending a cloaked identifier for the request to the record owner who made the request. A third stage may involve operations to process a request for a validation response from and providing the requested validation response to a service provider.

In some embodiments, for the operations in the first stage, the transaction engine 150 includes various components to accomplish related functions. For example, the transaction engine 150 comprises a service sign-up interface 1200, a user information generation unit 1205, and an authentication unit 1210. The service sign-up interface 1200 is to interface with a record owner to sign up for services and for setting up profiles needed to carry out the services such as the record owner's profile, distribution profiles of the record owner's private data, record owner's authentication related information, . . . , and/or record owner's service related information such as account, etc.

Figure 13A:
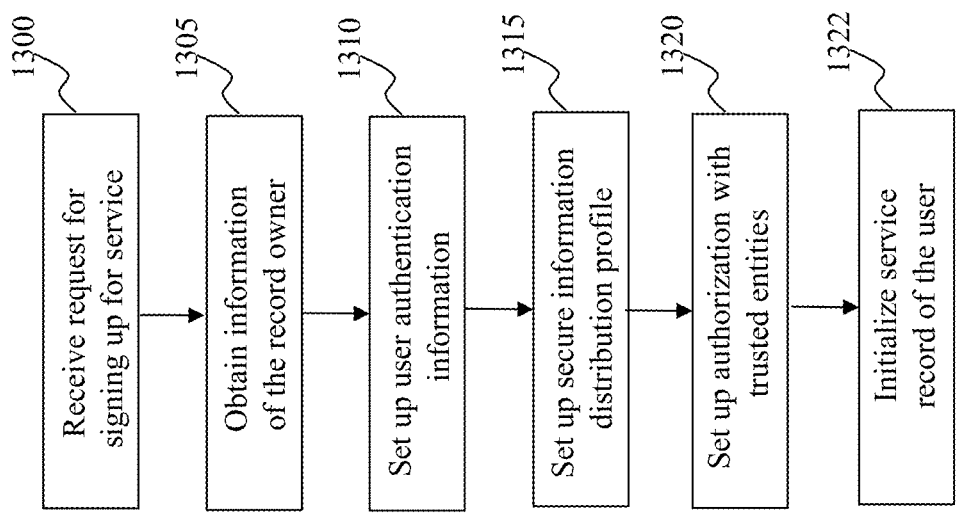
FIGS. 13A-13C are flowcharts of exemplary processes of a transaction engine for secure self-sovereign information management, according to an embodiment of the present teaching.

FIG. 13A is a flowchart of an exemplary process of the first stage processing of the transaction engine 150, according to some embodiments of the present teaching. At 1300, the service sign-up interface 1200 receives a request from a record owner (or any third party) to sign up for services for the record owner. To set up the services, the service sign-up interface 1200 invokes the user information generation unit 1205 to obtain, at 1305, information related to the record owner to establish a profile for the user, including the authentication information of the record owner. The authentication unit 1210 is invoked to set up, at 1310, the authentication information of the record owner. User profile information and authentication information are stored in a user database 1215 and the authentication user information pairing configuration storage 1217, respectively. Such stored information will be used in the future services to authenticate a record owner before proceeding to deliver the services.

To facilitate services related to private data validation, the transaction engine 150 also sets up, at 1315, a roadmap for each user (record owner) that maps each of different pieces of private data of the record owner to corresponding trusted entities that store the piece of private data. This is discussed in detail with reference to FIGS. 3E-3G. Such information distribution information for each record owner is stored in the information distribution database 370 and will be used to identify, for each service request, corresponding one or more trusted entities with which the transaction engine 150 needs to contact for validating certain private data of a record owner to deliver the requested service.

In some embodiments, the transaction engine 150 may also set up, at 1320, with respect to each of the trusted entities (that holds private data of the record owner as identified in the information distribution profile associated with the record owner), the transaction engine's authorized status as with the record owner in order to represent the record owner in future data validation services. Upon receiving information needed to proceed with the services, the service sign-up interface 1200 in the transaction engine 150 may then initialize, 1322, a service record for the record owner in a service record database 1237.

The second stage of operations of the transaction engine 150 involves the handling steps carried out in response to a service request from a record owner. In some embodiments, to carry out the operations in the second stage, the transaction engine 150 includes an information service interface 1220, the authentication unit 1210, a secure data access service controller 1220, a trusted entity determiner 1225, a trusted entity communication controller 1235, and a trusted entity interface 1230. During the operation of the second stage, the transaction engine 150 is to bridge between a record owner and a trusted entity, acting on behalf of the record owner to send a request to one or more appropriate identified trusted entities for validating certain private data of the record owner to meet a requirement associated with a transaction desired by the record owner.

Figure 13B:
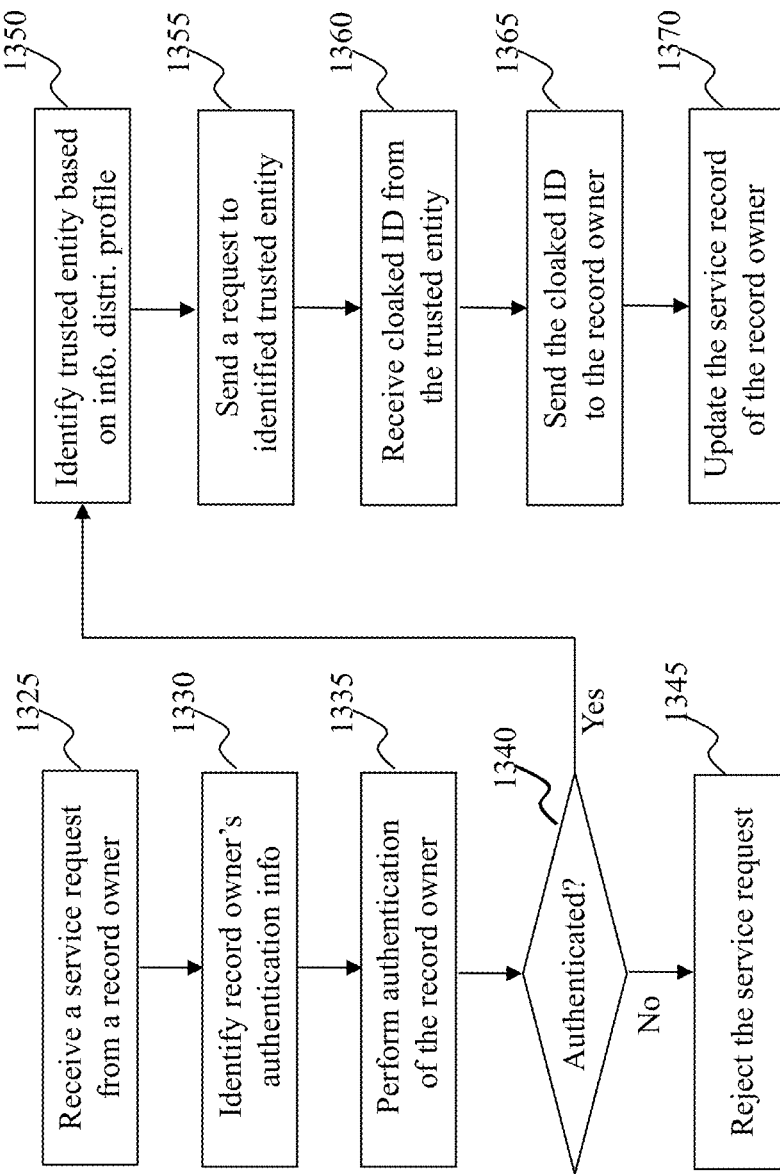

FIG. 13B is a flowchart of an exemplary process of the transaction engine in the second stage of operation, according to an embodiment of the present teaching. When the information service interface 1220 receives, at 1325, a service request from a record owner, it invokes the authentication unit 1210 to first authenticate the record owner. As discussed herein, in some embodiments, the record owner application 805 running on a record owner device may also authenticate the person operating the record owner device to ensure that the person is who he/she claims to be (the record owner). From the perspective of the transaction engine 150, the authentication may also be performed so that the transaction engine 150 can make sure that it will deliver services only to record owners who have signed up with data validation services. To do so, the authentication unit 1210 identifies, at 1330, the record owner's authentication information previously stored in the storage 1217 and performs, 1335, the authentication with respect to the record owner. The authentication may be based on non-biometric or biometric information, as discussed herein.

If the authentication fails, the authentication unit 1210 may inform the information service interface 1220 to reject, at 1345, the service request. If the authentication is successful, the secure data access service controller 1220 is invoked, which may first invoke the trusted entity determiner 1225 to identify, at 1350, one or more trusted entities associated with the private data to be validated based on the information distribution profile of the record owner (stored in storage 370). With such identified trusted entities, the trusted entity determiner 1225 invokes the trusted entity communication controller 1235, which may then invoke the trusted entity interface to send, at 1355, a request to the identified trusted entity (or entities) for validating the specified private data. When the trusted entity interface 1230 receives, at 1360, a cloaked identifier from the trusted entity, it forwards the cloaked identifier to the information service interface 1220 which then sends, at 1365, the cloaked identifier to the record owner. Upon being informed that the cloaked identifier has been sent, the trusted entity communication controller 1235 updates, at 1370, the service record of the record owner stored in the service record database 1237.

In some embodiments, once the cloaked identifier is sent to the record owner, the record owner will then generate a cloaked identifier pack incorporating additional information and send the cloaked identifier pack to the service provider so that the service provider may utilize the cloaked identifier to seek a validation response from the trusted entity. In some implementations, the service provider may contact the trusted entity identified in the cloaked identifier for the validation response. In some implementations, the service provider may seek a validation response via the transaction engine 150. In these embodiments, the remaining operation to complete the validation is completed by the transaction engine and such operational steps are carried out in the third stage at the transaction engine.

Figure 13C:
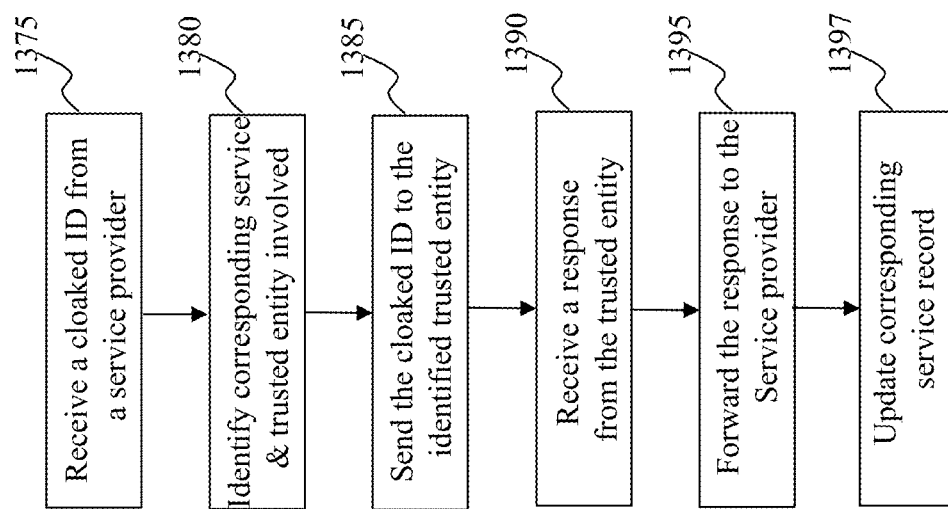

The operations of the third stage may be accomplished via a service provider interface unit 1240, the trusted entity determiner 1225, the trusted entity communication controller 1235, the trusted entity interface unit 1230, and a service record archiver 1245. As discussed herein, at this stage, upon receiving a cloaked identifier from a service provider, the transaction engine 150 is to construct a request soliciting a validation response from a relevant trusted entity. The request for a validation response may be created based on the cloaked identifier and incorporated with additional information related to the access (e.g., date/time, location, type of response requested, etc.). Such a created request for a validation response is then sent to the relevant trusted entity until the requested validation response is received from the trusted entity. The received validation response is then forwarded to the service provider. FIG. 13C is a flowchart of an exemplary process of the operational steps during the third stage of the transaction engine 150, according to an embodiment of the present teaching.

As illustrated, when the service provider interface 1240 receives, at 1375, the cloaked identifier from a service provider, the trusted entity communication controller 1235 invokes the trusted entity determiner 1225 to identify, at 1380, the trusted entity (or entities) involved and then invokes the trusted entity interface 1230 to send, at 1385, a request for a validation response to the identified trusted entity. When the trusted entity interface 1230 receives, at 1390, the requested validation response from the trusted entity, it forwards, at 1395, the received validation response to the service provider via the service provider interface unit 1240.

Although not shown, in some embodiments, upon receiving a cloaked identifier from a service provider, the service provider interface unit may access directly (instead of via the trusted entity determiner 1225) the service record associated with the received cloaked identifier (stored in storage 1237) to identify the trusted entity involved and then invoke the trusted entity interface 1230 to contact the trusted entity for a validation response. Upon receiving the requested validation response, the trusted entity interface 1230 may also invoke the service record archiver 1245 to update, at 1397, the service record associated with the record owner. Such continually updated service records may include details of each service request such as parties involved, transactions related, dates/times of the initial request from the record owners, dates/times of the request from the service providers, private data at issue, types of inquiry involved, types of validation responses solicited, dates/times of receiving the validation responses, and/or the copies of the validation responses. Such service records may be used in the future for different purposes, e.g., responding to auditing requests.

As shown in FIGS. 9A, 10, and 12 (for a service provider, a trusted entity, and the transaction engine, respectively), each of these parties may be audited on, e.g., compliance with laws/regulations in conducting transactions. As discussed herein, responses to such audit requests may be handled based on records established and continually updated during the operations of each party. For example, the exemplary service provider 120-*a* as depicted in FIG. 9A includes an audit processing unit 955 that relies on data stored in the transaction archive 957 to generate responses to audit requests. Similarly, the exemplary trusted entity 160-*a* as depicted in FIG. 10 includes an audit processing unit 1090 that relies on service records stored in 1087 to handle audit requests. The transaction engine 150 as depicted in FIG. 12 includes also an audit processing unit 1250, that relies on the service records stored in 1237 to handle audit requests. In some embodiments, although they all rely on records established from each party's own perspective, the operational flow for these audit processing units may be similar.

Figure 14:
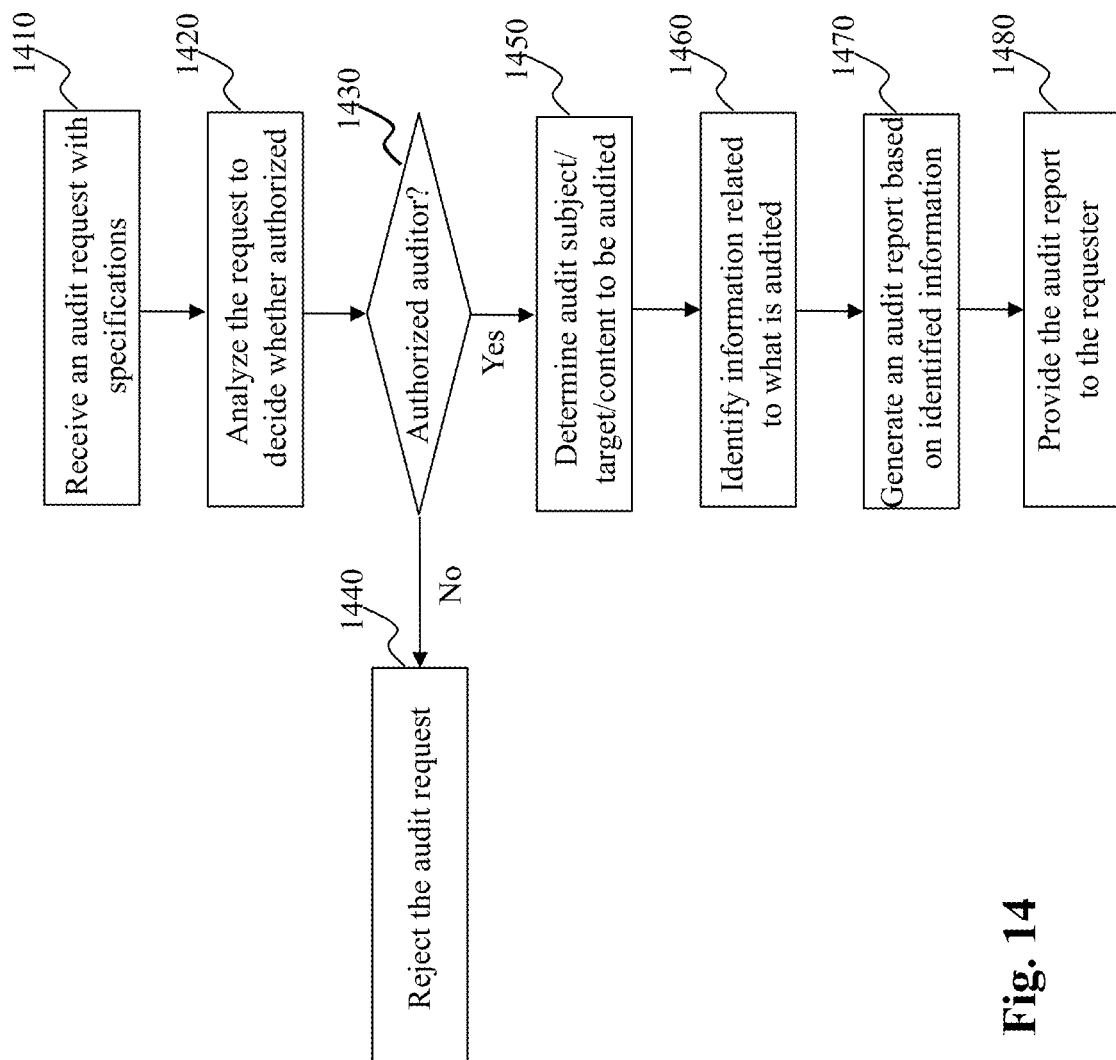
FIG. 14 is a flowchart of an exemplary process of a party in responding to an auditing request, according to an embodiment of the present teaching.

FIG. 14 is a flowchart of an exemplary process of a party in responding to an auditing request, according to an embodiment of the present teaching. The party can be a service provider, a trusted entity, or the transaction engine 150. In operation, when an audit request is received at 1410, the audit processing unit (955, 1090, or 1250) analyzes the request to determine whether the request is from an authorized auditor. In some implementations, each party (a service provider, a trusted entity, or the transaction engine) may have a list of auditors who are authorized to send audit requests and such a list may be maintained by each of the parties (not shown). If the received audit request is from a sender who is not an authorized auditor, determined at 1430, the audit processing unit (955, 1090, or 1250) may reject, at 1440, the audit request.

If the audit request is from an authorized auditor, the audit processing unit (955, 1090, or 1250) may then determine, at 1450, the content of the audit request, including, e.g., the target(s) involved, . . . , the subject matter to be audited, time period(s) involved, etc. For example, an audit request may be directed to a general audit (without specific individual target) on compliance with drinking age law (subject matter to be audited) during a specific period of time. Upon an understanding of the audit request, the audit processing unit may identify, at 1460, all relevant information subject to the audit and then generate, at 1470, an audit report based on such identified relevant information. Such generated audit report is then provided, at 1480, to the auditor.

Figure 15:
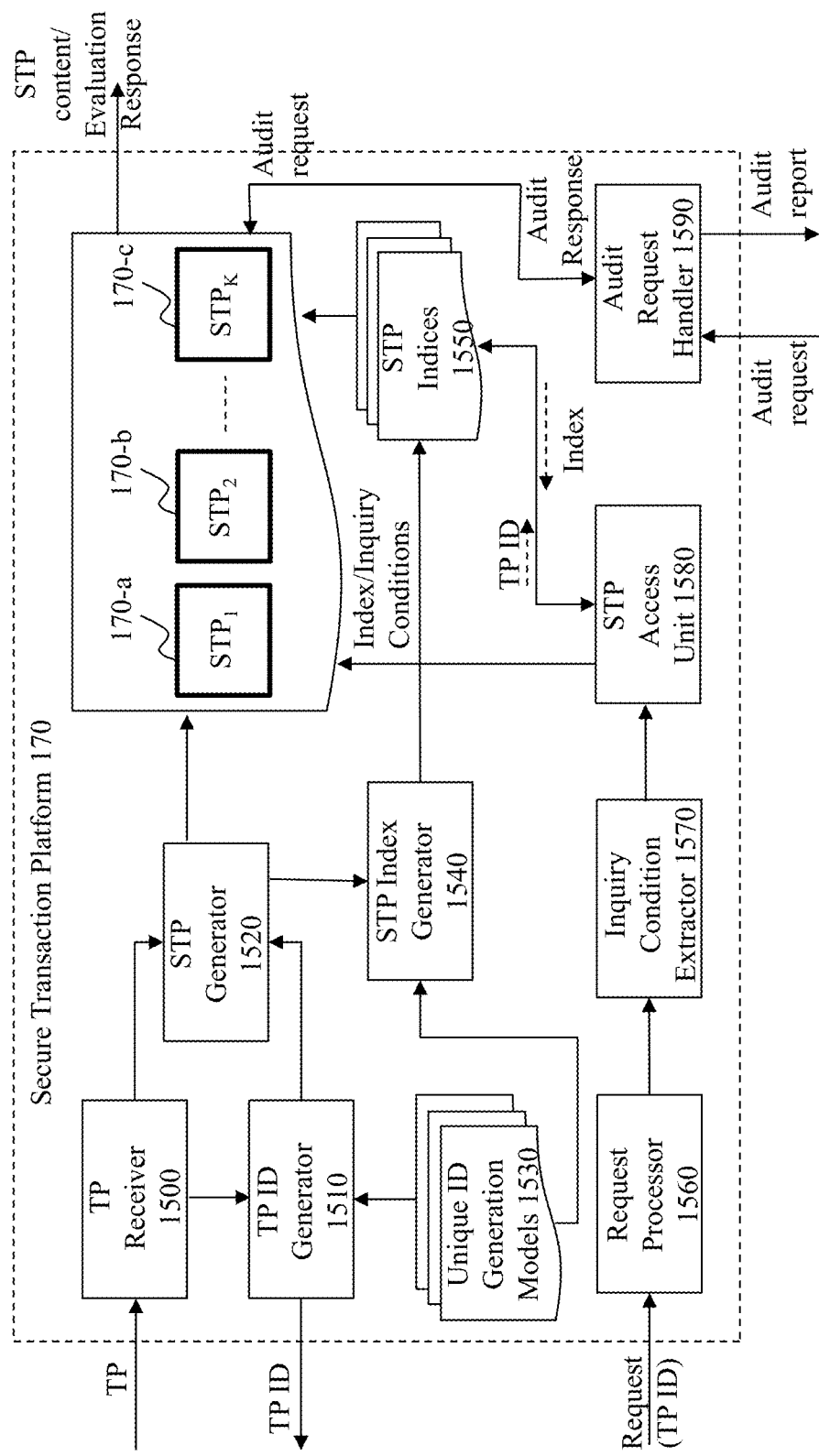
FIG. 15 depicts an exemplary high level system diagram of a secure transaction platform related to secure self-sovereign information management, according to an embodiment of the present teaching.

FIG. 15 depicts an exemplary high level system diagram of the secure transaction platform 170, according to an embodiment of the present teaching. As discussed previously, the secure transaction platform 170 may be provided for storing secure transaction packages (STPs) corresponding to cloaked identifiers and each STP may include access limitations to be imposed on the access of private information to be validated for the underlying transaction. Each STP may store information related to the transaction, the parties involved, the nature of the transaction and its identification information, as well as limitations imposed on data access. As discussed herein, the secure transaction platform 170 may possess various characteristics that can ensure security, immutable data, uniqueness in identifying STPs, etc. The secure transaction platform 170 enables secure storage of STPs, retrieval of such STPs when needed, and in some embodiment the services of evaluation of access conditions against STPs to return an evaluation result.

Figure 16A:
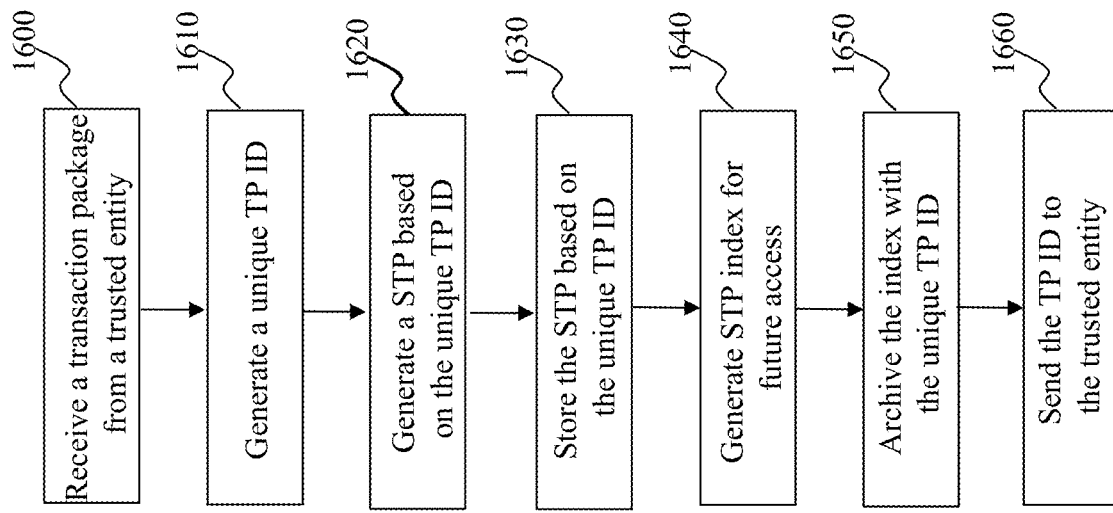
FIGS. 16A-16C are flowcharts of exemplary processes of a secure transaction platform related to secure self-sovereign information management, according to an embodiment of the present teaching.

In the exemplary embodiment depicted in FIG. 15, to securely store STPs (e.g., 170-*a*, 170-*b*, . . . , 170-*c*) on the platform, the secure transaction platform 170 uses a transaction package (TP) receiver 1500, a TP ID generator 1510, a secure transaction package (STP) generator 1520, and a STP index generator 1540. FIG. 16A is a flowchart of an exemplary process of the secure transaction platform 170 storing an STP, according to an embodiment of the present teaching. The process is initiated when the TP receiver 1500 receives, at 1600, a transaction package (TP) associated with a data validation session (having an associated cloaked identifier). As discussed previously, the TP may include various information related to the validation session including limitations to be imposed on access the private data to be validated. The purpose of storing a TP on the secure transaction platform 170 is to facilitate enforcement of access limitations so that the associated cloaked identifier is to be used as a limited use token.

To store the received TP on the secure transaction platform 170, the TP ID generator 1510 generates, at 1610, a unique identifier TP ID for the TP based on, e.g., the unique ID generation models 1530. Based on the unique TP ID for the received TP, the STP generator 1520 generates, at 1620, a STP for the received TP and the unique TP ID. The generated STP is then stored, at 1630, on the secure transaction platform 170. To facilitate future access, the STP index generator 1540 generates, at 1640, an index corresponding to the TP ID and archives, at 1650, the index in a storage 1550 for STP indices. As a response to the request from the trusted entity, the TP ID is sent, at 1660, back to the trusted entity.

To facilitate future access of stored STPs for enforcing compliance of set access limitations stored in STPs, the secure transaction platform 170 further includes additional components, including a request processor 1560, an inquiry condition extractor 1570, and an STP access unit 1580. In some embodiments, a trusted entity may retrieve a previously stored STP from the secure transaction platform 170 and then compare the access limitations with the peripheral information associated with the access (e.g., received from a service provider, either directly or via the transaction engine 150) to determine whether the access limitations associated with a cloaked identifier are met. In some embodiments, because each of the STPs may be stored as a smart contract so that such STPs may be equipped with the ability to perform certain computations such as assessing whether there is any violation of the stored access limitations given some access parameters associated with an inquiry. In this case, an assessment of compliance with respect to access limitations stored in an STP may be provided directly by the STP queried. This may correspond to a self-evaluation mode of operation.

Figure 16B:
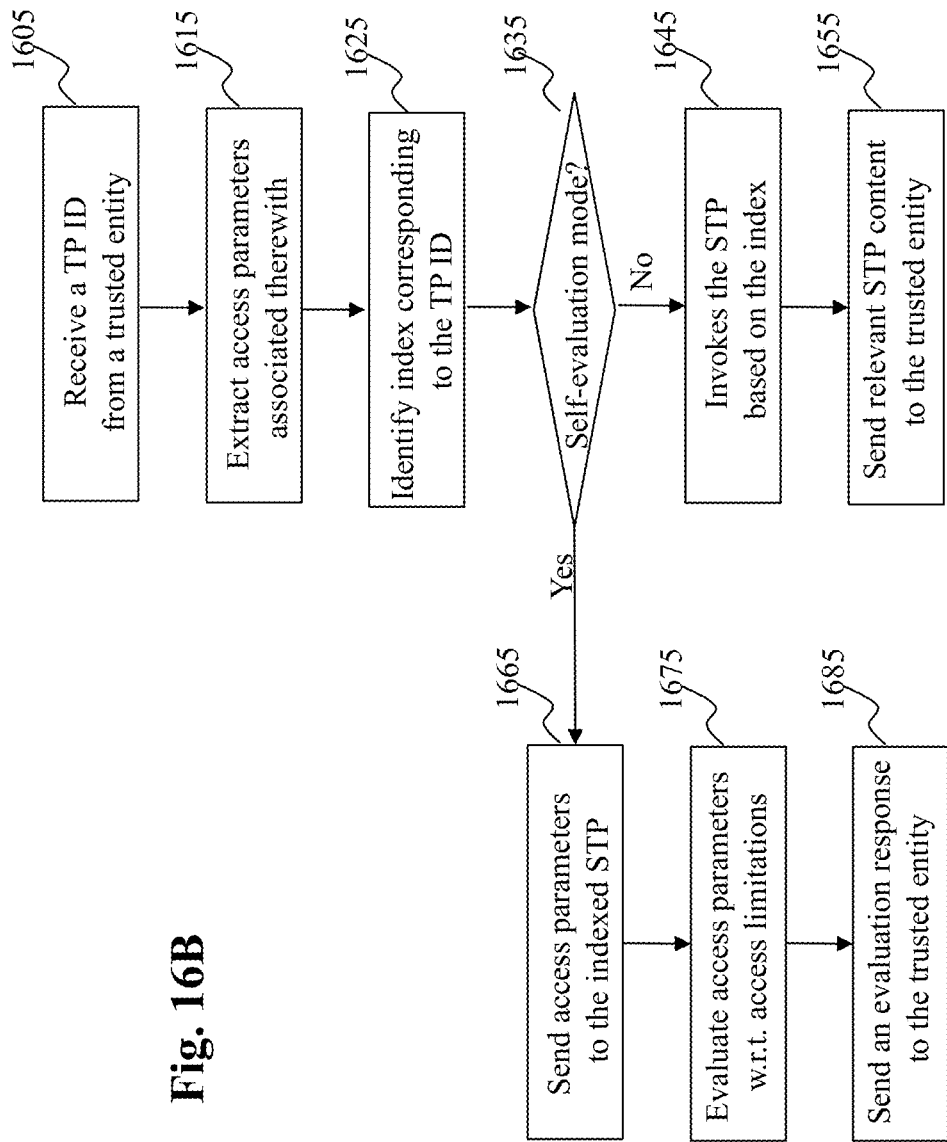

FIG. 16B is a flowchart of an exemplary process of accessing an STP for evaluating access limitation compliance, according to an embodiment of the present teaching. When the request processor 1560 receives, at 1605, a TP ID from a trusted entity, the inquiry condition extractor 1570 is invoked to extract, at 1615, parameters related to the access associated with the TP ID. For example, such access parameters may include date/time, originating geographical location, a number that may indicate the count of access in the past using the same TP ID, . . . , etc. Such parameters may be used to assess whether any of the access limitations stored in the STP corresponding to the TP ID is violated.

To access the corresponding STP, the STP access unit 1580 identifies, at 1625, an index for the STP from the stored STP indices in 1550 based on the TP ID. To evaluate compliance, a mode of operation is determined at 1635. That is, it is determined whether the assessment is to be carried out in a self-evaluation mode, i.e., the evaluation is done by the STP (rather than by the trusted entity). If it is not to be assessed in the self-evaluation mode, the STP access unit 1580 invokes, at 1645, the STP based on the index so that the activated STP corresponding to the index may then send, at 1655, relevant STP content (e.g., the access limitations) to the trusted entity for checking the compliance.

If the operation mode is self-evaluation mode, the STP access unit 1580 sends, at 1665, the extracted access parameters provided from the trusted entity to the indexed STP. When the STP receives the access parameters, it evaluates, at 1675, them against the stored access limitations and sends, at 1685, an evaluation response to the trusted entity. In some embodiments, the evaluation response may include Boolean assessment (e.g., "yes" for compliance, "no" for noncompliance). In some embodiments, the evaluation response may provide additional information, e.g., details as to which access parameter(s) is not compliant with the stored access limitations.

As disclosed herein, in some embodiments, an STP is stored as a smart contract which can be continually referred to, accessed, and in some situations, some data stored therein may be dynamically updated to reflect changes related to the contractual terms. In the context of the self-sovereign data management framework as disclosed herein, an STP may store access limitations associated with some validation session(s) in connection with a particular type of transaction. One example is the following. A record owner may take a vacation in California for two weeks and seek to purchase beers from different stores in California. When the record owner visits the first store to buy beer, he/she may initiate a process of allowing the owner of the first store to seek validation from the DMV in his/her hometown, say DMV of the state of Virginia. When the record owner initiates the validation process, the record owner receives a cloaked identifier from the DMV of Virginia, which creates an STP stored on the secure transaction platform 170 with access limitations set as, e.g., validation is about age of the record owner; the validation has to be within two weeks from a starting date; the validation request is from a service provider located in California (geographical limitation); and a maximum of 5 validations is permitted. After the first purchase with validated age, the record owner may subsequently visit other stores in California to purchase more beer. In this case, the record owner can activate the subsequent validations using the same cloaked identifier received previously from the Virginia DMV and send the cloaked identifier to other stores to seek validation. So long as the subsequent accesses still comply with the set access limitations stored in the STP, the record owner does not have to re-create a cloaked identifier and the STP serves as an effective mechanism to enforce compliance, given that the STP updates dynamically the changing situation associated with the subsequent accesses. For example, if the access limitations require a maximum 5 validations, the STP needs to deduct after each access.

Referring back to FIG. 15, the secure transaction platform 170 may also include an audit request handler 1590 that may be configured to handle audit requests. Such an audit request sent to the secure transaction platform 170 may inquire about data related to access to STPs that are related to a specific party (e.g., any access records related to a specific trusted entity, a specific service provider, a specific record owner or any combination thereof), a specific type of related transactions, a specific type of inquiry (e.g., drinking age related), . . . , or any combination thereof (e.g., any transactions involving a specific service provider on enforcement of drinking age regulation). In the illustrated embodiments, as each STP is a self-enclosed securely operated unit, the secure transaction platform 170 may handle an audit request by broadcasting the audit request and then collecting audit responses from STPs that find themselves to be relevant to the audit request.

Figure 16C:
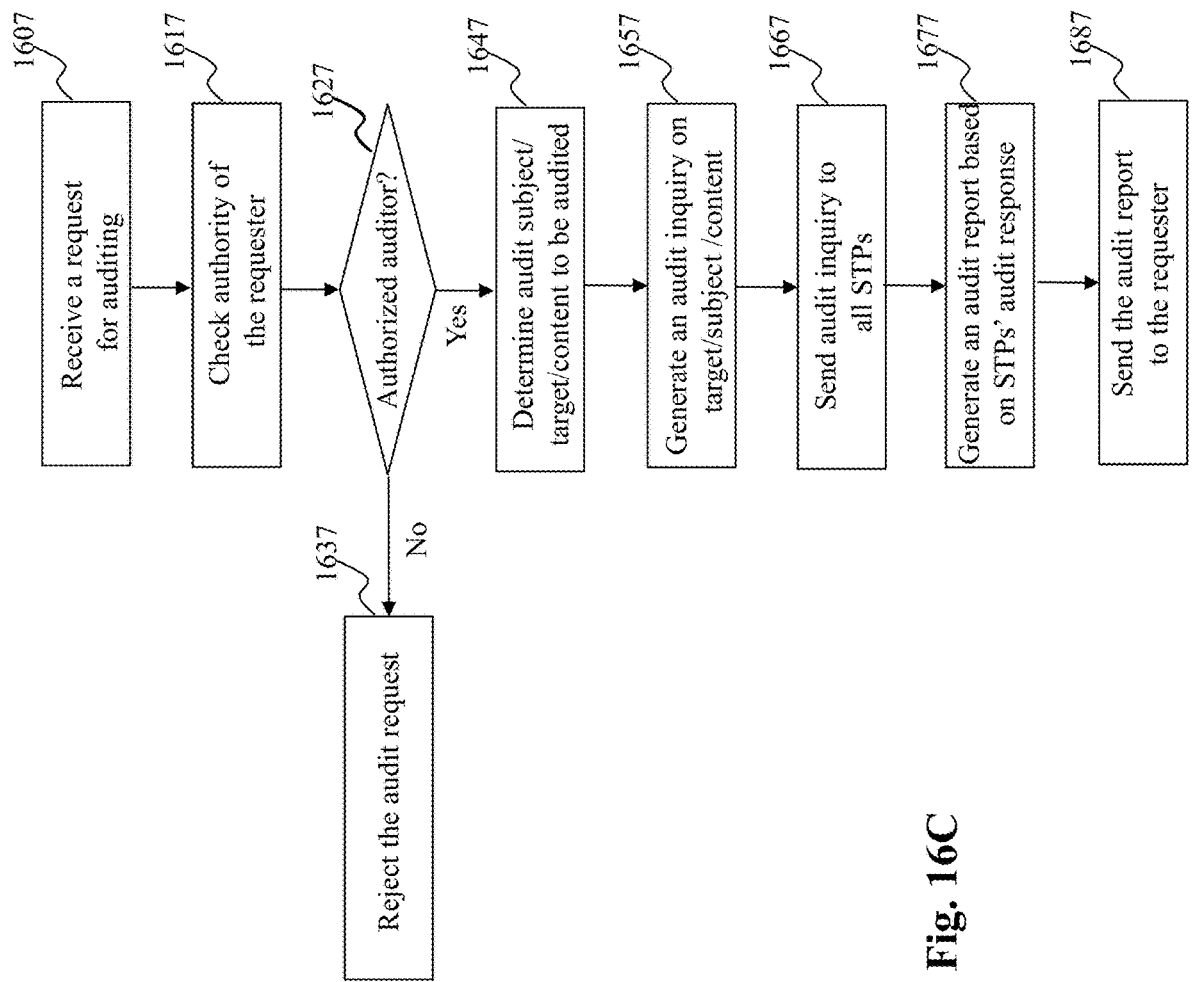

FIG. 16C is a flowchart of an exemplary process of the secure transaction platform 170 acting in response to an audit request, according to an embodiment of the present teaching. When the audit request handler 1590 receives, at 1607, an audit request, it checks, at 1617, the authority of the requester who sent the audit request. If the requester is not authorized, determined at 1627, the audit request handler 1590 rejects, at 1637, the audit request. If the requester is authorized, the audit request handler 1590 proceeds to analyze the audit request to determine, at 1647, the specific content of the request, i.e., what is the subject matter to be audited, what is the target(s) of the audit, etc. Based on the determined content/subject matter/targets associated with the audit request, the audit request handler 1590 generates, at 1657, an audit inquiry incorporating the content/subject matter/target extracted from the audit request and sends, at 1667, to all STPs currently stored on the platform.

In some embodiments, when STPs receive the broadcast audit inquiry, each may then check to see if implicated. If so, the implicated STPs may then retrieve all access histories relevant to the audit inquiry and send to the audit request handler 1590. When the audit request handler 1590 receives all the audit responses from the implicated STPs, the audit request handler 1590 generates, at 1677, an audit report based on the received audit responses from the implicated STPs. Such generated audit report is then sent, at 1687, to the requester.

Figure 17A:
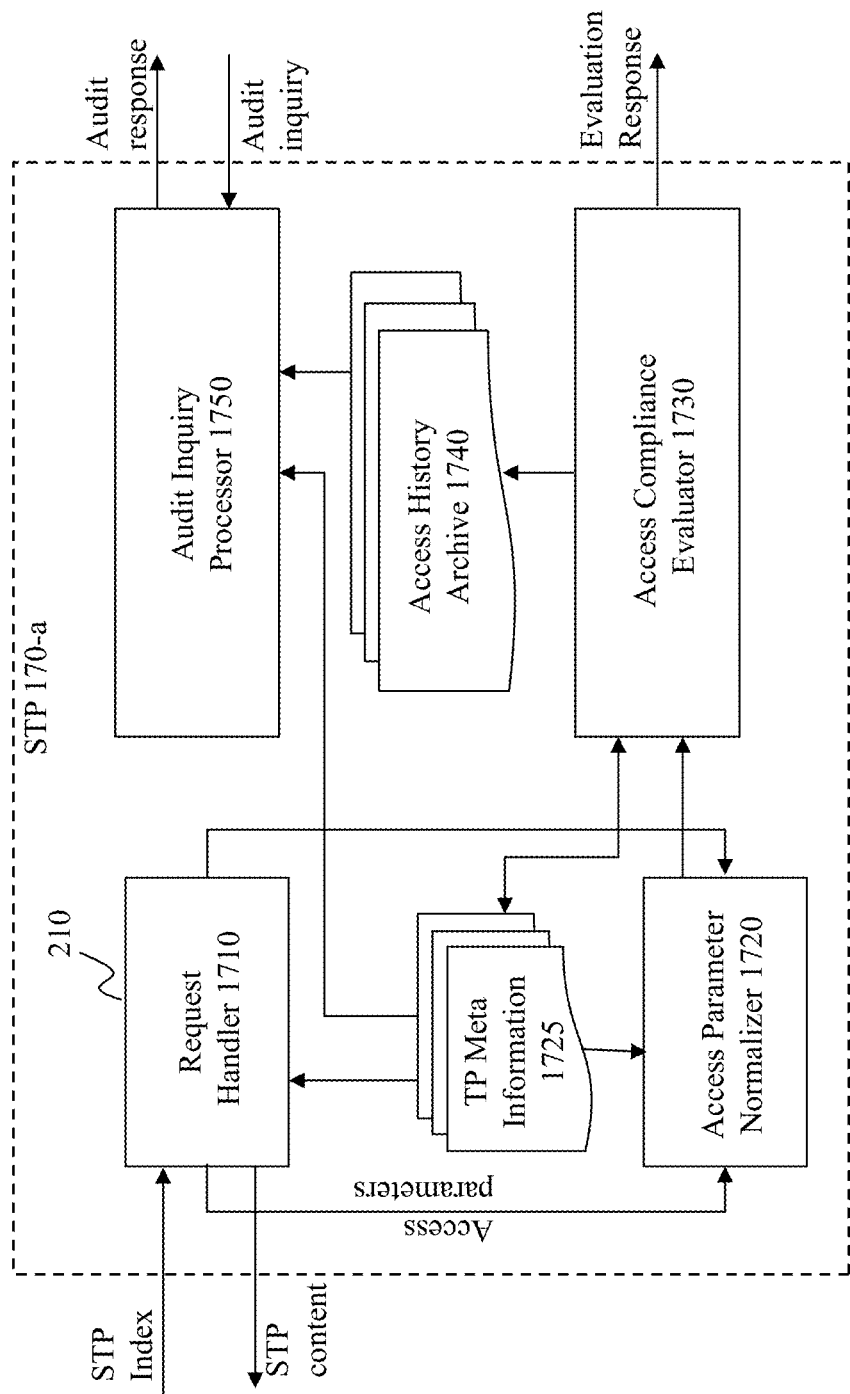
FIG. 17A depicts an exemplary construct of a secure transaction package, according to an embodiment of the present teaching.

FIG. 17A depicts an exemplary construct of a secure transaction package STP 170-$a$, according to an embodiment of the present teaching. In this illustrated embodiment, the STP comprises a request handler 1710, an access parameter normalizer 1720, an access compliance evaluator 1730, and an audit inquiry processor 1750. In addition to these processing components, the STP 170-$a$ also includes data storage and the processing components therein are capable of processing and updating the data saved in the storage in accordance with the situations. For example, in storage 1725, the STP 170-$a$ stores TP meta information which may contain various types of information including access limitations associated with the underlying validation session and such meta data may be continually updated based on the situation.

Figure 17B:
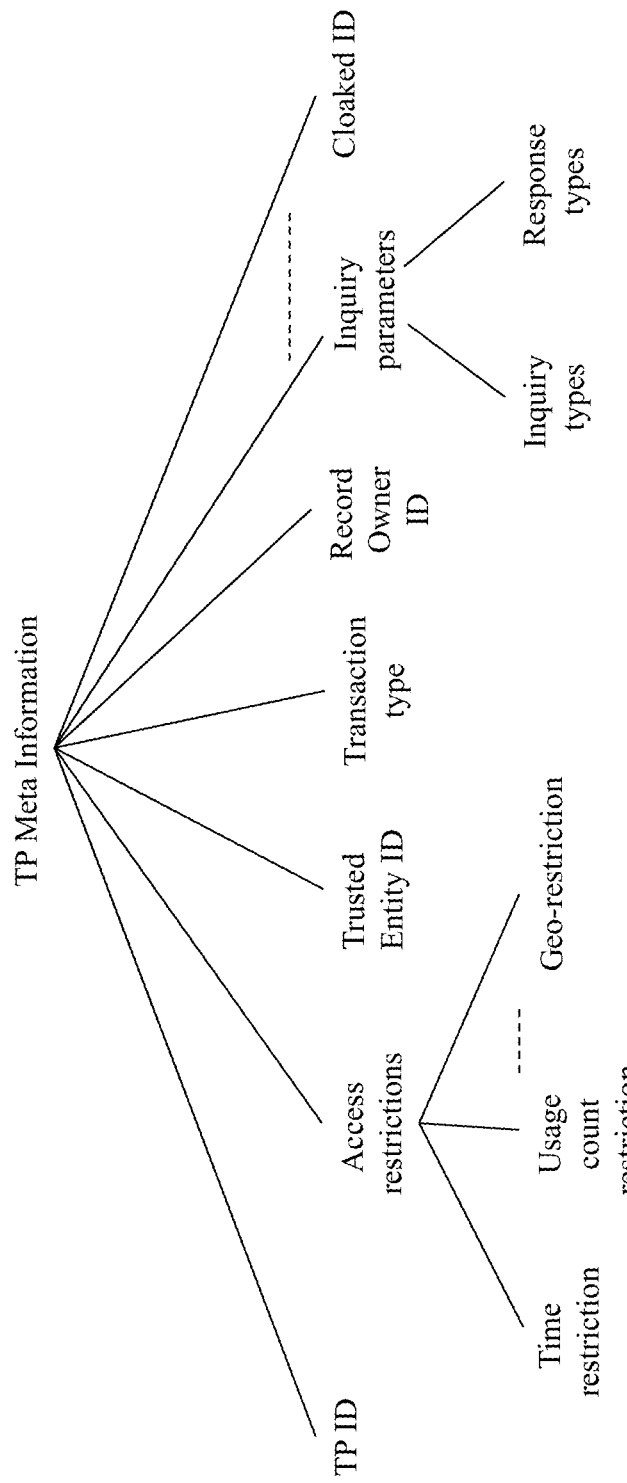
FIG. 17B illustrates exemplary types of meta information of a secure transaction package, according to an embodiment of the present teaching.

FIG. 17B illustrates exemplary types of meta information stored in STP 170-$a$, according to an embodiment of the present teaching. In this exemplary illustration, the meta information stored therein includes TP ID (used for identification), the corresponding cloaked identifier, an identifier for the trusted entity that has constructed the STP 170-$a$, an identifier of the record owner who requested the validation, the type of transaction involved, access restrictions, . . . , and inquiry related parameters. As discussed herein, the access restrictions may include restrictions on access time period, usage count, granularity, . . . , etc. There may also be restrictions on types of inquiry that can be made and the types of validation responses permitted, as shown in FIG. 17B. Some of the stored meta information may be subject to change over time. For example, restrictions on access period, when represented as a remaining period (e.g., one more hour, two more days, etc.), may need to be updated based on a countdown operation. In addition, if a maximum 5 counts of access is specified, each time there is an access, the remaining maximum will need to be reduced by one. This is accomplished by the processing components in the STP 170-$a$.

Figure 17C:
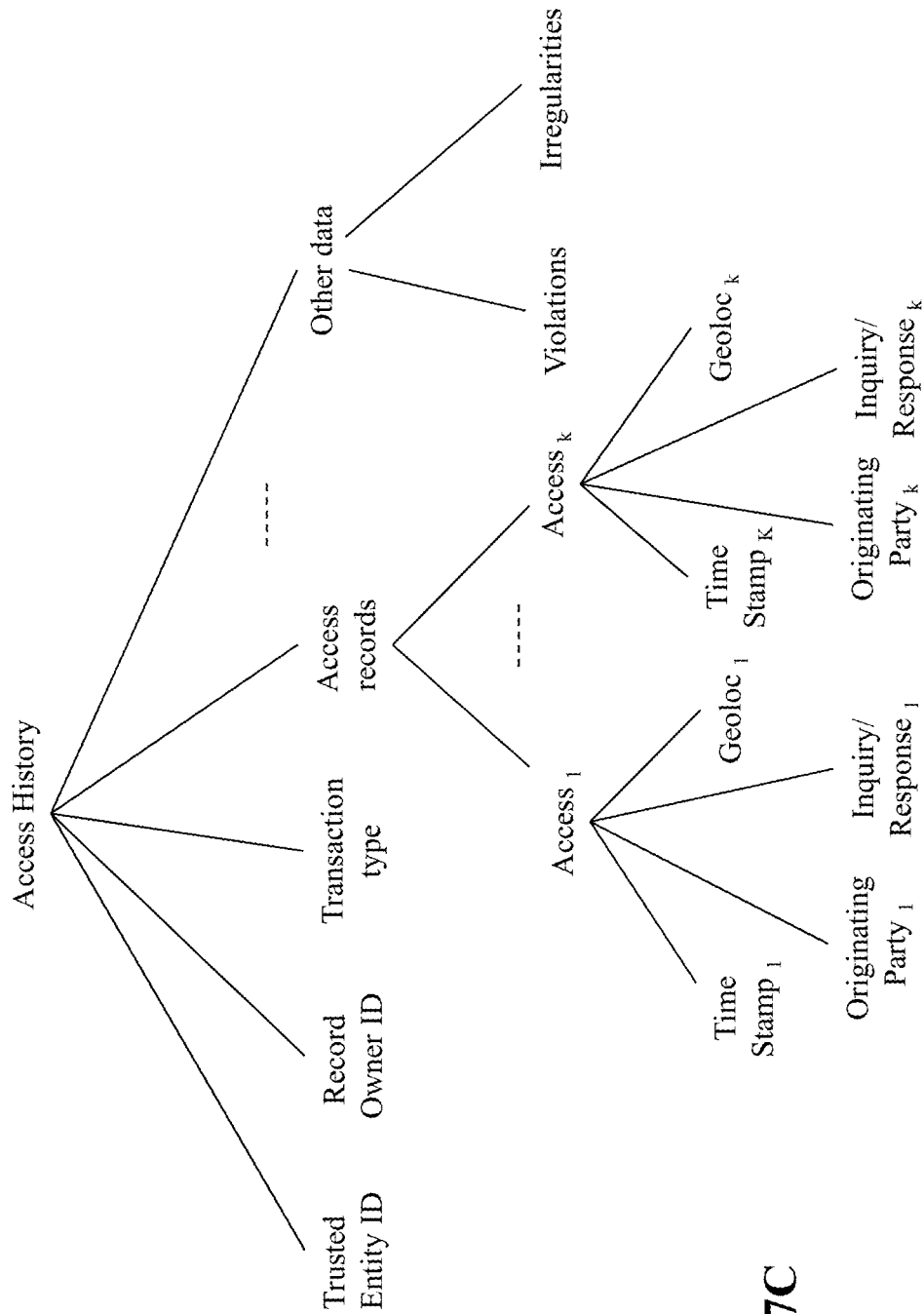
FIG. 17C illustrates exemplary types of information archived in an access history of a secure transaction package, according to an embodiment of the present teaching.

The STP 170-$a$ may also be configured to keep an alive access history during the life span of the STP 170-$a$. As seen in FIG. 17A, STP 170-$a$ may also include an access history archive 1740 which archives all accesses, surrounding information associated with each access, as well as the outcome of each access. The archive 1740 may be updated whenever there is an access. FIG. 17C illustrates exemplary types of information included in an access record, according to an embodiment of the present teaching. In this illustration, the access history includes information such as the identity of the trusted entity that creates the STP, the identification of a record owner for whom the STP is made, the nature of the transaction involved, and records associated with each access made, including date/time of the access, an originating party (a service provider), the geolocation of the originating party, . . . , and the inquiry/response of the access. The history may also include any other types of data such as a summary of all violations of the access limitations, . . . , and other irregularities.

Figure 17D:
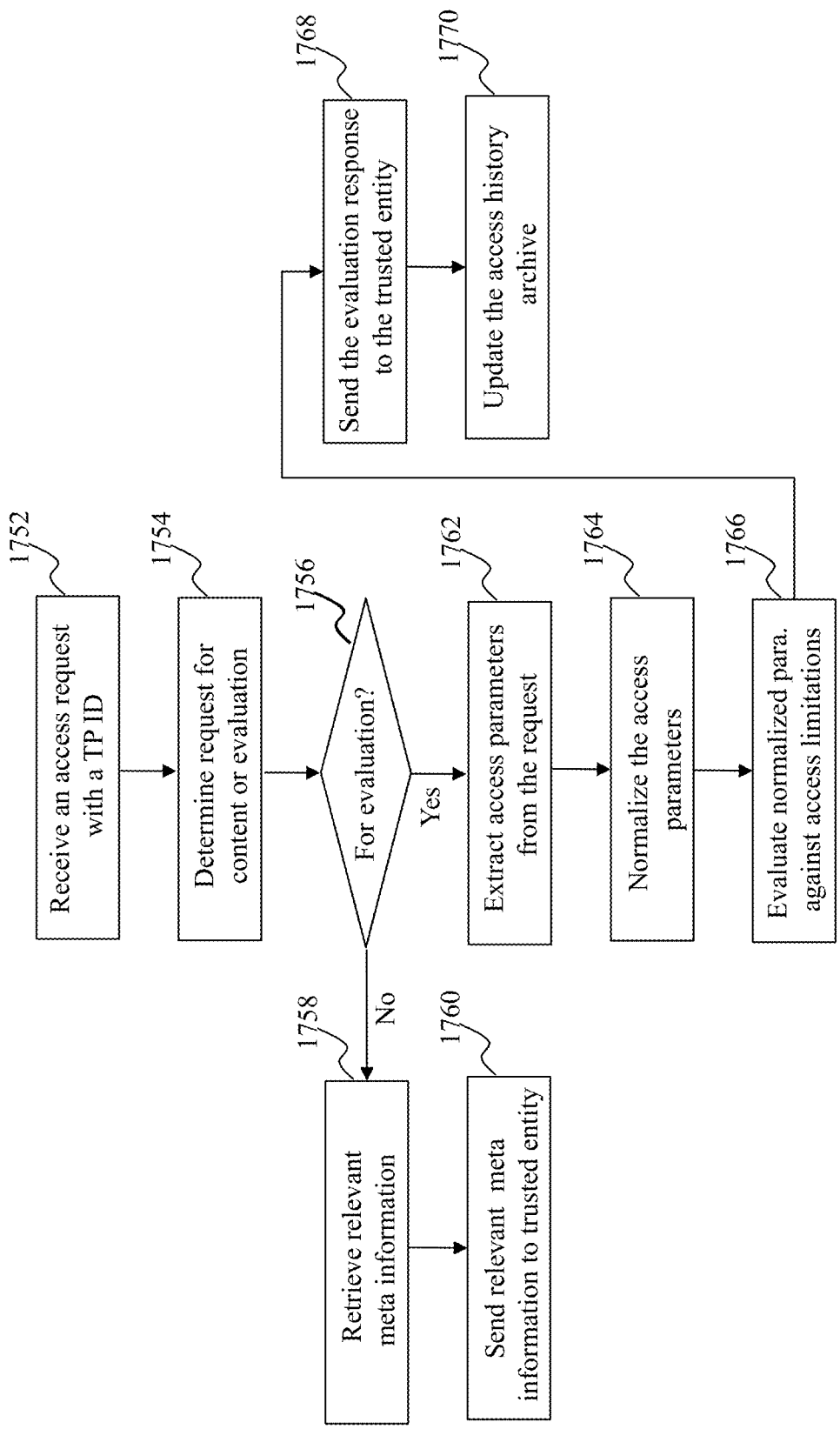
FIG. 17D is a flowchart of an exemplary process of a secure transaction platform in response to an access request, according to an embodiment of the present teaching.

FIG. 17D is a flowchart of an exemplary process of the STP 170-*a* in response to an access request, according to an embodiment of the present teaching. When the request handler 1710 receives, at 1752, an access request, the request handler 1710 determines, at 1754, whether the request is asking for certain content stored therein or for an evaluation response. As discussed herein, in some embodiments, a trusted entity may request to access the access limitations stored in the STP 170-*a* and then proceed to check whether the access parameters associated with the request for a validation response (originated from a service provider) satisfy the access limitations stored in STP 170-*a*. In other embodiments, the trusted entity may request the STP 170-*a* to provide directly an evaluation response derived by comparing the inquiry parameters associated with the access with the stored access limitations. In this (or either) situation, the trusted entity may send the request to STP 170-*a* with information surrounding the request for a validation response originated from a service provider (even though the trusted entity may receive a request from the transaction engine, the request is originated from a service provider). Information surrounding the request for a validation response may include, e.g., date/time the service provider sent the request, the type of inquiry sought (e.g., age older than 21), . . . , and the type of response asked for (e.g., Boolean response). Such information is to be used to compare with the access limitations stored in STP 170-*a*.

If the request is merely to receive relevant content (e.g., access limitations), decided at 1756, the request handler 1710 retrieves, at 1758, relevant meta information stored therein and sends, at 1760, the retrieved meta information to the trusted entity. If the request is for an evaluation response based on the access limitations stored in the STP 170-*a*, the request handler 1710 extracts, at 1762, access parameters from the request and invokes the access parameter normalizer 1720 to normalize, at 1764, the access parameters to obtain normalized access parameters. Such normalization may be needed for certain parameters, e.g., access time or even date due to time differences between different jurisdictions. When the access parameter normalizer 1720 completes the normalization, it may then activate the access compliance evaluator 1730, which may then take the normalized access parameters as input and proceed to evaluate, at 1766, the normalized access parameters against the access limitations stored in the meta information archive 1725 to generate an evaluation response. The access compliance evaluator 1730 then sends, at 1768, the evaluation response to the trusted entity and updates, at 1770, the access history archive 1740 based on the information and outcome of the access.

Figure 17E:
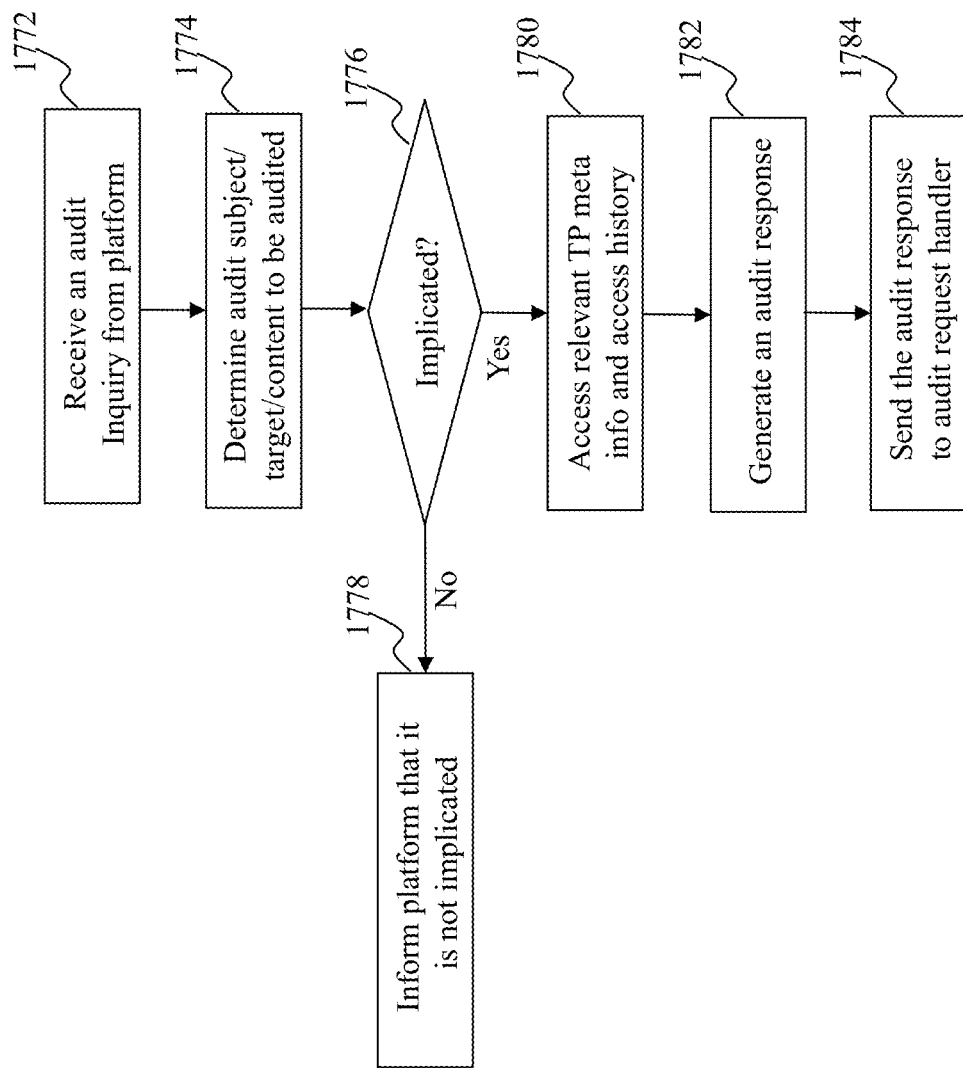
FIG. 17E is a flowchart of an exemplary process of a secure transaction platform in response to an access request, according to an embodiment of the present teaching.

As discussed herein with reference to FIGS. 15 and 16C, the secure transaction platform 170 may respond to an audit request, collect relevant information from all STPs that are implicated (determined based on whether satisfy auditing conditions), and then generate an audit report based on audit responses from all implicated STPs. In FIG. 17A, the exemplary STP 170-*a* includes an audit inquiry processor 1750 that is configured to handle an audit inquiry from the audit request handler 1590 of the secure transaction platform 170. FIG. 17E is a flowchart of an exemplary process of the audit inquiry processor 1750, according to an embodiment of the present teaching. Upon receiving an audit inquiry at 1772, the audit inquiry processor 1750 determines, at 1774, the content/subject matter/target to be addressed by the audit inquiry. Based on such determined content/subject matter/target, if the STP 170-*a* decides, at 1776, that the STP 170-*a* is not implicated, the audit inquiry processor 1750 informs, at 1778, the audit request handler 1590. In some embodiments, the audit inquiry processor 1750 may elect not to respond in the event that the STP 170-*a* is not implicated.

If the audit inquiry processor 1750 analyzed that there is something in the audit inquiry that is relevant to STP 170*a*, the audit inquiry processor 1750 retrieves, at 1780, information stored in STP 170-*a* that is relevant to the inquiry. For instance, if the audit inquiry is requesting for all records related to transactions of alcohol sales involving a specific chain grocery store between 1996-2006. If STP 170-*a* is related to beer transactions involving the specific chain grocery store in 1998-2000, STP 170-*a* is implicated. In this case, the audit inquiry processor 1750 retrieves all data stored in STP 170-*a*, either from the meta information storage 1725 or from the access history archive 1740, that satisfy any of the conditions specified in the audit inquiry. Based on such retrieved relevant information, the audit inquiry processor 1750 generates, at 1782, an audit response and sends, at 1784, the audit response to the audit request handler 1590.

In some embodiments, the broadcast audit inquiry is to be sent to all STPs, including both STPs that are still active and STPs that have previously expired in the sense that as the access limitations stored therein have effectively made the STPs ineffective. For example, if an STP stores the information that the remaining number of access is zero. Although rendered ineffective, such STPs may be configured to continue to be capable of certain tasks such as responding to an audit inquiry. In this way, it can facilitate useful functions such as auditing the past records.

As disclosed herein, the self-sovereign data management framework 100 enables a scheme in which private data to be validated may not need to be sent over the network, thus improving the security of such private data. Via framework 100, a record owner may also elect to specify the appropriate level of granularity of data to be validated on a need basis. For example, if a record owner needs only to prove his age to a service provider, he/she can designate that only age validation is needed. This is in contrast with the traditional method of proofing age by presenting a driver license (or passport) or a copy thereof, which discloses not only birth date but also other information such as street address, height, eye color, that are not needed for the transaction but nevertheless disclosed. As disclosed herein, to securely operate in framework 100, a person who requests a validation of certain private information in order to complete a transaction with a service provider may be required to authenticate his/herself to be the person claimed to be before the validation process can be initiated. In FIGS. 8A (for record owner), 10 (for a trusted entity), and 12 (for the transaction engine), components for these parties are provided for establishing authentication information and protocol for a record owner and subsequently carrying out the authentication based on such established authentication information and protocol. Below, various aspects and implementation related to authentication are disclosed in detail.

Figure 18A:
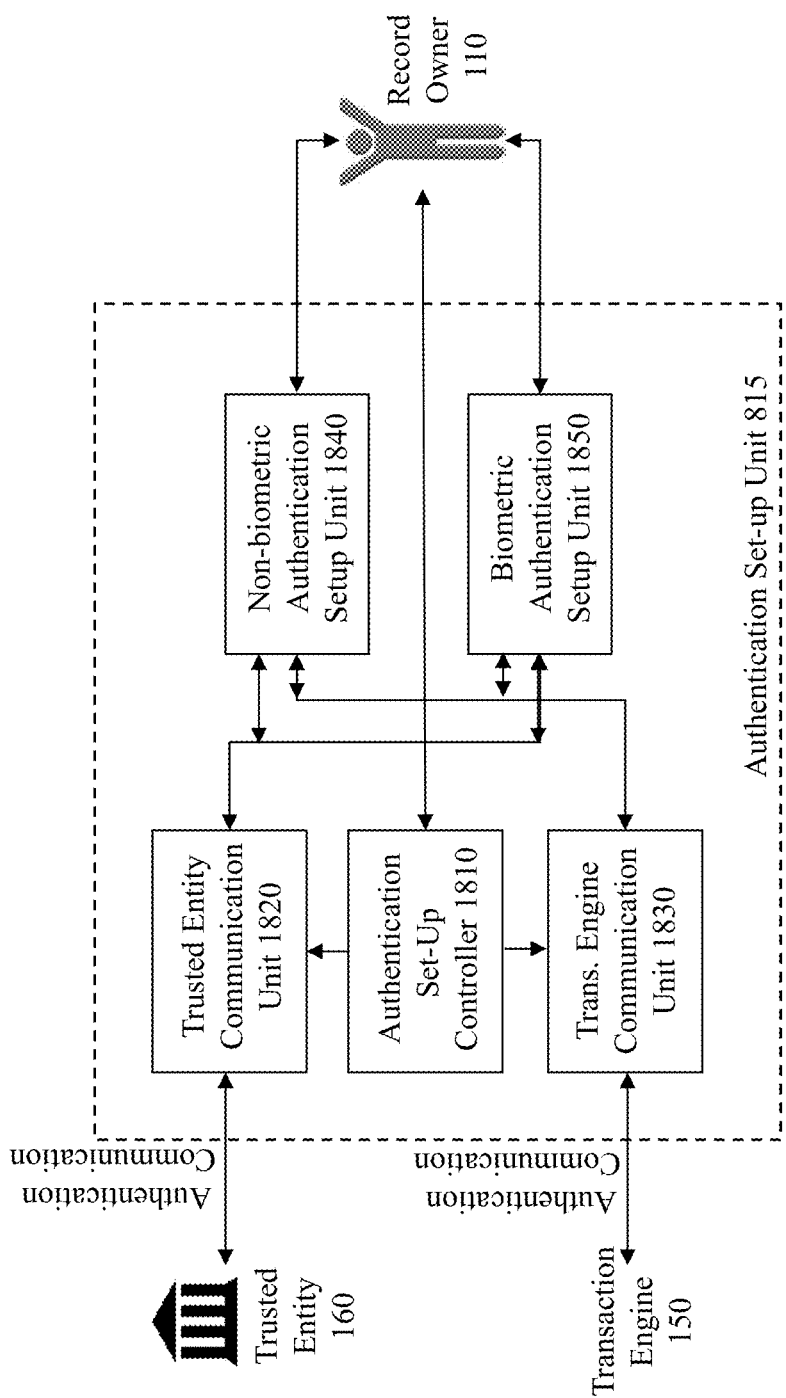
FIG. 18A depicts an exemplary high level system diagram of an authentication set-up unit, according to an embodiment of the present teaching.
Figure 19A:
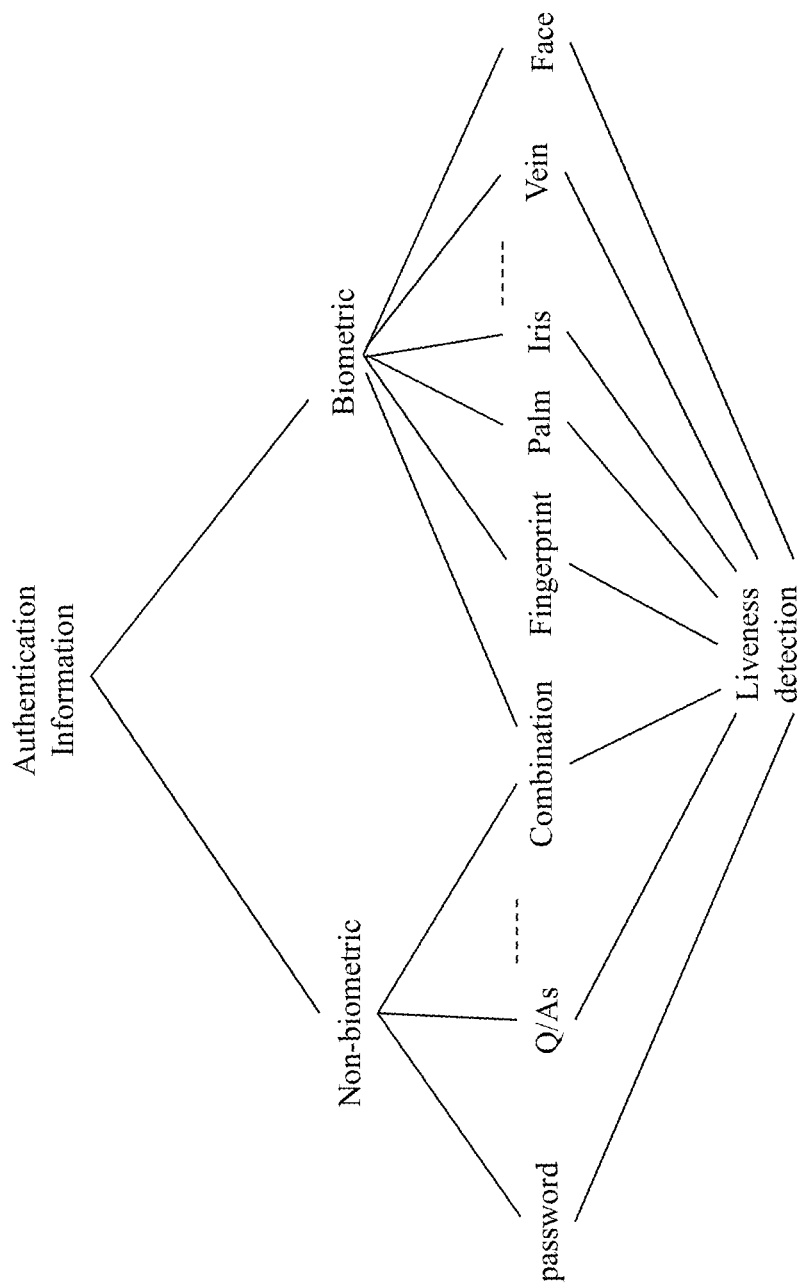
FIG. 19A illustrates exemplary types of authentication information, according to some embodiments of the present teaching.

FIG. 18A depicts an exemplary high level system diagram of the authentication set-up unit 815 as depicted in FIG. 8A, according to an embodiment of the present teaching. A record owner may establish authentication information with either one or more trusted entities or the transaction engine 150 when the record owner uses the transaction engine 150 to manage his/her data. FIG. 19A illustrates exemplary types of authentication information that may be used for authenticating a record owner, according to an embodiment of the present teaching. As shown, authentication information may be biometric or non-biometric. Non-biometric authentication information may be a traditional password or some sort of code, some security questions and answers (Q/As), . . . , etc. Examples of biometric authentication information includes fingerprint, palm, vein, iris, . . . , face. Non-biometric and biometric information may be combined to achieve authentication.

To set up authentication information to be used, the authentication set-up unit 815 may comprise an authentication set-up controller 1810, a trusted entity communication unit 1820, a transaction engine communication unit 1830, a non-biometric authentication setup unit 1840, and a biometric authentication setup unit 1850. The trusted entity communication unit 1820 interfaces with any trusted entity to facilitate communication between the record owner and the trusted entity to set up authentication information. Similarly, the transaction engine communication unit 1830 interfaces with the transaction engine 150 to facilitate communication between the record owner and the transaction engine 150 for the set up. The authentication set-up controller 1810 interfaces with the record owner to determine the party (a trusted entity or the transaction engine) with which the record owner is to proceed with the set up and then accordingly controls which communication unit to invoke to accomplish that. Depending on the type of authentication information to be set up, both trusted entity communication unit 1810 and the transaction engine communication unit 1830 may invoke either of the non-biometric authentication setup unit 1840 or the biometric authentication setup unit 1850 to interface with the record owner to gather desired authentication information.

Figure 18B:
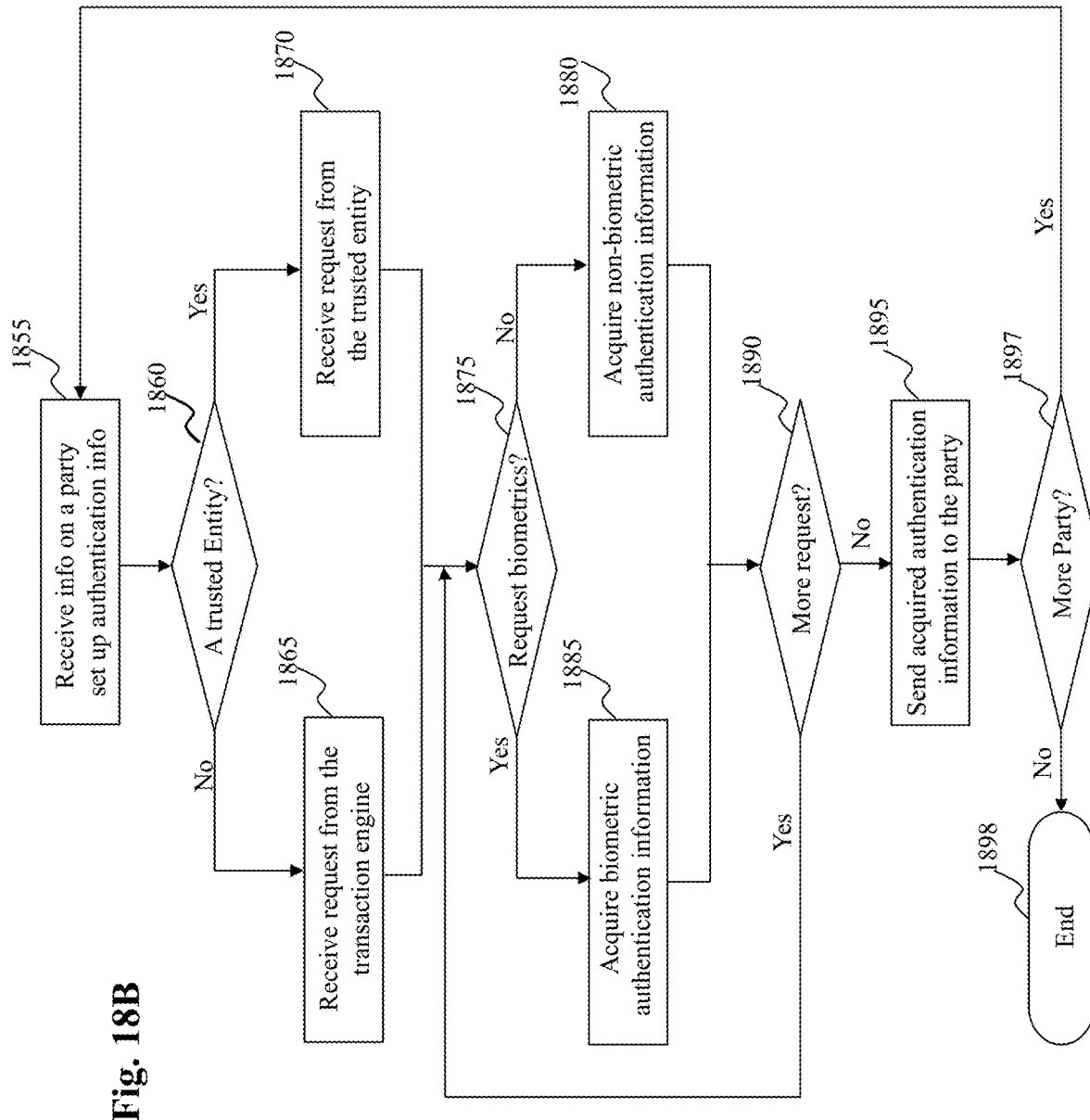
FIG. 18B is a flowchart of an exemplary process of an authentication set-up unit, according to an embodiment of the present teaching.

FIG. 18B is a flowchart of an exemplary process of the authentication set-up unit 815, according to an embodiment of the present teaching. In operation, the authentication set-up controller 1810, once activated, receives, at 1855, indication from the record owner as to the party the record owner is to set up the authentication information. If the party is a trusted entity, determined at 1860, the authentication set-up controller 1810 invokes the trusted entity communication unit 1820, which, upon contacting the trusted entity, receives, at 1870, a request from the trusted entity for certain authentication information. If the party with which the record owner is to set up the authentication information if the transaction engine 150, determined at 1860, the authentication set-up controller 1810 invokes the transaction engine communication unit 1830, which, upon contacting the transaction engine 150, receives, at 1865, a request from the trusted entity for certain authentication information. The request received from the trusted entity or the transaction engine may be generated respectively based on communication between the record owner and the trusted entity on what type(s) of authentication information is to be set up (now shown).

With the received request, it is determined, at 1875, whether the requested authentication information is biometric or non-biometric. If what is requested is non-biometric, the non-biometric authentication setup unit 1840 may be invoked to interface with the record owner to acquire, at 1880, non-biometric authentication information. If what is requested is biometric information, the biometric authentication setup unit 1850 may be invoked to acquire, at 1885, biometric information of the record owner.

During each set up session, more than one type of authentication information may be acquired, including biometric and non-biometric or even type (bio or non-biometric information) may also include multiple pieces of authentication information. For example, for biometric information, the authentication information may include both fingerprint as well as iris. For non-biometric information, the authentication information may include both password and Q&As. At 1890, the authentication information is checked to see if there are additional requests, and the session may loop back to 1875 to check if the next piece of authentication information requested (by either the trusted entity communication unit 1820 or the transaction engine communication unit 1830) is biometric or non-biometric.

The process continues until, determined at 1890, all authentication information requested by the current party (a trusted entity or the transaction engine) has been acquired. When that happens, the acquired authentication information is sent to the party at 1895. The process may then determine, at 1897, whether additional set up is needed for a different party (e.g., a different trusted entity), if so, the process loops back to step 1855. Otherwise, the set up session ends at 1898.

With authentication information set up with respect to each relevant party, the record owner may be required to authenticate him/herself in each validation session with the party (or parties) who will be providing the validation service to the record owner. In operation, besides authenticating a record owner based on previously acquired or setup authentication information, additional security measures may be deployed. This includes detecting the liveness of a "person" who submits certain biometric "authentication information" to prevent situations in which someone who pretends to be a record owner submits a photo of eyes of the record owner for iris recognition. The self-sovereign data management framework 100 as disclosed herein may incorporate functionalities for liveness detection in order to strengthen the security of the operation. This is shown in FIG. 19A, wherein all authentication information may be subject to liveness detection.

Figure 19B:
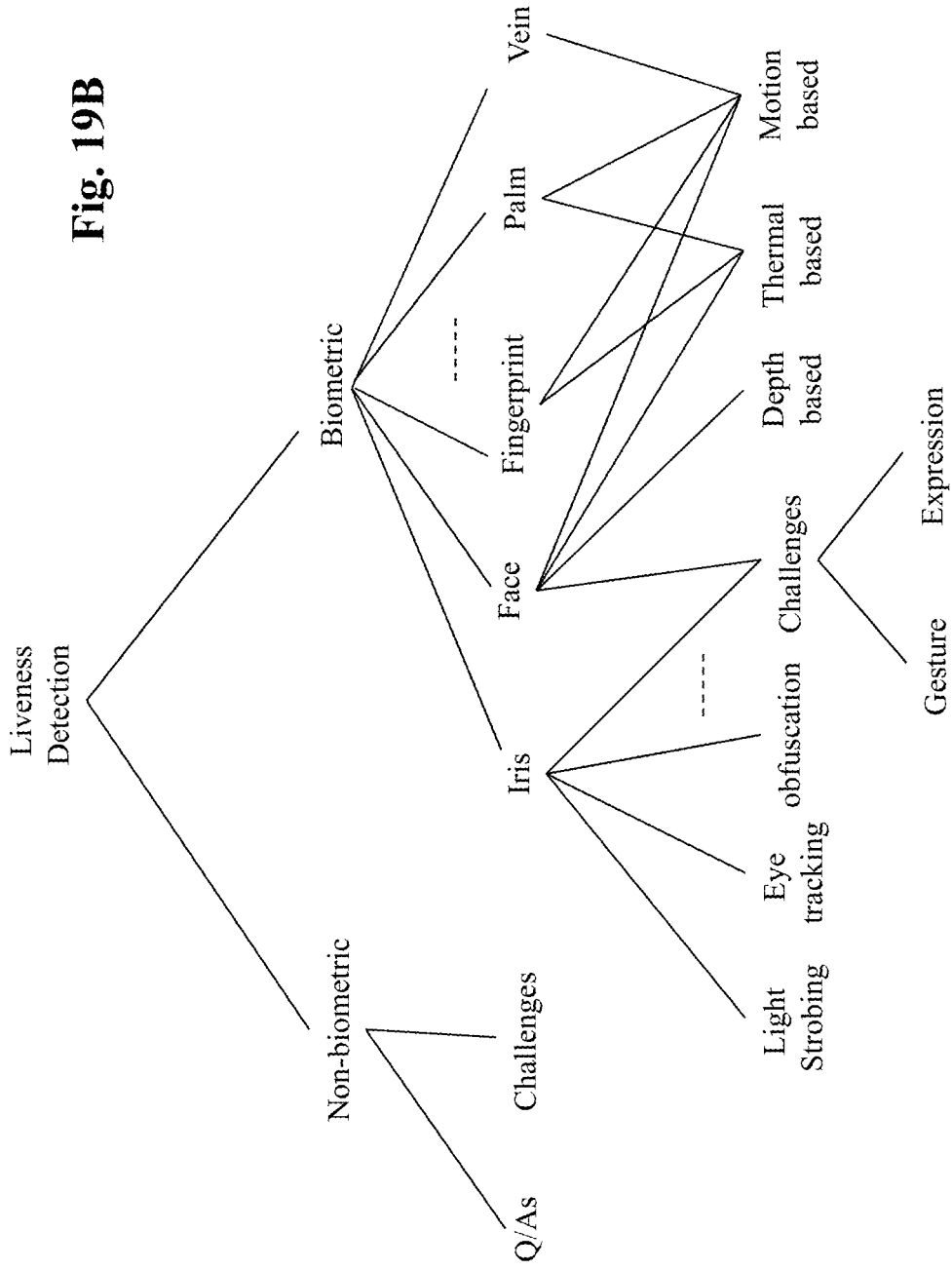
FIG. 19B illustrates exemplary types of liveness detection modalities and information to be used for detecting liveness, according to some embodiments of the present teaching.

FIG. 19B illustrates exemplary modalities for liveness detection, according to some embodiments of the present teaching. This includes liveness detection via both non-biometric and biometric means. As illustrated, for non-biometric authentication information, such as a password, the liveness of the person who provides the password may be challenged to say or do something (e.g., type something at a prompt) or asked some questions that likely only the record owner would know the correct answers (Q&As). As to the biometric information, which includes, e.g., iris, face, fingerprint, palm, . . . , vein, various means may be deployed to detect the liveness of the presented biometric information. For example, to detect liveness of a face, depth based, thermal based, or challenge based approaches may be used. In some applications, the light reflection patterns of human flesh may also be used (not shown). For detecting liveness of a fingerprint, thermal based approaches may be used and a motion based approach may also be deployed by detecting the blood flow in the vein inside of the fingerprint. Similarly, the liveness of a palm may also be detected in a similar fashion.

Iris is another form of biometric information. To detect the liveness of an iris, different approaches are disclosed herein according to different embodiments of the present teaching. As shown in FIG. 19B, the liveness of an iris may be detected based on light strobing, eye tracking, obfuscation, . . . , challenges, or any combination thereof. Details on such iris liveness detection methods are provided below with reference to FIGS. 20A-27B.

Figure 20A:
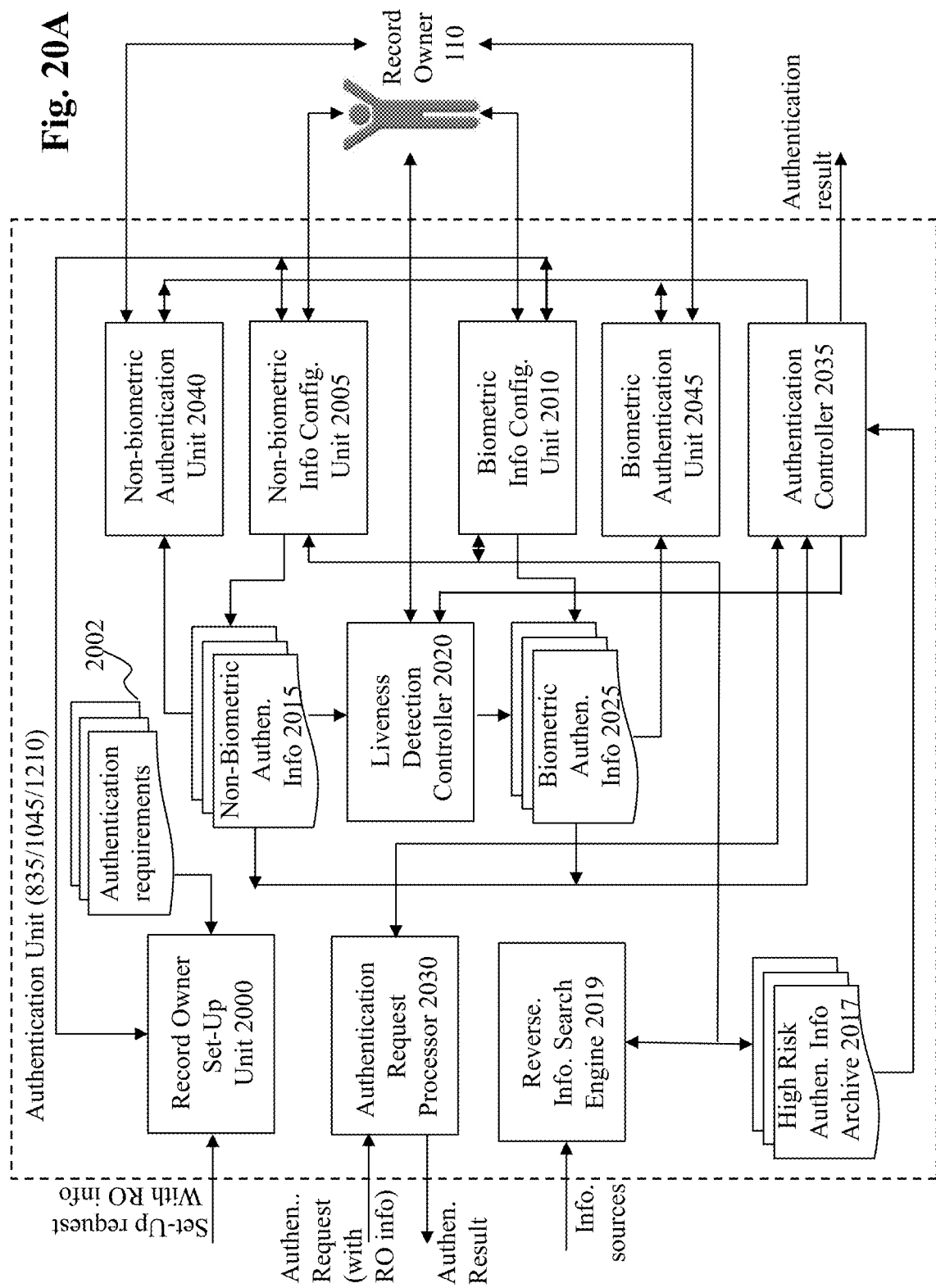
FIG. 20A depicts an exemplary high level system diagram of an authentication unit in a self-sovereign information management framework, according to an embodiment of the present teaching.

FIG. 20A depicts an exemplary high level system diagram of an authentication unit, according to an embodiment of the present teaching. The authentication unit in FIG. 20A may correspond to the authentication unit 835 in FIG. 8A (for a record owner when authentication occurs at the record owner's device), the authentication unit 1045 in FIG. 10 (for a trusted entity), or the authentication unit 1210 in FIG. 12 (for the transaction engine 150). In some embodiments, the record owner (RO) authentication unit 835 in FIG. 8A may carry out the authentication at the record owner's device so that it may not be needed for a trusted entity or the transaction engine 150 to perform authentication of a record owner remotely across the network. In some embodiments, the RO authentication unit 835 in the record owner application 805 may provide merely a mechanism for a record owner to interface with an authenticating party to response to requests. In this case, the RO authentication unit 835 may interface with the person to be authenticated (who could be the record owner) to acquire live authentication information (whether non-biometric or biometric) and then send such acquired authentication information to the authenticating party (a trusted entity or the transaction engine). The authentication unit as depicted in FIG. 20A is configured to perform authentication, whether it is by the record owner application 805, a trusted entity, or the transaction engine 150.

Figure 20B:
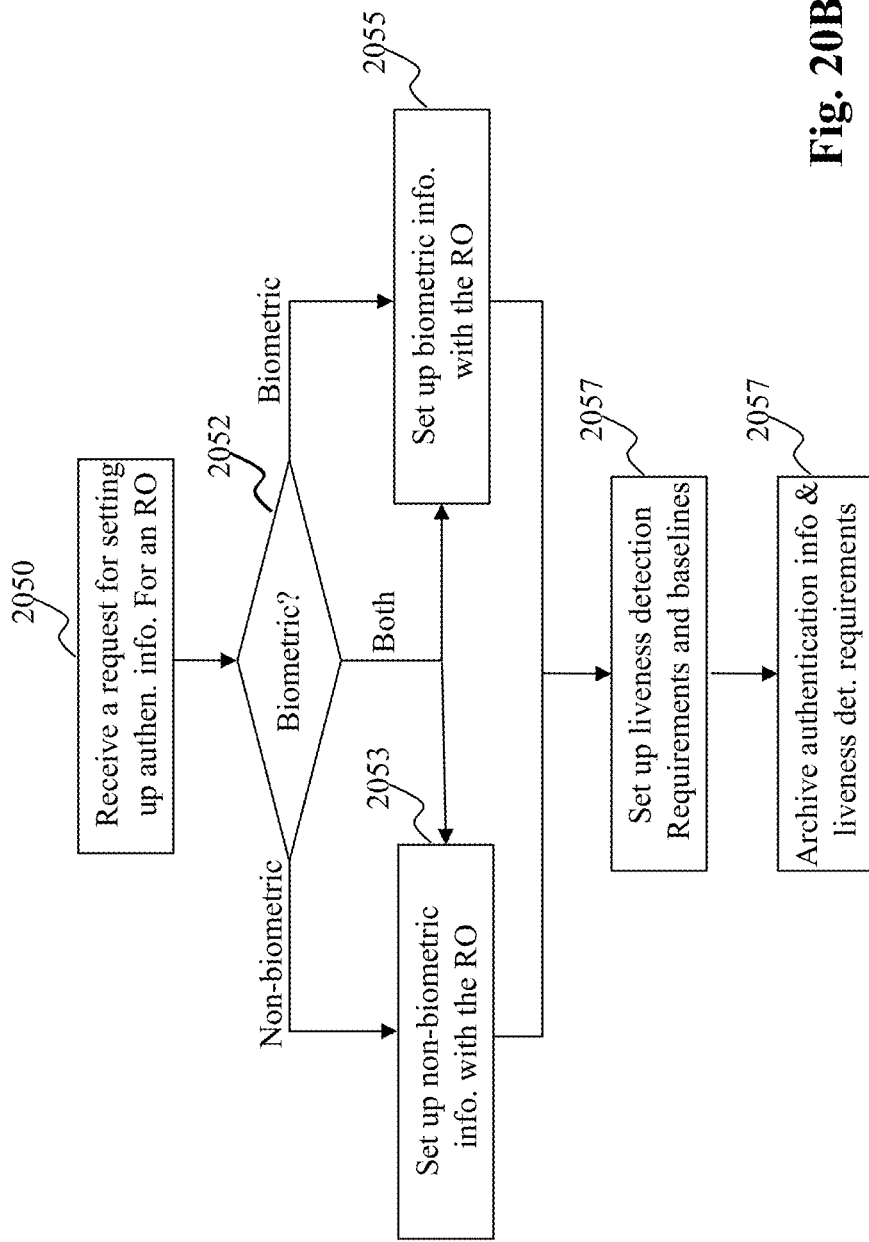

The authentication unit in FIG. 20A comprises processing components in different stages of the authentication. The first stage is to set up authentication information to be used for future authentication. The second stage is to perform liveness detection of a person who claims to be a record owner. The third stage is entered into after the liveness detection of the person is successful to authenticate the person based on previously stored authentication information. To facilitate the operations of the first stage, the authentication unit in FIG. 20A includes a record owner setup unit 2000, a non-biometric information configuration unit 2005, and a biometric information configuration unit 2010. FIG. 20B is a flowchart of an exemplary process for setting up authentication information of a record owner, according to an embodiment of the present teaching.

In operation, when the record owner setup unit 2000 receives, at 2050, a request for setting up authentication information for a record owner, it determines, at 2052 based on authentication requirements stored in storage 2002, the type of authentication information required, which may be non-biometric, biometric, or a combination of both. The set up operation is to establish the baseline authentication information that has to be proved before any access to the protected private data. As discussed herein, the setup for authentication information may be applied to the full set of private data of the record owner stored at the trusted entity or to a partial set of private data. In the latter situation, baseline authentication information may be set for each piece of the record owner's private data. To acquire non-biometric authentication information, the record owner setup unit 2000 invokes the non-biometric information configuration unit 2005 to set up, at 2053, non-biometric authentication information in 2015 with the record owner, and the biometric information configuration unit 2010 to set up, at 2055, biometric baseline authentication information in 2025 with the record owner. When different pieces of private information are set up with different associated baseline authentication information, they have to be individually unlocked using corresponding authentication information. In some embodiments, the non-biometric and/or biometric information configuration units 2005 and 2010 may also set up with the record owner any information, whether biometric or non-biometric, and a protocol thereof for detecting liveness, e.g., the iris information when light strobing is applied, . . . , obfuscation scheme to be applied, etc. Such information for liveness detection may be stored together with the respective authentication information.

In operations of the second and the third stages (to detect liveness of a person and to authenticate the person), the authentication unit in FIG. 20A performs authentication of the record owner via either non-biometric or biometric means. As disclosed herein, each piece of secure/private data may be required to be unlocked based on associated previously set authentication requirements, i.e., the authentication information associated therewith needs to be proved before the piece of data can be accessed. Which piece of secure/private data is associated with which authentication requirements is configured and stored in either the non-biometric authentication information 2015 or the biometric authentication information 2025 and such information may be retrieved when there is an access request with an indication of a specific piece of private data.

The authentication unit as depicted in FIG. 20A includes an authentication request processor 2030, an authentication controller 2035, and a liveness detection controller 2020 for liveness detection and a non-biometric authentication unit 2040 as well as a biometric authentication unit 2045 for authentication. Liveness detection is provided to prevent replay attacks. Solutions have been developed to prevent replay attacks on non-biometric information. As to biometric information, replay attacks have been on the rise and effective means are needed to prevent or counteract to that. For example, if an iris is used as biometric information to authenticate, various replay attacks have been used to circumvent the security measures. For instance, live video or images of a person's face may be captured and iris of the person's eye may be used to replay in the future or generate brute force iris patterns that closely match the real person's iris and then playback the generated iris image. To prevent such attacks, liveness detection is used to ensure that the presented biometric information is from a person "live."

FIG. 20C is a flowchart of an exemplary process for authenticating a person who claims to be a record owner, according to an embodiment of the present teaching. It includes both liveness detection and the authentication itself. Although it is shown in FIG. 20C that liveness detection proceeds the authentication (e.g., authentication is carried out after the lives detection is successful), the order may be reversed in accordance with the needs of applications.

In operation, an authentication session is initiated when the authentication request processor 2030 receives, at 2060, a request for authenticating a record owner. The authentication request processor 2030 may invoke the authentication controller 2035, which may then proceed to carry out the steps for the authentication. For example, the authentication controller 2035 may invoke the liveness detection controller 2020 with information that facilitates the liveness detection. For example, the claimed identity of the record owner may be provided to the liveness detection controller 2020 so that the liveness detection controller 2020 may use that information to access, at 2062 in FIG. 20C, the set liveness detection requirements associated with the record owner and determine, at 2064, whether the liveness is to be detected using biometric or non-biometric or both types of information.

If the liveness is to be detected using non-biometric information according to the previously set requirement, the liveness controller 2020 interfaces with the person who claims to be the record owner to gather dynamic information from the person and detects, at 2066, whether the person is live. If the liveness is to be detected using biometric information according to the previously set requirement, the liveness controller 2020 interfaces with the person to gather dynamically generated biometric information from the person and detects, at 2068, whether the person is live. If the set requirement is to rely on both non-biometric and biometric information to detect liveness of the person, the liveness detection controller 2020 will carry out the operations based on both.

Detecting liveness may be based on the dynamically gathered information and the information previously set for detecting liveness of the record owner and stored in the non-biometric and biometric authentication information storages 2015 and 2025, respectively. For example, to detect liveness of an iris, the record owner may previously have stored iris information in the authentication information store 2025, allowing a light strobing approach to detect liveness. For that purpose, during the set up operation, the biometric information configuration unit 2010 may have interfaced with the record owner to gather a series of iris images captured when light is applied to the eye at an agreed frequency. This series of iris images may be stored in the biometric authentication information storage 2025 (corresponding to the iris image of the record owner) under the record owner and retrieved so that they can be compared with the dynamically collected iris images of the person being authenticated under the same light strobing conditions. If the previously captured iris images under different lighting conditions match with the iris images dynamically captured under the same lighting condition, the person is live. The match may not be exact but may be within a specified range of confidence. If there is no match, the "person" being authenticated is not live.

In some embodiments, it may be required that all requirements designated for liveness detection have to be satisfied in order to consider a pass of the liveness detection. This is shown in FIG. 20C. That is, if any of the requirements related to liveness detection is not satisfied, determined at 2070, the liveness detection controller 2020 responds, at 2072, to the authentication controller 2035 that the authentication fails, which may cause the authentication controller 2035 to output an authentication result indicating a failure. In some embodiments, e.g., in a less restrictive application, not all requirements related to liveness detection have to be satisfied. For example, when any one of the requirements is met, the person is considered live.

When the authentication controller 2035 is informed that the liveness detection is successful (by the liveness detection controller 2020), it proceeds to determine the requirements for authenticating the person claiming to be the record owner. If biometric based authentication is needed, determined at 2074, the authentication controller 2035 invokes the biometric authentication unit 2045 with information needed, e.g., the identifier of the record owner. Upon being invoked, the biometric authentication unit 2045 performs, at 2078, authentication of the person based on previously stored baseline biometric information of the record owner. In performing biometric based authentication, various data processing steps may be performed to ensure quality. Generally, the processing steps may include data pre-processing to produce quality image, feature extraction to identify from the pre-processed images relevant features, matching the features extracted from the pre-processed image with features of the baseline biometric information, and then making an authentication decision based on the matching result. For example, based on an acquired iris image of the person being authenticated, pre-processing may include analyzing the images to apply certain operations to, e.g., remove any visible reflection in the eyes due to, e.g., external light, or apply hue filtering of the image in order to normalize the image. Such processing may be deployed to ensure that the baseline image features of an iris of a person and the acquired image features of the same iris are actually comparable even though the images are captured at different times of the same person under different lighting conditions. Similarly, certain pre-processing may be applied to images captured with a person's face to normalize so that light conditions or other factors will have a minimum impact on the quality of the authentication.

Referring back to FIG. 20C, if non-biometric based authentication is needed, determined at 2074, the authentication controller 2035 invokes the non-biometric authentication unit 2040 with information needed, e.g., the identifier of the record owner. Upon being invoked, the non-biometric authentication unit 2045 performs, at 2076, authentication of the person based on previously stored non-biometric information of the record owner. In some situations, both biometric and non-biometric based authentication are required and thus both will be carried out according to the requirements. If the authentication requirements are satisfied, either fully or partially (not shown), determined at 2080, the authentication controller 2035 responds, at 2082, to the request indicating that the authentication is successful. Otherwise, the authentication controller 2035 responds, at 2072, to the request indicating that the authentication has failed.

The authentication unit in FIG. 20A may further include a reverse information search engine 2019 related to identifying high risk authentication information and archiving such information in storage 2017 so that the use of high risk authentication information may be controlled to minimize risks. Such high risk authentication information may be utilized by the non-biometric information configuration unit 2005 and the biometric information configuration unit 2010 as reference to screen any authentication information related to record owners and block off those that pose security risks via replay attacks. Such high risk authentication information may be identified by the reverse information search engine 2019 from different information sources. Such information sources may include, but is not limited to, online sites, social media sources, public records, organization registrations such as schools, television networks, etc.

Figure 20D:
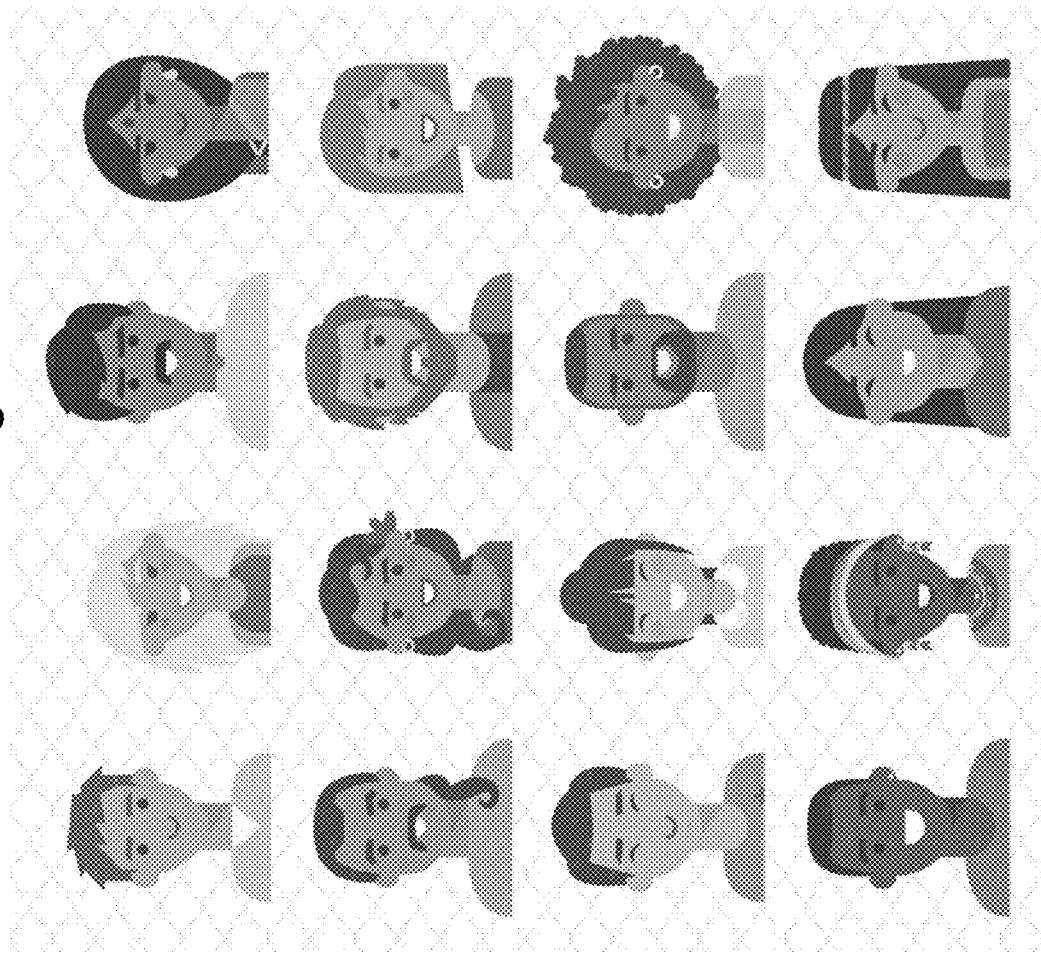
FIG. 20D illustrates the concept of reverse image search to prevent replay attacks, according to an embodiment of the present teaching.

High risk authentication information may include both non-biometric and biometric information. For instance, from Internet sources, there are large number of images available of different people or any parts of such people, e.g., fingerprints, faces, irises, etc. Some of such images may be of high quality and may be used for malicious reasons, e.g., to fake authentication. For instance, if a picture of a person's face has a reasonable orientation and adequately detailed, 3D facial features of the person may be constructed and used to make s fake face in 3D. As another example, a high resolution picture of a person may provide enough information to generate a picture of the person's iris. This is illustrated in FIG. 20D, which shows a set of pictures of different people accessible from the Internet. Some of them may be of such high resolution as to allow generation of fraudulent authentication information.

In some embodiments, with the high risk authentication information stored in 2017, the non-biometric and biometric information configuration units 2005 and 2010 may check, for each piece of authentication information to be set up for a record owner, whether similar information exists in the high risk information archive 2017. If so, the non-biometric and biometric information configuration unit 2005 and 2010 may refuse to use the piece of information to set up the authentication profile. Such checks may be performed regularly. In some situations, after a certain face picture of a record owner has been set up for authentication, a regular check by the reverse information search engine 2019 identifies that high risk face pictures associated with the same record owner are now available on the Internet, the reverse information search engine 2019 may record such high risk pictures in the storage 2017 under the record owner. In this way, when next time the authentication controller 2035 invokes the biometric authentication unit 2045, it may first check the high risk authentication information archive to retrieve the high risk pictures and passes on to the biometric authentication unit 2045, which may then adjust its authentication strategy accordingly. The adjustment may include other authentication information instead of the face. In this way, the security of the authentication is further improved.

FIG. 21A depicts an exemplary high level system diagram of the liveness detection unit 2020, according to an embodiment of the present teaching. In this exemplary embodiment, the liveness detection unit 2020 comprises an instruction processing unit 2120, a detection controller 2130, a liveness detection interface 2110, and a number of detectors, each of which is designated to detect liveness in a specific modality, including a non-biometric based detector 2150, a face based liveness detector 2160, an iris based liveness detector 2170, a fingerprint based liveness detector 2180, and a palm based liveness detector 2190. As discussed herein with reference to FIG. 19B, liveness detection based on fingerprint and palm may be carried out in using of vein present in the fingerprint and the palm. Details related to iris based liveness detection are provided with reference to FIGS. 22A-27B.

In terms of face based liveness detection, different approaches may be adopted. To detect a fraudulent access request, a challenge/response detection process may be deployed, during which the person being authenticated may be required to put up a gesture. For instance, a challenge may be to request the person to present an action, such as a smile, frown, left eye blink, saying "oh", squinting, etc. The detection system may capture the image of the person performing the gesture and analyze the visual features captured in the image to determine whether the person complied with the request as evidence of being live.

In another example of face based liveness detection, the person may be provided or presented something that is generally believed will cause the person to react. The detection system then observes, learns, and measures the biofeedback of the person to the challenge. For example, the detection system may present an image of a cute kitten/puppy, a photo of favorite scenery, or playback of a favorite piece of music, a picture of a favorite dish, etc. Such prompt may be selected based on a known profile or preferences of the record owner and set up as the baseline requirements set up with the record owner for the purpose of detecting liveness at the time of each access request. In some embodiments, smart devices such as a smart watch and other peripherals such as a Fitbit may be used to measure biofeedback over time, learning heart rate, gait, other skin coloration or temperature changes, pulse responses to stimuli, verifying the presence of the individual.

Figure 21B:
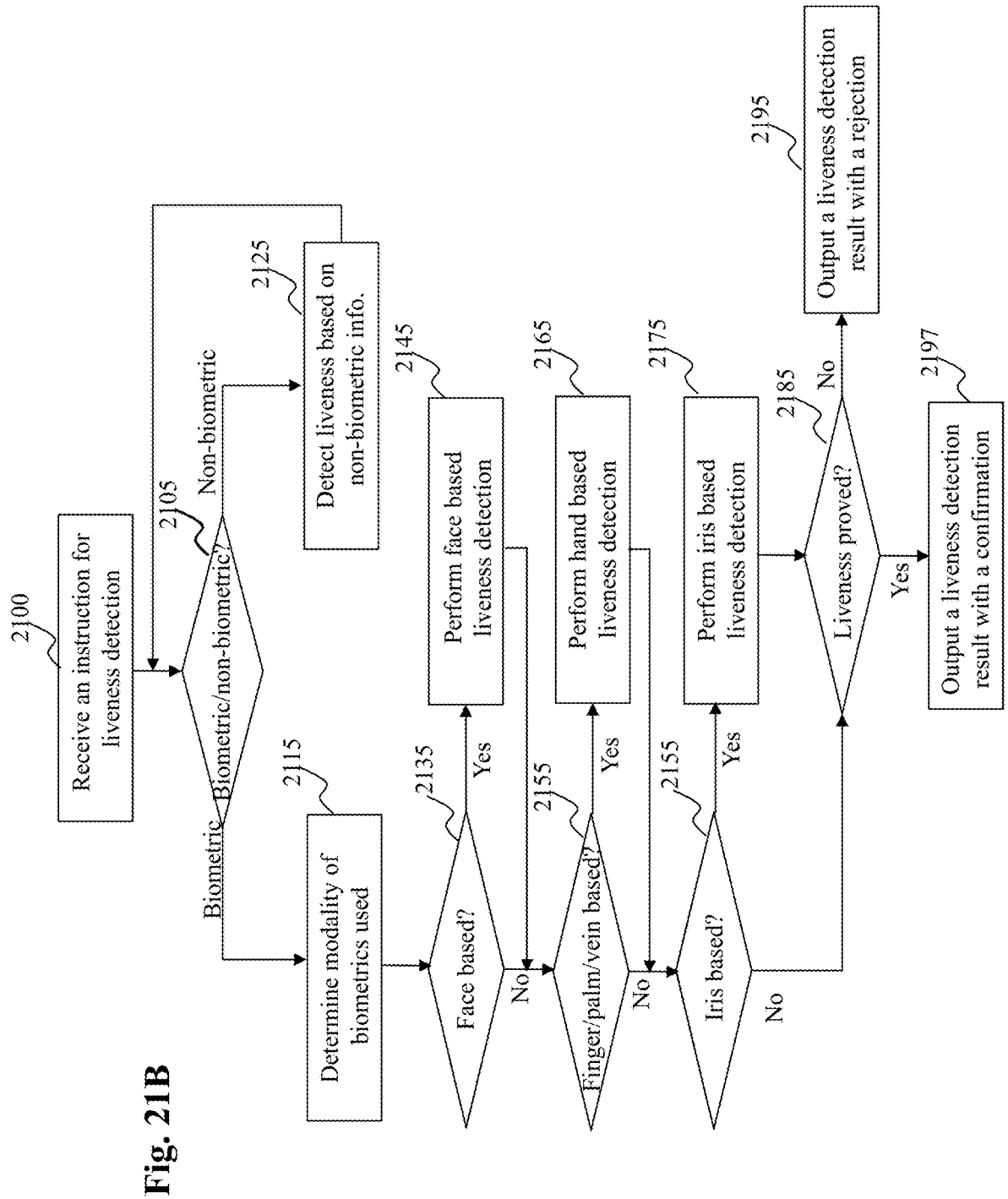
FIG. 21B is a flowchart of an exemplary process of a liveness detection controller, according to an embodiment of the present teaching.

FIG. 21B is a flowchart of an exemplary process of the liveness detection controller 2020, according to an embodiment of the present teaching. In operation, when the instruction processing unit 2120 in the liveness detection controller 2020 receives, at 2100, an instruction to carry out the liveness detection (e.g., from the authentication controller 2035), it invokes the lives detection controller 2130 to determine, at 2105, how to detect the liveness based on, e.g., information stored in a liveness detection configuration 2140 (which may be set up during the initial set up based on, e.g., the authentication information that has been set up and stored in the non-biometric and biometric authentication information storages 2015 and 2025, respectively).

If non-biometric based liveness detection has been set up, the liveness detection controller 2130 invokes the non-biometric based detector 2150 to detect, at 2125, liveness of the person by acquiring certain non-biometric information from the person who claims to be the record owner via the liveness detection interface 2110. For instance, the non-biometric based detector 2150 may retrieve the non-biometric liveness detection Q&As and administer a session in which security questions are asked and answers from the person is received via the interface 2110 and compared with the previously stored answers. In another example, via the liveness detection interface 2110, the person may be asked to perform some task (such as entering a text string or select some target based on cognitive skill) and receive the input of the person. Such dynamically collected information from the person may then be compared with the information stored to determine whether the person is live.

In some embodiments, both non-biometric and biometric based liveness detection may be applied. In this case, after the non-biometric based liveness detection, the process may circle back to the determination as to which modality of the biometric based liveness detection is to be used. This is shown in FIG. 21B that the process flows from 2125 back to 2105 to determine whether biometric based detection is to be applied.

If biometric based liveness detection has been set up, the liveness detection controller 2130 invokes the non-biometric based detector 2150 to detect the liveness of the person. Each of the biometric based detectors may be activated to determine, at 2115, which modality (or modalities) of biometric information is used to proceed with the liveness detection. If the face based detector 2160 determines, at 2135, that face information is to be used for liveness detection, it carries out, at 2145, face based liveness detection. If any of the fingerprint or palm or vein based liveness detection is to be applied, the corresponding fingerprint or palm based liveness detectors 2180 and 2190 proceed to perform, at 2165, hand based liveness detection. If iris information is to be used to detect liveness, the iris based liveness detector 2170 performs, at 2175, liveness detection based on iris information. In detecting the liveness based on respective biometric information, each liveness detector (2160-2190) may acquire dynamic biometric information from the person claiming to be the record owner via the liveness detection interface 2110. Each of the detectors 2160-2190 may require that the dynamic biometric information is acquired in a certain manner and such collected dynamic biometric information is then compared with what is stored in the biometric authentication information 2025 to determine whether the person is live.

Each of the detectors (2150-2190) may send their individual detection result to the liveness detection controller 2130 for an overall assessment. In some embodiments, the overall assessment may require that all detectors return positive results (i.e., finding that the person is live), which may be applied to an application that requires high security. In some applications, partial positive results may be acceptable which allows some irregularities in data variation and, hence, provides more flexibility yet less security. If the liveness detection controller 2130 determines, at 2185, that the liveness is approved, it outputs, at 2197, a liveness detection result with confirmation. If not, it outputs, at 2195, a liveness detection result indicating a failed liveness detection.

Figure 22A:
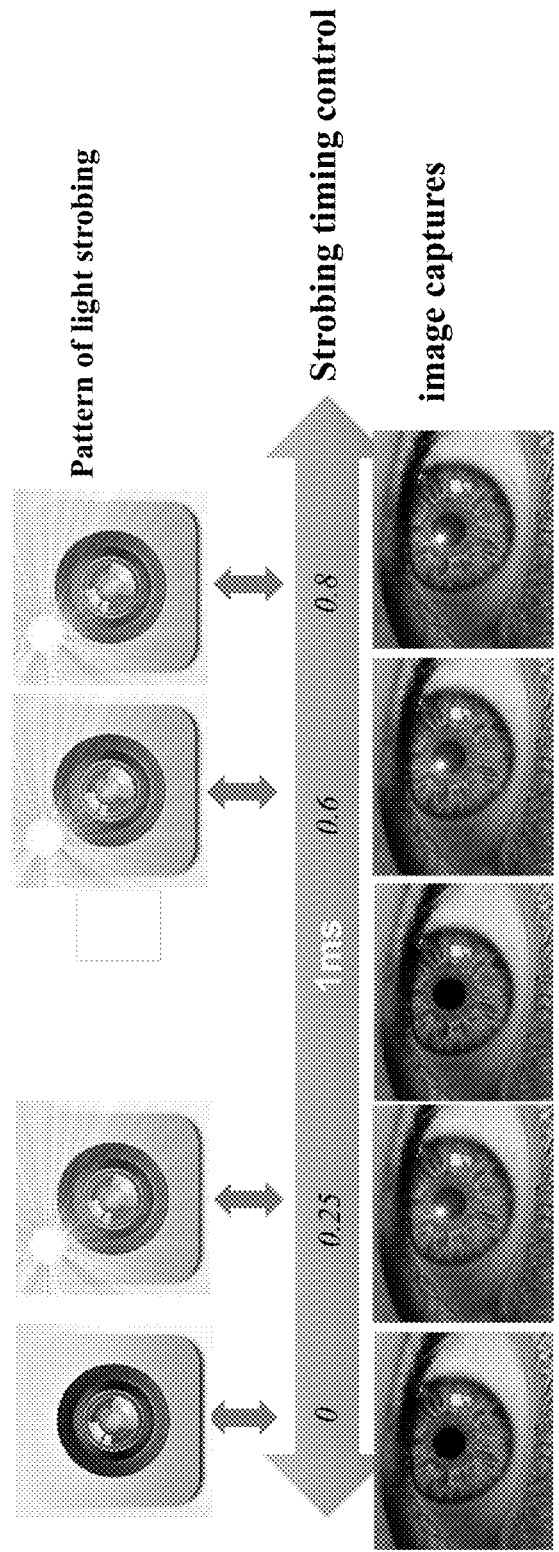
FIG. 22A depicts the concept of detecting liveness via light strobing, according to an embodiment of the present teaching.

As discussed herein, a number of iris based liveness detection methods can be applied to detect the liveness of a person, including light strobing, eye movement trajectory tracking based on projected focus dots, obfuscation, and challenge. The concepts associated therewith are illustrated in FIGS. 22A-22E. FIG. 22A depicts the concept of detecting liveness via light strobing, according to an embodiment of the present teaching. The light strobing is to apply some light to the eye of the person to be authenticated with a randomized light strobing pattern and capture the images of the iris. Based on such images, features related the iris at issue are identified and then compared with a baseline features of the same iris captured under ambient light. When light is flashed to an eye of a live person, this will lead to some change in the features related to the person's iris. For example, the pupil of the person may be dilated or constricted so that the shape of the iris changes.

In light strobing based liveness detection, the light strobing pattern may be randomized in each detection to improve security. For example, a light strobing pattern may involve, e.g., randomized strobing pattern as well as randomized light pattern. A strobing pattern may include a duration to apply light strobes, the number of strobes to be applied, the timing of each strobe (may have variable intervals), and the length of each strobe. A light pattern may refer to the lighting related parameters associated with each strobe, such as the wavelength and frequency of the light, the color of the light, the strength of intensity of the light, etc. The light strobing may be generated randomly based on some application sandbox or generated remotely using local input and synchronized with the application sandbox. Strobe patterns can be used as a nonce in this use case.

Iris images of the eye being applied the light strobing may be captured and evaluated against a baseline iris image captured under the ambient light condition to detect any change in the iris pattern, e.g., a change in the shape of the iris related to a reaction to the light strobing. Light histogram input may be used to improve iris pattern capture accuracy, especially in cases where multiple biometric captures are used during initial baseline identification, each with varying lighting conditions. In addition to being used to generate a random strobe pattern, an ambient lighting histogram may also be used to compare current lighting conditions to the various ambient lighting conditions used during baseline captures. Using the histogram comparison against the initial capture(s) enables implementation of digital filtering transformations to boost or lower black points or exposure levels to imitate and adjust current conditions over initial conditions.

In FIG. 22A, some of the parameters associated with light strobing are provided, including the time control of the strobing (e.g., timing at 0, 0.25, 0.6, 0.8, and 1.0 second marks), pattern of the strobing as to the light (e.g., normal light at 0 second, moderately bright light at 0.25 second, . . . , ), and the frequency (e.g., 5 strobes per second). To detect liveness, the light strobes are generated based on randomly generated parameters and applied to the eye of the person. At the same time, control signals are accordingly generated to control a camera to capture the iris of the person at each point of time when a light strobe is applied according to the frequency. The captured pictures corresponding to the strobing points of time are then compared with baseline iris images to determine whether the person is live. If the person is live, the stored pictures captured from the record owner at the time of set up authentication may then be compared with the iris image captured from the person at the time of authentication to confirm identity of the person. Details related to the liveness detection based on light strobing are provided with reference to FIGS. 24A-24B.

Figure 22B:
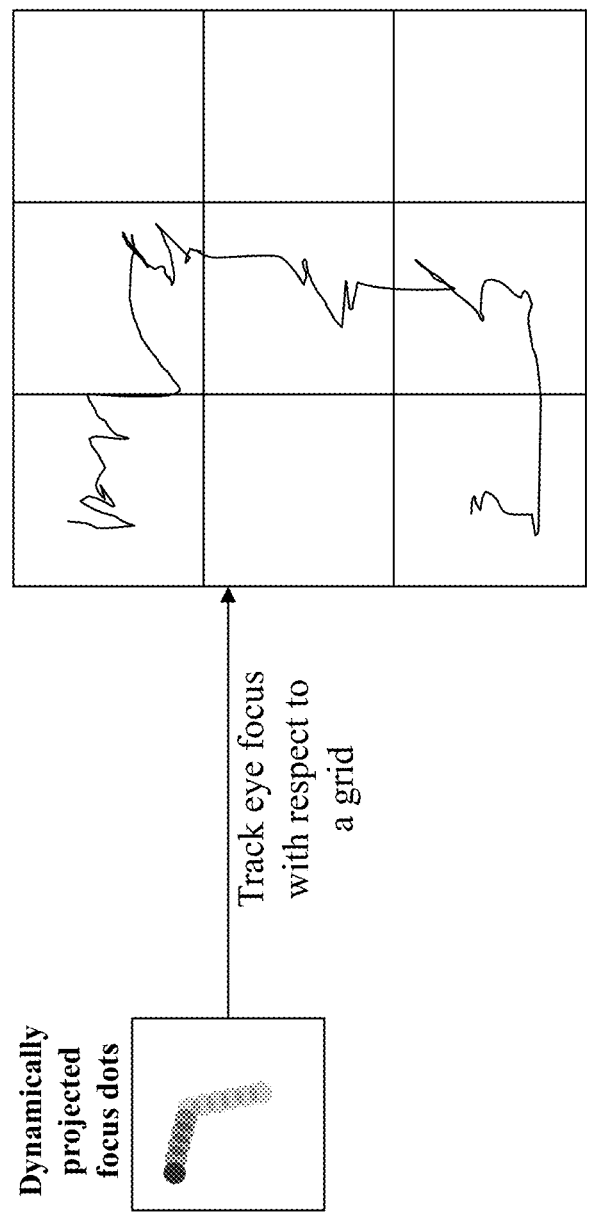
FIG. 22B depicts the concept of detecting liveness via focused dots, according to an embodiment of the present teaching.

FIG. 22B depicts the concept of detecting liveness via tracking eye movement trajectory, according to an embodiment of the present teaching. To detect liveness of an iris, focus dots are generated with certain changing coordinates and projected to a screen. The person to be authenticated is directed to eye tracking the projected dots. The movement of the eye of the person is tracked which forms a trajectory as shown in the grid in FIG. 11B. The tracked eye movement trajectory is compared with the designed trajectory of the focus dots. If the tracked trajectory matches with the movement trajectory tracked, the person is considered to be live. The match does not need to be an exact match but certain degree of similarity between the two trajectories may be required.

Figure 22C:
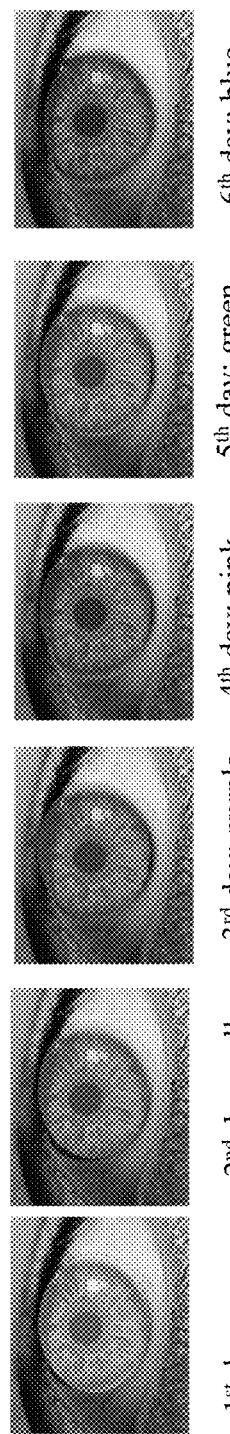
FIG. 22C depicts the concept of detecting liveness via obfuscation, according to an embodiment of the present teaching.

FIG. 22C depicts the concept of detecting liveness via obfuscation, according to an embodiment of the present teaching. This concept of detecting liveness requires the person being authenticated cooperate and follow an agreed protocol. In setting up the baseline authentication information including the protocol or information to be used to detect liveness, an obfuscation protocol may be mutually agreed upon between the record owner and the authenticating party (a trusted entity or the transaction engine 150). For example, in a period of multiple days, the record owner is required to wear a contact lens of a different colors on each of the days in the period during this period and each day is required to be a specific color (may not need to be different colors on all days). In some embodiments, the obfuscation pattern may not be limited to use of solid colors. In addition, the obfuscation pattern to be used for authentication may not be limited to what is observed from the center of the lens and obfuscation patters observed in other non-center areas of the lens may also be used for authentication, e.g., an area just inside of the outer edge of the lens.

In some embodiments, other means may also be used to implement the obfuscation based liveness detection. For example, instead of contact lens, glasses may be used to achieve the same, including normal glasses, sunglasses, or snap-ons with different colors applied according to a protocol. In this mode of operation, wearing lenses (whether contact, normal, sunglass, or snap-ons) according to a schedule creates a pattern on the eyes that a mobile camera can pick up. The iris pattern is seen through the lens, plus a random pattern superimposed thereon. The patterns would vary from person to person and on a daily rotation or even other rotations.

In some embodiments, when one mode of operation cannot proceed, e.g., the person lost a particular contact lens, certain fall back mechanisms may be initiated (not shown in figures). For example, if a contact lens is lost on a certain day, one permitted fall back alternative is to allow the person to be authenticated using instead lens covers with may be associated with a specified period in which such fallback approach is permitted (e.g., one day only). In some embodiments, a more general fallback alternative may be to turn off biometrics and fallback to non-biometric based detection such as using, e.g., a verification key stored at a secure location.

As the contact lens of a certain color serves as a filter to the iris picture, the iris image captured on each specific day should possess certain characteristics associated with the filtering effect. For example, as illustrated in FIG. 22C, a six day period is set to have a different color on each day, e.g., $1^{st}$ day gray, $2^{nd}$ day yellow, $3^{rd}$ day purple, $4^{th}$ day pink, $5^{th}$ day green, and $6^{th}$ day blue. Such knowledge may be set up so that only the record owner knows the schedule. A starting date may also be set so that the cycles repeat for every 6 days. On a specific day, the liveness detection mechanism determines the day within each cycle based on the starting date and then captures an image of the iris of the person with a specific contact lens. Based on the iris image, it can be determined whether the person complies with the agreed protocol based on an analysis of the iris image.

Figures 22D, 22E:
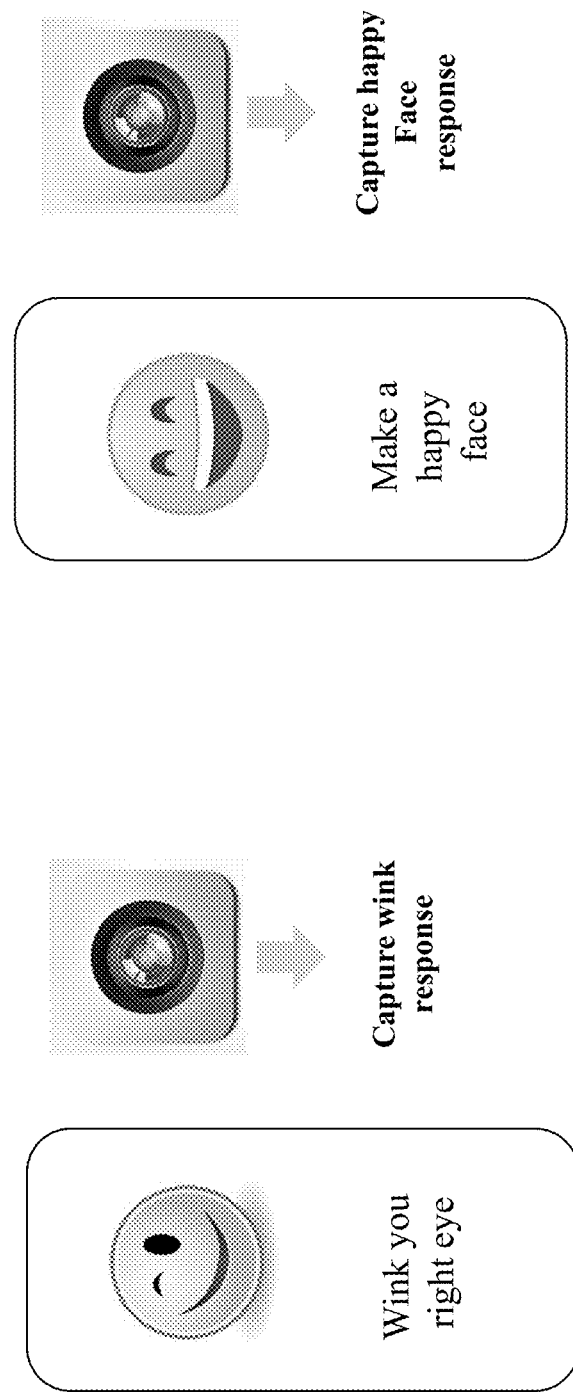
FIGS. 22D and 22E depict the concept of detecting liveness via challenge/response, according to an embodiment of the present teaching.

FIGS. 22D-22E depict the concept of detecting liveness via challenges/responses, according to an embodiment of the present teaching. Similar to challenges that can be applied using non-biometric information (e.g., request the person to type something), challenges used with respect to biometric based liveness detection may be directed to the requests to the person to provide biometric information created in response to the requests. For example, as illustrated in FIG. 22D, the liveness detection mechanism may ask the person to wink his/her eye and then capture an image of the person. There are other challenges that can be presented to the person. Another example is to ask the person to make a happy face and capture an image, as shown in FIG. 22E. These challenges, if followed, may yield pictures of the person with reasonably distinct and detectable features. For instance, when a person winks his/her eye, an analysis of the image captured such a response to the challenge may extract facial features that represent winking, e.g., one eye is bigger than the other. Similarly, when the person responds to a challenge asking him/her to make a happy face, an analysis of an image capturing the response may detect facial features that correspond to a smile face (e.g., smile with eyes are arched, and mouth corners are elevated).

Figure 23A:
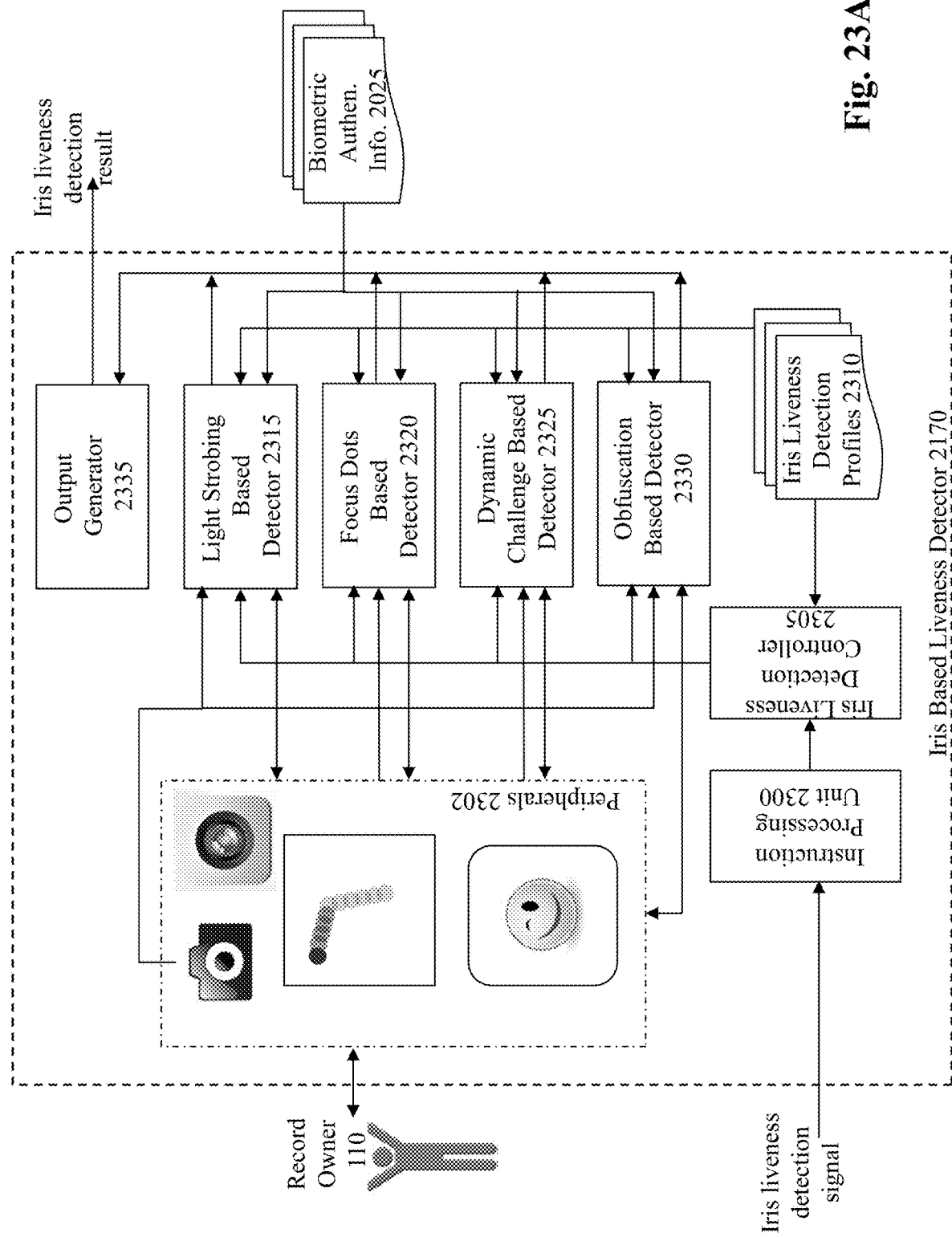
FIG. 23A depicts an exemplary high level system diagram of an iris based liveness detector, according to an embodiment of the present teaching.

FIG. 23A depicts an exemplary high level system diagram of the iris based liveness detector 2170, according to an embodiment of the present teaching. In this illustrated diagram, the iris based liveness detector 2170 is configured to be able to detect liveness based on any of the liveness detection methods as disclosed in FIGS. 22A-22E and any combination thereof. The exemplary iris based liveness detector 2170 includes various peripherals 2302, an instruction processing unit 2300, an iris liveness detection controller 2305, a light strobing based detector 2315, a focus dots based detector 2320, a dynamic challenge based detector 2325, an obfuscation based detector 2330, and an output generator 2335. The peripherals 2302 may reside at the record owner device and may be controlled either locally (e.g., if the authentication is performed by the record owner application) or remotely (if the authenticating party is remote). Such peripherals may include one or more light source(s), one or more cameras (which can be the camera of the record owner device), a display screen on which focus dots may be displayed over time for the eye to follow or to display some instructions.

The detectors based on different methods 2315-2330 may conduct the liveness detection based on information stored in the biometric authentication information 2025 as well as iris liveness detection profiles 2310 which may specify certain parameters or protocols associated with liveness detection. Such parameters or protocols may be dynamic or static. For example, in using light strobes to detect liveness, the frequency and lighting parameters may be specified therein and such parameters may be dynamically adjusted in order to further improve security. In operation, the iris based iris detector 2170 is activated by the detection controller 2130 according to a configuration related to a record owner as to how the liveness is to be detected.

Figure 23B:
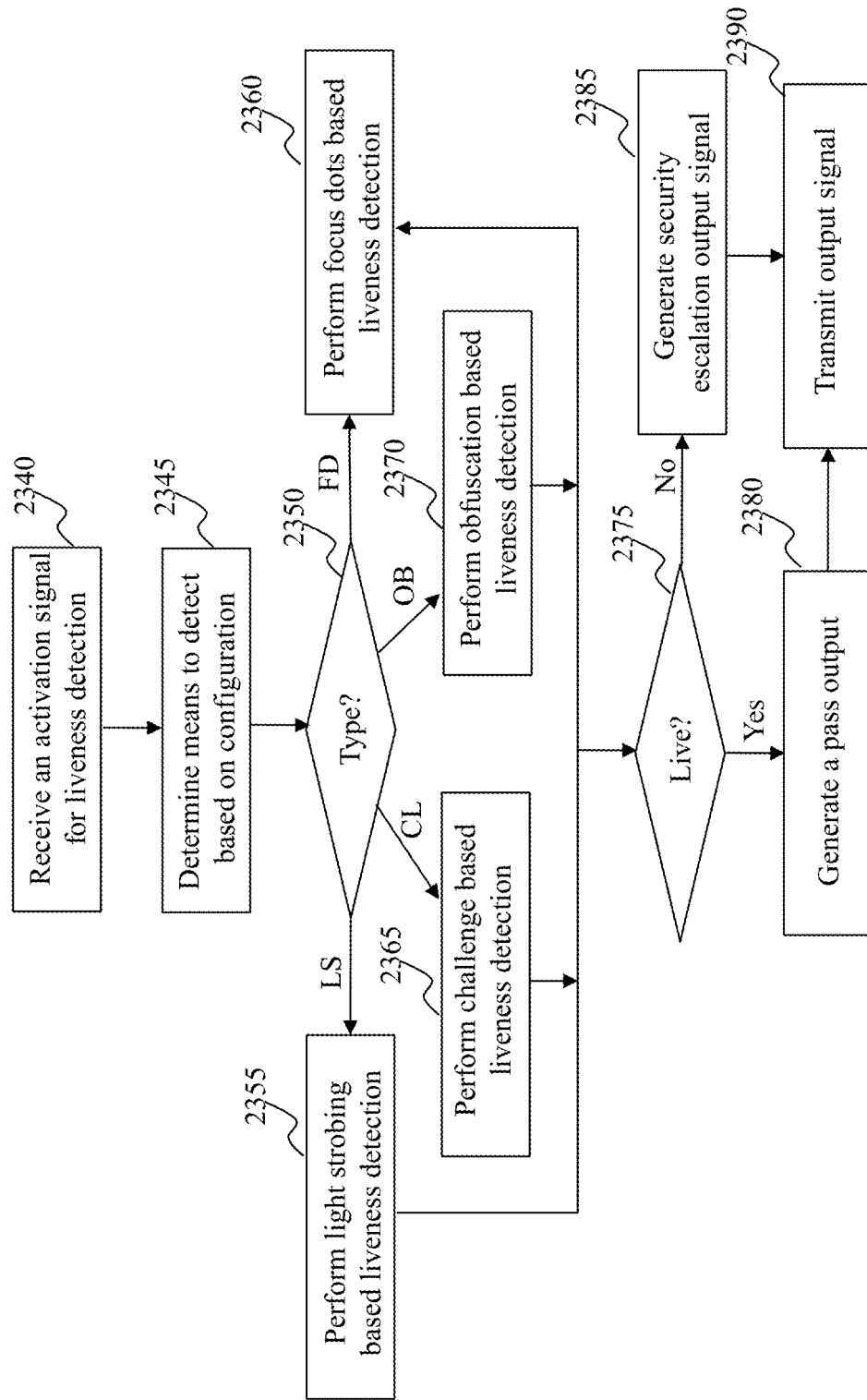
FIG. 23B is a flowchart of an exemplary process of an iris based liveness detector, according to an embodiment of the present teaching.

FIG. 23B is a flowchart of an exemplary process of the iris based liveness detector 2170, according to an embodiment of the present teaching. Upon receiving an activation signal for iris based liveness detection at 2340, the instruction processing unit 2300 invokes the iris liveness detection controller 2305, which determines, at 2345, which of the iris based liveness detection approaches is to be used based on the configuration stored in an iris detection profiles 2310. If it is determined, at 2350, that light strobing approach is to be used, the iris liveness detection controller 2305 invokes the light strobing based detector 2315 to perform, at 2355, iris liveness detection based on light strobing. Details related to light strobing are provided with reference to FIGS. 24A-24B.

If it is determined, at 2350, that a focus dots based approach is to be used, the iris liveness detection controller 2305 invokes the focus dots based detector 2320 to perform, at 2360, iris liveness detection based on focus dots projection and eye movement tracking. Details related to light strobing are provided with reference to FIGS. 25A-25B. If it is determined, at 2350, that a challenge approach is to be used, the iris liveness detection controller 2305 invokes the dynamic challenge based detector 2325 to perform, at 2365, iris liveness detection based on dynamic challenges. Details related to light strobing are provided with reference to FIGS. 26A-26B. If it is determined, at 2350, that an obfuscation approach is to be used, the iris liveness detection controller 2305 invokes the obfuscation based detector 2330 to perform, at 2370, iris liveness detection based on light strobing. Details related to light strobing are provided with reference to FIGS. 24A-24B. In some embodiments, the liveness of an iris may be detected using more than one of the disclosed approaches. For example, a person to be authenticated may be asked to track focus dots displayed on a screen and to make a happy face.

In some embodiments, each of the invoked detectors will perform liveness detection based on what is specified in the biometric authentication information storage 2025. In some embodiments, an iris liveness detector (any of 2315-2330) may also utilize some dynamically configured parameters, e.g., stored in the iris liveness detection profiles 2310 in performing liveness detection. Each detector (2315-2330) returns its detection result to the output generator 2335, which may then determine, at 2375, whether the iris at issue is live. When the iris liveness detection is performed in more than one mode, the output generator 2335 may employ either an OR an AND function to combine the detection results from different detectors to determine whether the person is live. If the person is considered live, determined at 2375, the output generator 2335 generates, at 2380, an output signal indicating a pass and sends out, at 2390, the output signal (e.g., to the detection controller 2130 in FIG. 21A). If the detected is considered failed (no liveness is detected), the output generator 2335 generates, at 2385, an output signal indicating a security alert and sends out the output signal at 2390.

Figure 24A:
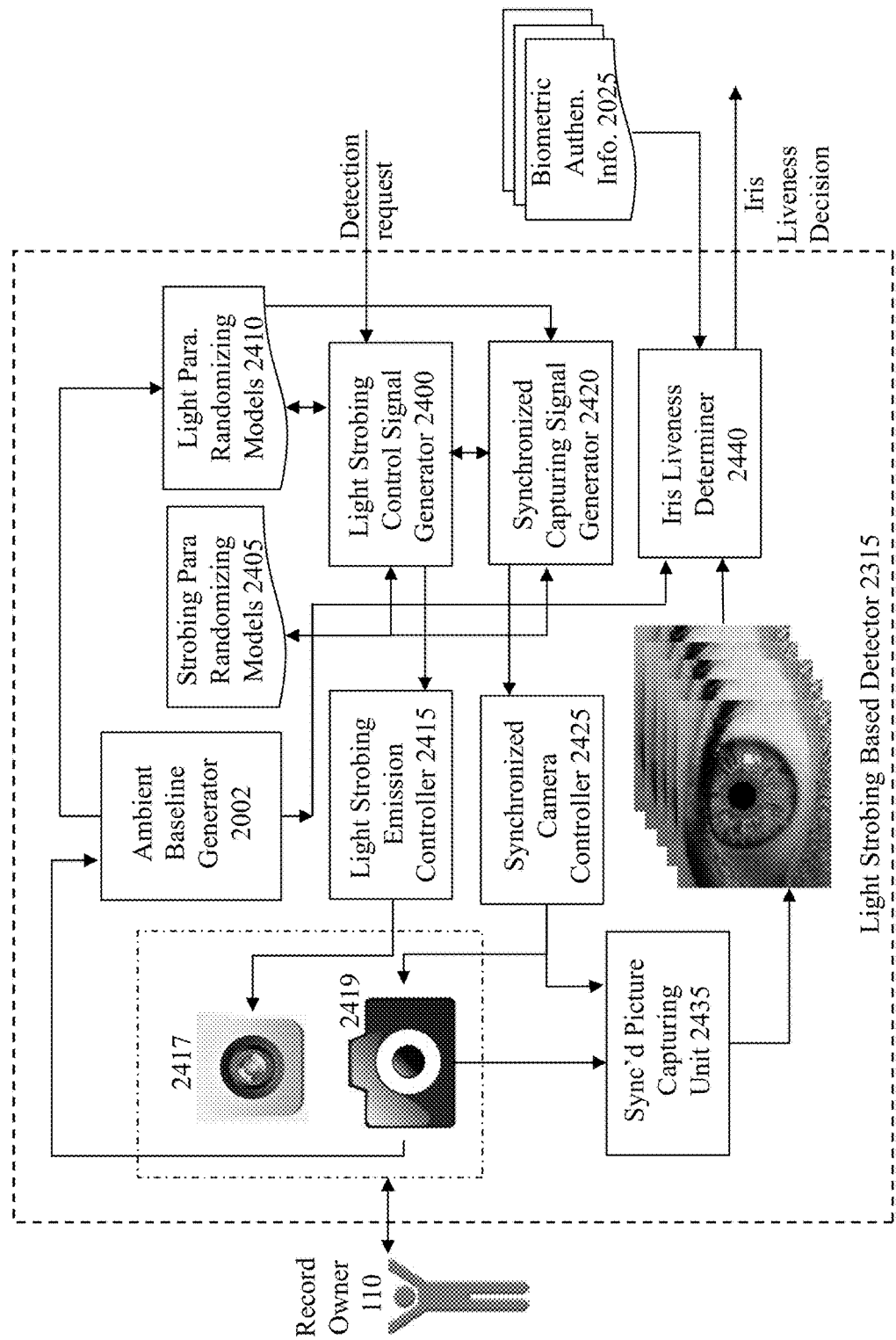
FIG. 24A depicts an exemplary high level system diagram of a light strobing based liveness detector, according to an embodiment of the present teaching.

FIG. 24A depicts an exemplary high level system diagram of the light strobing based detector 2315, according to an embodiment of the present teaching. In this mode of operation, liveness of an iris is detected based on reaction of eyes detected when light strobes are applied to the eyes. A live person should react to light strobes when the light is shining to the eyes. For example, when a live person reacts to the shining lights of, e.g., varying colors with different wavelength or intensity, the shape of irises of his/her eyes will change. When such a change is detected from the images captured during the light strobing process, it can be used to confirm that the person is live. In the illustrated embodiment, the light strobing based detector 2315 comprises a light strobing control signal generator 2400, an ambient baseline generator 2002, a synchronized capturing signal generator 2420, a light strobing emission controller 2415, a synchronized camera controller 2425, a synchronized picture capturing unit 2435, and an iris liveness determiner 2440. There are also peripheral devices, e.g., a light source 2417 and a camera 2419, which may be located on a record owner device and controlled by various components as described herein.

Figure 24B:
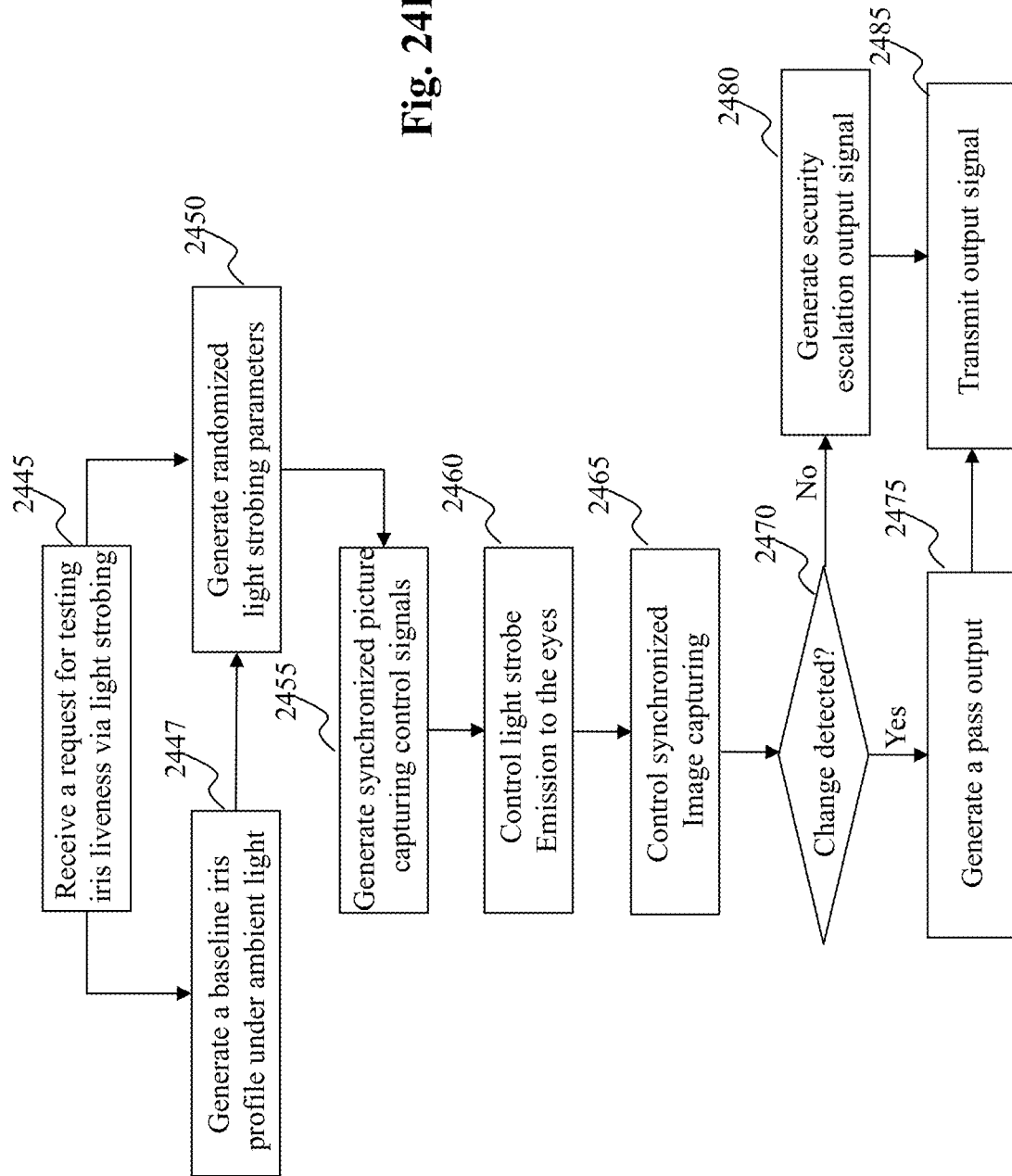
FIG. 24B is a flowchart of an exemplary process of a light strobing based liveness detector, according to an embodiment of the present teaching.

FIG. 24B is a flowchart of an exemplary process of the light strobing based detector 2315, according to an embodiment of the present teaching. In operation, when the light strobing signal generator 2400 receives, at 2445, a request for performing light strobing based liveness detection, it may first, at 2447, establish the baseline iris profile of the person under the ambient light condition (e.g., without light strobing). Based on this baseline, a detection in a change in iris observed when light strobing is applied may be used to confirm whether the iris captured in the baseline represents an iris of a live person. Such a baseline established under the ambient light may be used both for generating light strobing parameters (against the baseline ambient light) and for comparing the iris images captured in a baseline image of the person and the iris images captured under light strobing conditions.

In this illustrated embodiments, the light strobing control signal generator 2400 may randomize strobing parameters and then generate control signals corresponding to such randomized strobing parameters. In some embodiments, the randomized parameters may include strobing parameters and strobing light parameters. Exemplary strobing parameters include during of the strobing, a number of times strobing light is to be applied to the eyes, intervals (can be variable intervals) between adjacent strobes, and a length in light of each strobing to be applied, etc. Exemplary strobing light parameters may include frequency/wavelength of each strobing light, intensity of each strobing light, and the color of each strobing light. Generation of each of these parameters may be randomized according to some profile or models stored in, e.g., 2405 (randomizing models used to randomize strobing parameters) and 2410 (randomizing models used for randomizing light parameters for the strobes). In some embodiments, the strobing parameter randomizing models 2405 may be dynamically configured based on, e.g., the baseline established by 2447 with respect to the current ambient light conditions. For example, the current ambient light condition captured in the baseline may be used to specify the range of length of time for each strobing signal, e.g., a darker condition may require that the strobing signals to have a longer exposure time. The strobing light parameter randomizing models 2410 may also be dynamically configured by the ambient baseline generator 2447 based on observed current ambient light conditions. For instance, a range of color/intensity for the strobes that ensure effectiveness of liveness detection may depend on the current ambient light conditions.

Based on such retrieved operational parameters, the light strobing control signal generator 2400 generates, at 2450, control signals for generating the light strobes applied to the eye of the person to be authenticated. Such control signals are generated in accordance with the randomly generated strobing parameters, which dictate a duration of time to apply light strobing, how many strobes to apply, when to apply each strobe, how long is each strobe, and the randomly generated light parameters, which include the frequency/wavelength/color/intensity for each of the strobes. To operate synchronously, the synchronized capturing signal generator 2420 is invoked to generate, at 2455, image capture control signals that are synchronized with the strobing parameters as to duration, timing, and length of each of the strobes. In this way, images of the iris of the person at the moments strobes are applied may be captured for liveness detection.

The light strobing control signals generated by the light strobing control signal generator 2400 may also be sent to the light strobing emission controller 2415, which controls, at 2460, the light source 2417 to emit the light strobes in accordance with the control signals in terms of the duration, timing, length, frequency, wavelength, and color associated with each of the randomly generated strobes. At the same time, the image capture control signals generated by the synchronized capturing signal generator 2420 are sent to the synchronized camera controller 2425, which controls, at 2465, the synchronized picture capturing unit 2435 to acquire images of the iris from camera 2419 synchronously at the times when the light strobes are applied. The images of the iris captured by the synchronized picture capturing unit 2435 are analyzed by the iris liveness determiner 2440 to determine, based on the baseline established under the ambient light condition, whether any change in the iris is detected. Such a change may be a change in iris' shape due to a reaction to light strobing that should occur to a live person. If a change is detected from the captured images, determined at 2470, the iris liveness determiner 2440 generates, at 2475, an iris liveness detection output indicating a pass of the test and transmits, at 2485, the output signal. If no movement is detected, the iris liveness determiner 2440 generates, at 2480, the output with a security escalation signal and transmits, at 2485, the output signal.

Figure 25A:
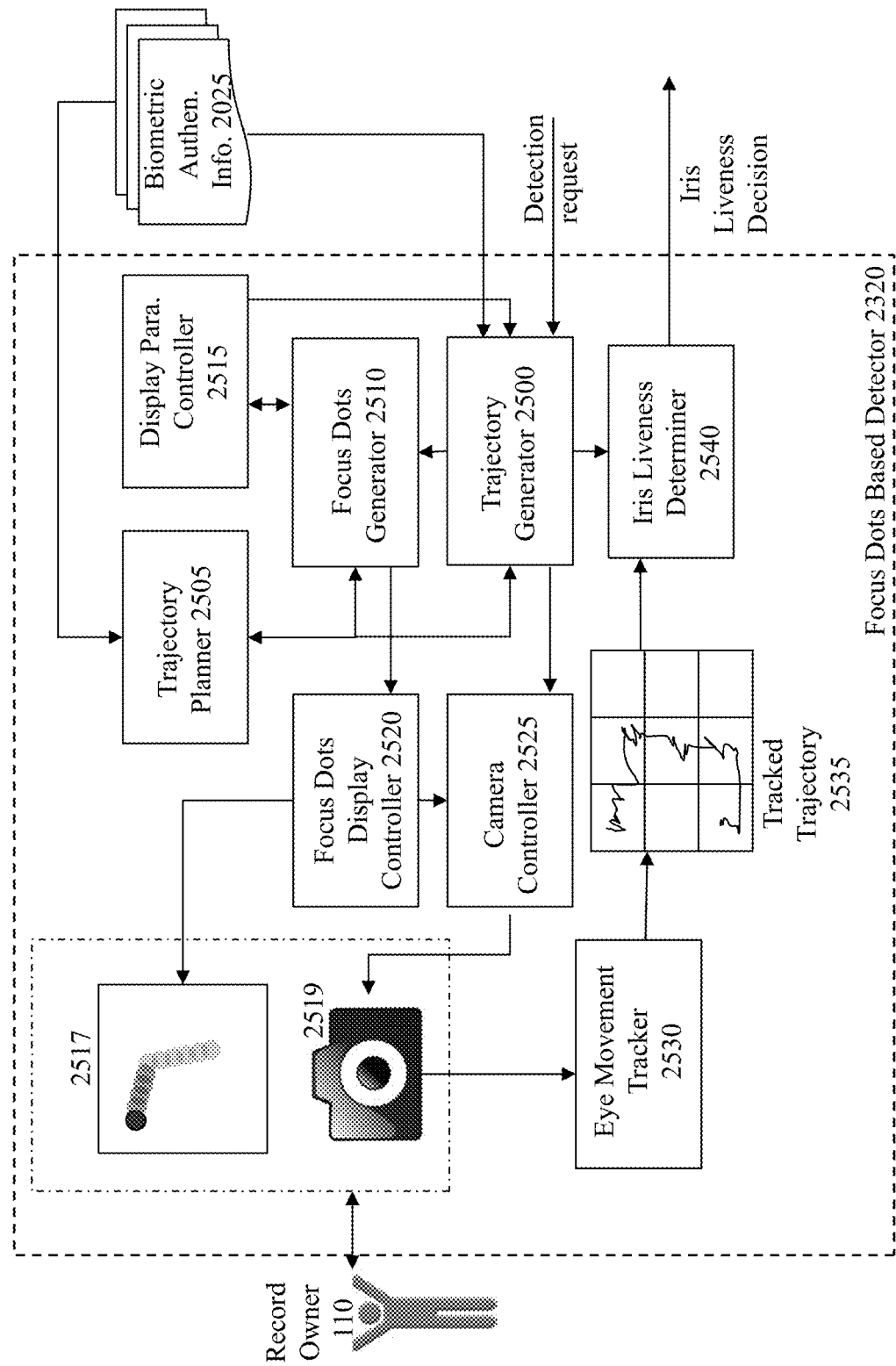
FIG. 25A depicts an exemplary high level system diagram of a focus dot based liveness detector, according to an embodiment of the present teaching.

FIG. 25A depicts an exemplary high level system diagram of the focus dots based detector 2320, according to an embodiment of the present teaching. In this mode of operation, liveness is detected by tracking the eye movement of the person to be authenticated when focus dots are projected, according to some planned trajectory, on a display screen and the person is asked to follow the displayed focus dots. An eye movement trajectory is then detected by tracking the person's eye movements. If the tracked trajectory is consistent with the planned trajectory, the person is considered live. In this illustrated embodiment, the focus dots based detector 2320 comprises a trajectory generator 2500, a trajectory planner 2505, a focus dots generator 2510, a display parameter controller 2515, a focus dots display controller 2520, a camera controller 2525, an eye movement tracker 2530, and an iris liveness determiner 2540.

FIG. 25B is a flowchart of an exemplary process of the focus dots based detector 2320, according to an embodiment of the present teaching. In operation, when the trajectory generator 2500 receives, at 2545, a request for detecting iris liveness based on focused dots, the trajectory generator 2500 proceeds to generate a trajectory along which focus dots are to be generated and displayed to the person to be authenticated. The trajectory of the focus dots may be pre-configured at the time the biometric authentication information is set up. In this case, the trajectory generator 2500 may access such set up from the biometric authentication information storage 2025 to retrieve the trajectory parameters.

In some embodiments, the trajectory to be used in detecting liveness may be dynamically generated (more secure). In this case, the biometric authentication information 2025 may provide some parameters that can be used to dynamically create a trajectory to be used for liveness detection. In this case, the trajectory generator 2500 may invoke the trajectory planner 2505 to create a trajectory, e.g., in some case based on information stored in the biometric authentication information storage 2025. Based on either embodiments, a trajectory is generated at 2550 and based on such a trajectory, the trajectory generator 2500 invokes the focus dots generator 2510 to generate, at 2555 in FIG. 25B, focus dots along the trajectory. In some embodiments, the focus dots may be generated based on some parameters from the display parameter controller 2515 so that the focus dots, when displayed to the person, will exhibit certain characteristics. For example, each of the focus dots may need to have a certain pattern (e.g., a solid circle or square) with some dimensions (e.g., a certain diameter) or certain color (e.g., green or red). Such display parameters may be used in conjunction with the positions of the focus dots so that focus dots can be rendered on a display visible to the person at positions along the trajectory with certain visual characteristics.

The focus dots generated along the trajectory may then be sent, with rendering parameters, to the focus dots display controller 2520 so that the focus dots display controller 2520 may control to display, at 2560, the focus dots according to the rendering parameters. The generated trajectory may be sent to both the camera controller 2525 and the iris liveness determiner 2540. Upon receiving the trajectory, the camera controller 2525 may then proceed to control the camera to capture the images or video of the eyes of the person to obtain a series of images, which are then used by the eye movement tracker 2530 to track, at 2565, the eye movement and generate a tracked eye movement trajectory 2535. The tracked eye movement trajectory 2535 is then compared with the trajectory generated by the trajectory generator 2500. If the tracked eye movement trajectory matches with, determined at 2570, the generated or planned trajectory, the person is considered live. The match may not be exact match and a degree of similarity between the two trajectories that will be considered to be acceptable may be set according to application needs. When there is a match, the iris liveness determiner 2540 generates, at 2575, an output signal indicating a pass and sends out, at 2585, the output signal. If there is no match, it is considered no live person and the iris liveness determiner 2540 generates, at 2580, an output signal indicating a security escalation alert and outputs the output signal at 2585.

Figure 26A:
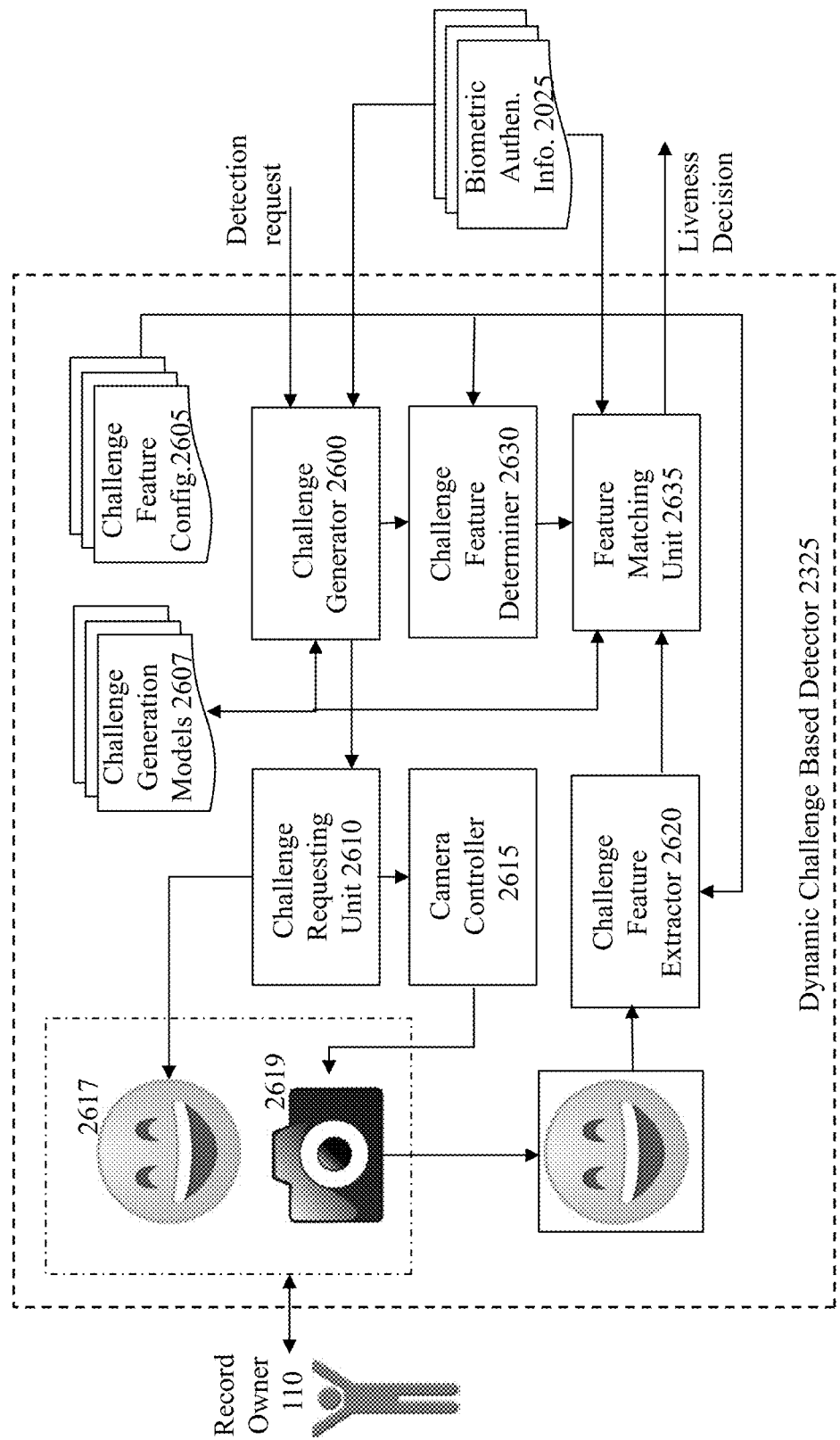
FIG. 26A depicts an exemplary high level system diagram of a dynamic challenge based liveness detector, according to an embodiment of the present teaching.

FIG. 26A depicts an exemplary high level system diagram of the dynamic challenge based detector 2325, according to an embodiment of the present teaching. In this mode of operation, liveness is detected by determining whether the person being authenticated is able to follow instruction to make certain facial expression. For example, when a live person is asked to wink his/her eye, following the instruction may cause an undetectable iris in one eye. If a live person is asked to make a happy face, following the instruction may cause that a portion of the iris may become undetectable or occluded or changed. Although this mode of operation is presented herein in the context of iris based liveness detection, challenges may also be used for face based liveness detection. For instance, when the person makes a certain facial expression, certain signature facial features may be detected to confirm the expression. If a person winks his left eye, the shape of the left eye may change to a curve. If a person makes a happy face, both eyes may become more curved. In this illustrated embodiment, the mechanism disclosed herein for challenge based liveness detection may be used for both iris based liveness detection and for face based liveness detection.

Figure 26B:
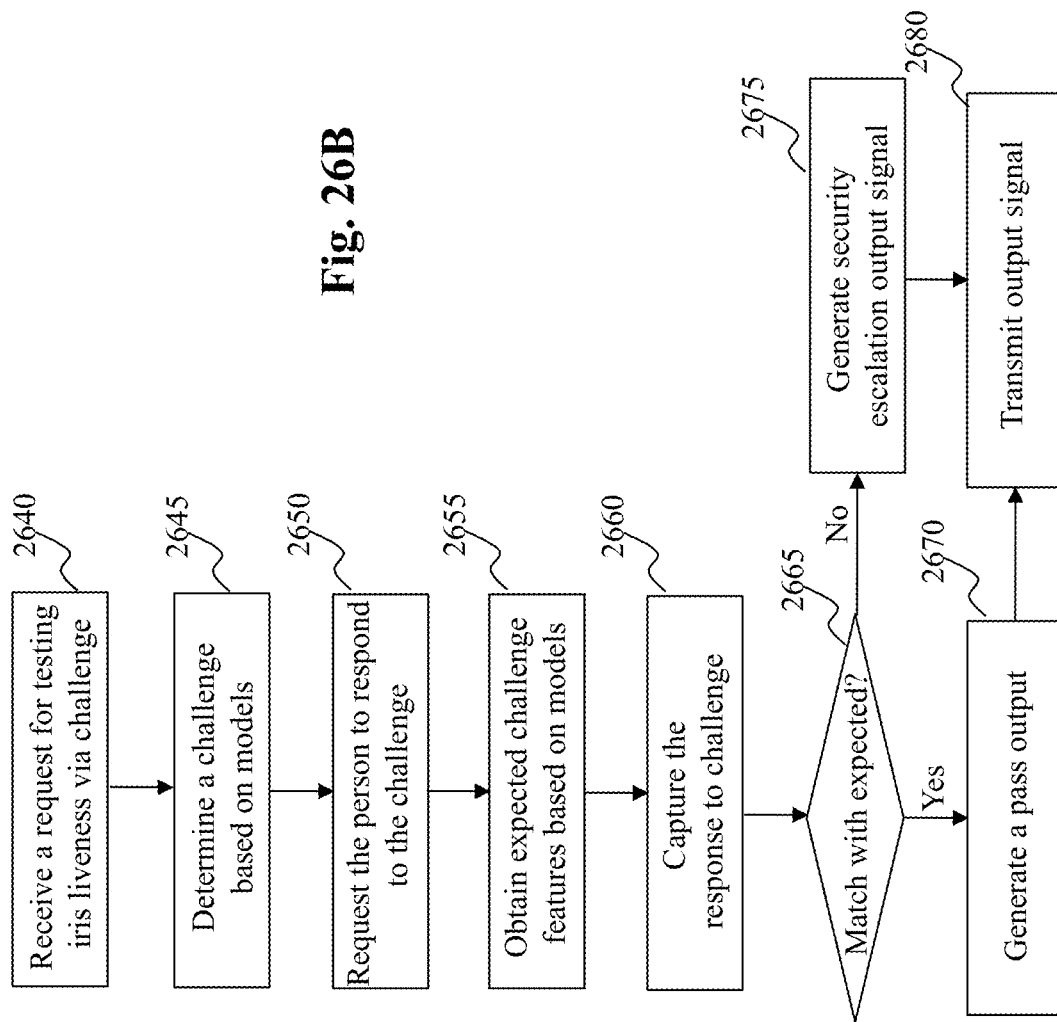
FIG. 26B is a flowchart of an exemplary process of a dynamic challenge based liveness detector, according to an embodiment of the present teaching.

In the illustrated embodiment depicted in FIG. 26A, the dynamic challenge based detector 2325 comprises a challenge generator 2600, a challenge requesting unit 2610, a camera controller 2615, a challenge feature extractor 2620, a challenge feature determiner 2630, and a feature matching unit 2635. FIG. 26B is a flowchart of an exemplary process of the dynamic challenge based detector 2325, according to an embodiment of the present teaching. In operation, when the challenge generator 2600 receives, at 2640, a request to perform liveness detection, it generates, at 2645, a challenge. The dynamic challenge may be generated based on some pre-configured parameters stored in the biometric authentication information in 2025 or based on challenge generation models stored in storage 2607. Information related to the generated challenge may then be sent to the challenge requesting unit 2610 so that the person to be authenticated may be asked, at 2650, to respond to the challenge. For example, if the challenge generated is to ask the person to wink his/her left eye, the challenge requesting unit 2610 requests the person to wink the left eye.

To enable liveness detection based on a response from the person in response to the challenge, the challenge generator 2600 may invoke the challenge feature determiner 2630 to generate, at 2655, challenge features that may be expected to be observed from the person if the person is live. Such expected challenge features may be determined based on challenge feature configuration 2605, which may specify, e.g., for each challenge that may be used, features expected to be observed. For instance, for challenge of making a happy face, expected features for this challenge may include narrowed eyes with curved shapes. Such expected features may be retrieved by the challenge feature determiner 2630 based on the type of challenge to be used.

The camera controller 2615 is activated to control the camera 2619 to capture images of the person after the challenge request is made. The acquired images of the person after the challenge request is made may then be acquired, at 1660, and sent to the challenge feature extractor 2620. The expected challenge features retrieved by the challenge feature determiner 2630 may also be made available to the challenge feature extractor 2620 to guide it to identify from the acquired images of the person. If the person is live, some features may be identified from the acquired images. Otherwise, the expected features may not be found. After analyzing the acquired images, the features so identified (or lack thereof) may then be sent to the feature matching unit 2635, which compares the expected challenge features from the challenge feature determiner 2630 with the features from the challenge feature extractor 2620 to determine, at 2665, whether they match with each other. When there is a match, the feature matching unit 2635 generates, at 2670, an output signal indicating a pass and sends out, at 2680, the output signal. If there is no match, the feature matching unit 2630 determines there is no live person and generates, at 2675, an output signal indicating a security escalation alert and outputs the output signal at 2680.

Figure 27A:
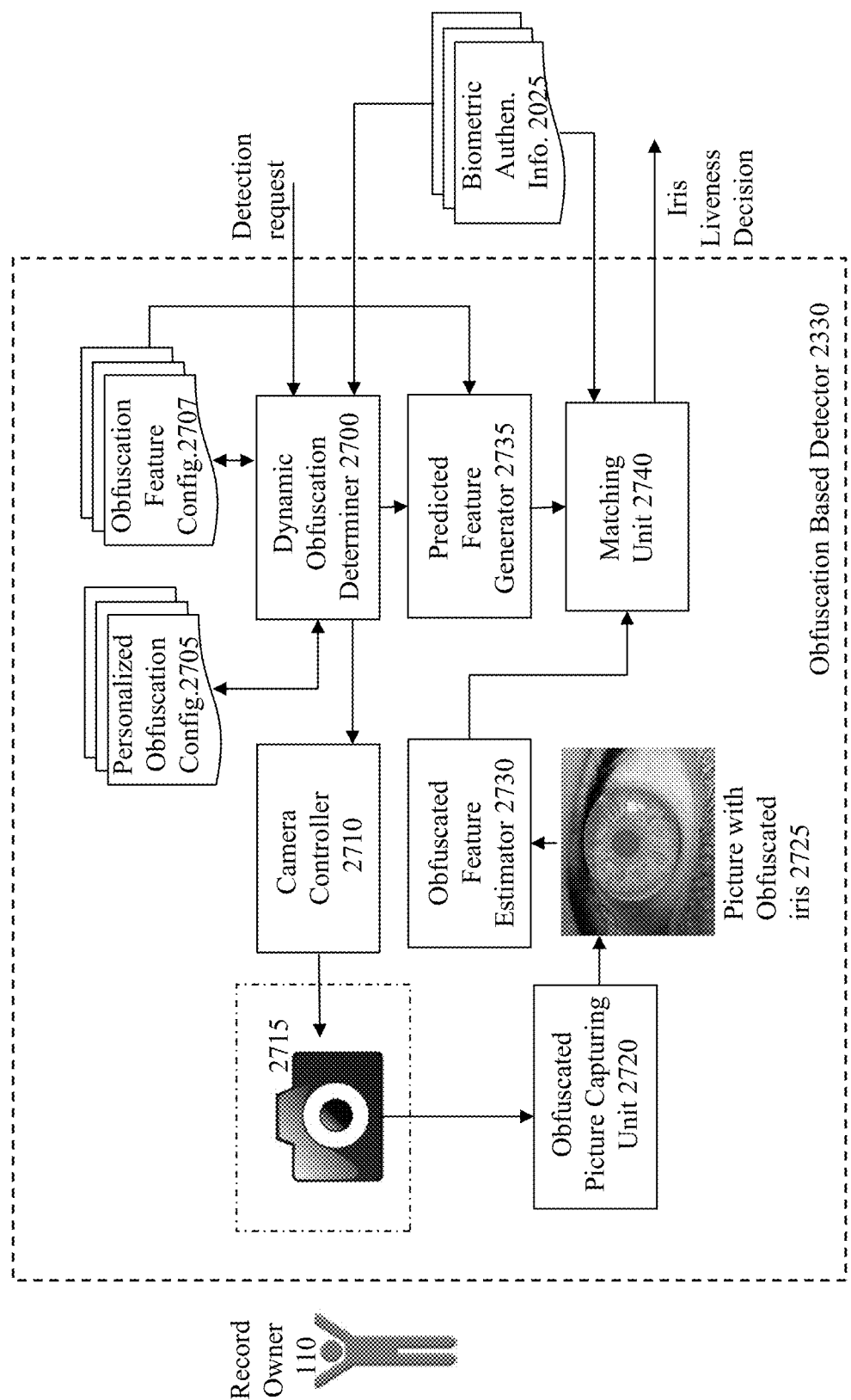
FIG. 27A depicts an exemplary high level system diagram of an obfuscation based liveness detector, according to an embodiment of the present teaching.

FIG. 27A depicts an exemplary high level system diagram of the obfuscation based detector 2330, according to an embodiment of the present teaching. As disclosed herein, to detect iris liveness based on an obfuscation scheme, the person being authenticated needs to proactively follow an agreed upon protocol, e.g., wearing contact lens of different colors according to the protocol. Such contact lens of different colors serve as a mask or filter of the iris and the liveness detection is to identify certain visual features of the iris caused by certain contact lens on certain days. In this illustrated embodiment, the obfuscation based detector 2330 comprises a dynamic obfuscation determiner 2700, a predicted feature generator 2735, a cameral controller 2710, an obfuscated picture capturing unit 2720, an obfuscated iris feature estimator 2730, and a feature matching unit 2740.

Figure 27B:
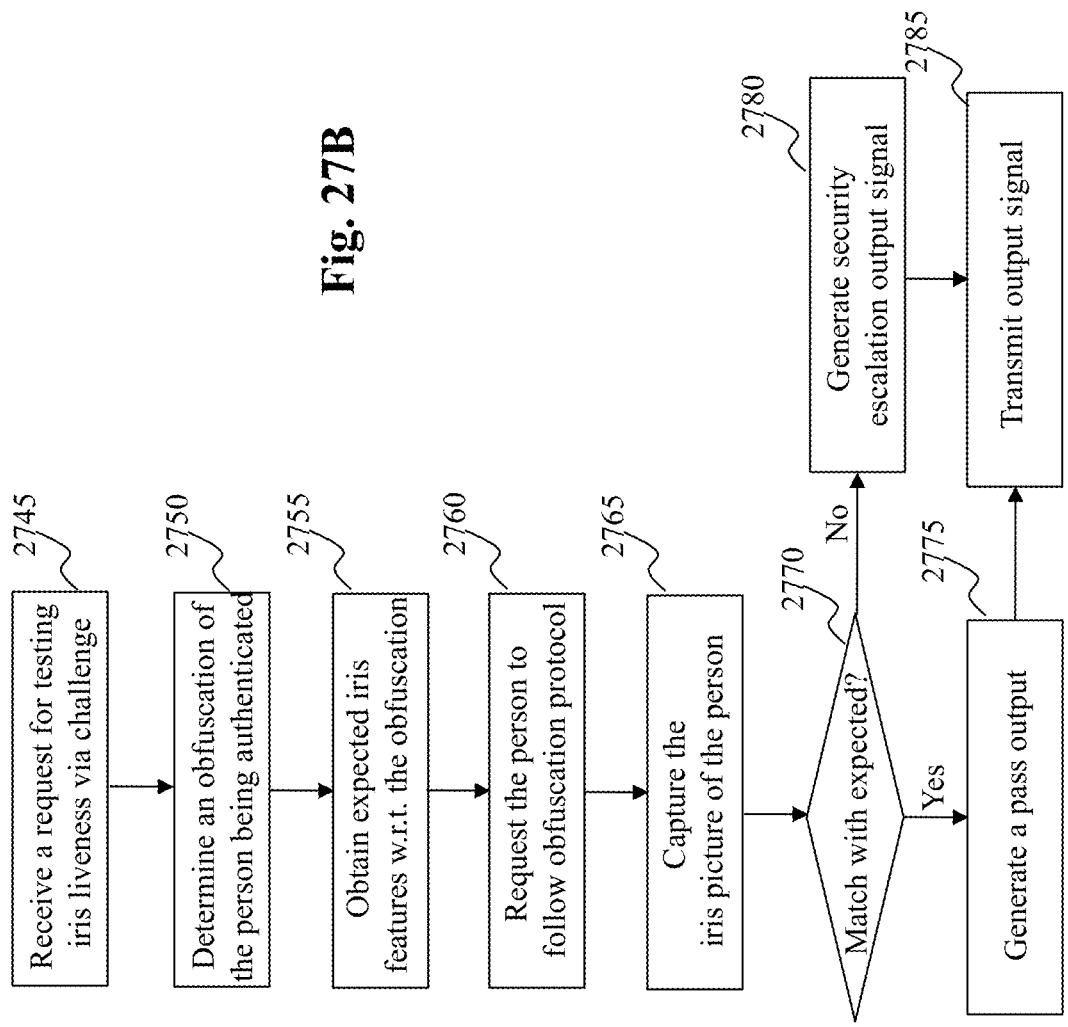
FIG. 27B is a flowchart of an exemplary process of an obfuscation based liveness detector, according to an embodiment of the present teaching.

FIG. 27B is a flowchart of an exemplary process of the obfuscation based detector 2330, according to an embodiment of the present teaching. In operation, when the dynamic obfuscation determiner 2700 receives, at 2745, a request for performing obfuscation based liveness detection, it generates, at 2750, a challenge based on previously set personalized obfuscation configuration 2705 or a preset protocol. To enable liveness detection, the predicted feature generator 2735 generates, at 2755, iris features expected to be observed from the person's iris if the person follows the agreed protocol. To start the detection, the person being authenticated is requested to follow the obfuscation protocol at 2760. The person may already wear the contact lens of a certain color following the protocol or the person may put on the contact lens of a certain color after being asked.

The camera controller 2710 may then be activated to control a camera 2715 to capture, at 2765, the picture of the iris of the person. When the picture is acquired by the obfuscated picture capturing unit 2720, it is sent to the obfuscated feature estimator 2730, which analyzes the image and identify features of the iris. The iris features estimated from the capture live picture are then compared with, by the feature matching unit 2740, the predicted or expected features from the predicted feature generator 2735. If the feature matching unit 2740 determines, at 2770, that the estimated obfuscated iris features match with the predicted iris features, it generates, at 2775, an output signal indicating a pass and sends out, at 2785, the output signal. If there is no match, it is considered no live person and the feature matching unit 2740 generates, at 2780, an output signal indicating a security escalation alert and outputs the output signal at 2785.

Figure 28:
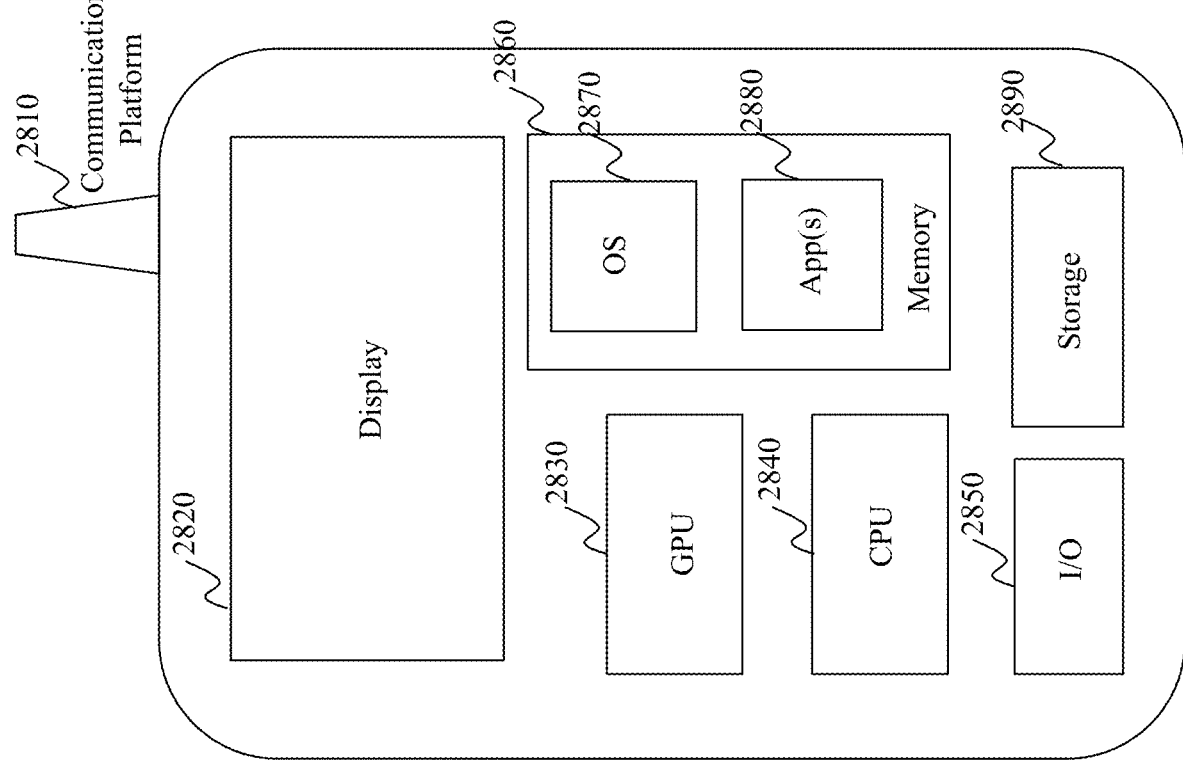
FIG. 28 depicts the architecture of a mobile device which can be used to implement a specialized system incorporating the present teaching.

FIG. 28 depicts the architecture of a mobile device which can be used to realize a specialized system, that at least partially implements the present teaching. In this example, the user device on which content may be exchanged and interacted with and signals may be transmitted bidirectionally is a mobile device 2800, which includes, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 2800 in this example includes one or more central processing units (CPUs) 2840, one or more graphic processing units (GPUs) 2830, a display 2820, a memory 2860, a communication platform 2810, such as a wireless communication module, storage 2890, and one or more input/output (I/O) devices 2850. Any other suitable component, including but not limited to a system bus or a controller (not shown), may also be included in the mobile device 2800. As shown in FIG. 28, a mobile operating system 2870, e.g., iOS, Android, Windows Phone, etc., and one or more applications 2880 may be loaded into the memory 2860 from the storage 2890 in order to be executed by the CPU 2840. The applications 2880 may include any suitable mobile apps for receiving and rendering information or display electronic signals of any sort on the mobile device 2800. Communications with the mobile device 2800 may be achieved via the I/O devices 2850.

To implement various modules, units, and some of their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the present teaching as disclosed herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 29:
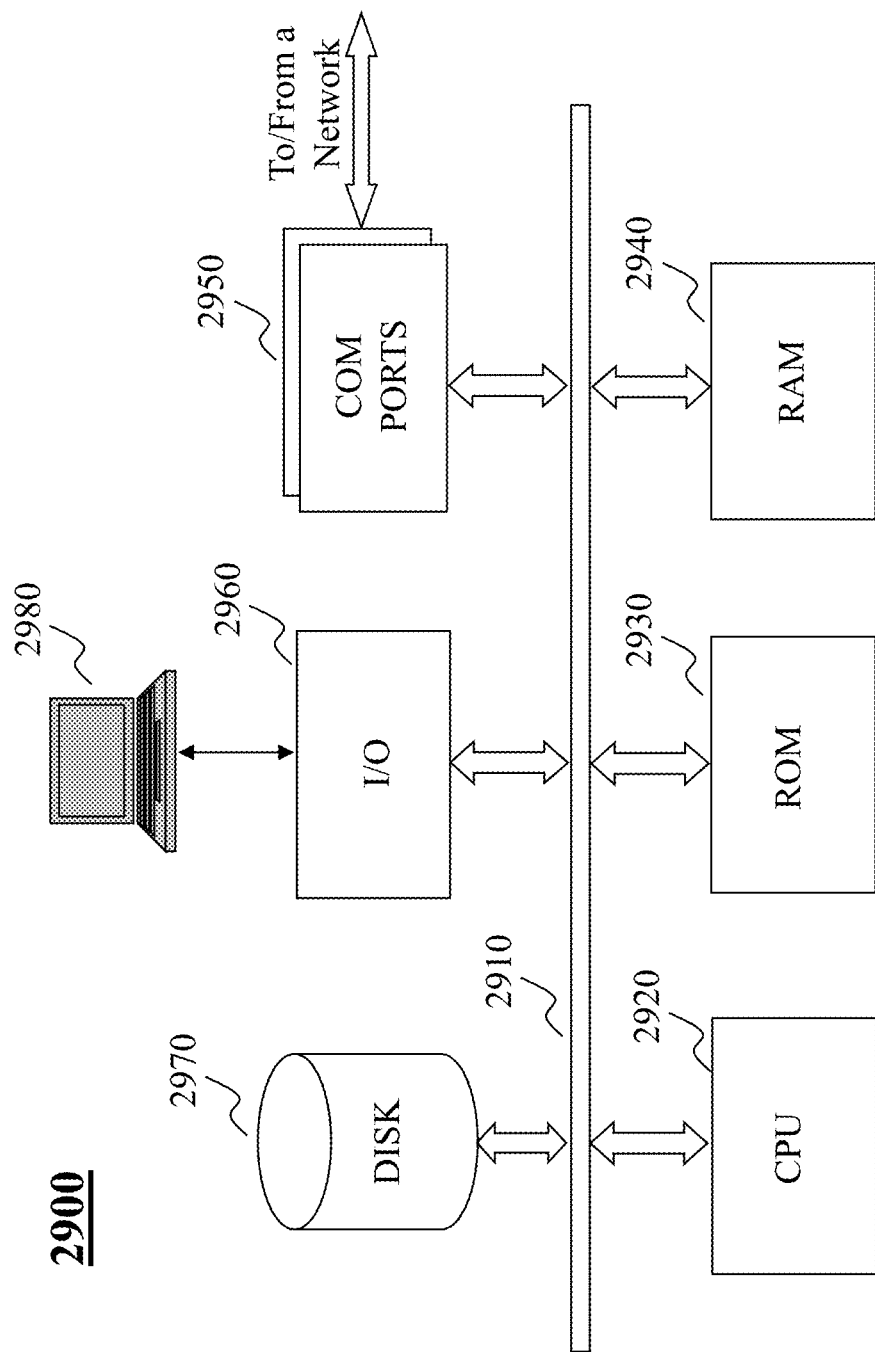
FIG. 29 depicts the architecture of a computer which can be used to implement a specialized system incorporating the present teaching.

FIG. 29 depicts the architecture of a computing device which can be used to realize a specialized system implementing, partially or fully, the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2900 may be used to implement any component of the present teaching, as described herein. For example, any parties in the self-sovereign data management framework 100 such as the service providers 120, the trusted entities 160, the transaction engine 150, and the secure transaction platform 170 may be implemented on a computer such as computer 2900, via its hardware, software program, firmware, or a combination thereof. Although only one such computer is shown, for convenience, the computer functions relating to the present teaching as described herein may be implemented in a distributed fashion on a number of similar platforms, to distribute the processing load.

The computer 2900, for example, includes COM ports 2950 connected to and from a network connected thereto to facilitate data communications. The computer 2900 also includes a central processing unit (CPU) 2920, in the form of one or more processors, for executing program instructions. The exemplary computer platform includes an internal communication bus 2910, program storage and data storage of different forms, e.g., disk 2970, read only memory (ROM) 2930, or random access memory (RAM) 2940, for various data files to be processed and/or communicated by the computer, as well as possibly program instructions to be executed by the CPU. The computer 2900 also includes an I/O component 2960, supporting input/output flows between the computer and other components therein such as user interface elements 2980. The computer 2900 may also receive programming and data via network communications.

Hence, aspects of the methods of information management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other systems into the hardware platform(s) of a computing environment or other system implementing a computing environment or similar functionalities in connection with query/ads matching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform for biometric authentication in secure data management, comprising:
prior to a person, claiming to a record owner, generating a request to validate one or more data items related to the record owner in order to proceed with a transaction between the record owner and a service provider, initiating authentication of the person claiming to be the record owner;
conducting biometric based authentication of the person by
detecting liveness of the person, and
authenticating an identity of the person based on biometric information of the person;
after the identity of the person is authenticated, receiving, by a trusted party and from the person the request to validate the one or more data items related to the record owner in order to proceed with the transaction; and
in response to the request, sending, by the trusted party, via the person, and to the service provider, a cloaked identifier obtained by the trusted party based on the request for validating the one or more data items, wherein
the cloaked identifier is to be used by the service provider to seek a validation response with regard to the one or more data items from the trusted party.

2. The method of claim 1, wherein the liveness of the person is detected based on at least one of non-biometric and biometric means.

3. The method of claim 2, wherein the biometric means for detecting the liveness of the person includes at least one of
an iris based liveness detection method;
a face based liveness detection method;
a fingerprint based liveness detection method;
a palm based liveness detection method;
a vein based liveness detection method; and
any combination thereof.

4. The method of claim 3, wherein the iris based liveness detection method includes detecting liveness based on a measurement of the person in response to at least one of light strobing, displayed moving focus dots, a challenge, and an obfuscation protocol.

5. The method of claim 3, wherein the face based liveness detection method includes detecting liveness based on a facial feature of the person in response to a challenge.

6. The method of claim 3, wherein the fingerprint based liveness detection method includes detecting a pattern of blood flow of a vein inside of a finger of the person.

7. The method of claim 3, wherein the palm based liveness detection method includes detecting a pattern of blood flow in a vein inside of a palm of the person.

8. Machine readable and non-transitory medium having information recorded thereon for biometric authentication in secure data management, wherein the information, when read by the machine, causes the machine to perform the following:
prior to a person, claiming to a record owner, generating a request to validate one or more data items related to the record owner in order to proceed with a transaction between the record owner and a service provider, initiating authentication of the persona claiming to be the record owner;

conducting biometric based authentication of the person by
  detecting liveness of the person, and
  authenticating an identity of the person based on biometric information of the person;

after the identity of the person is authenticated, receiving, by a trusted party and from the person the request to validate the one or more data items related to the record owner in order to proceed with the transaction; and in response to the request, sending, by the trusted party, via the person, and to the service provider, a cloaked identifier obtained by the trusted party based on the request for validating the one or more data items, wherein the cloaked identifier is to be used by the service provider to seek a validation response with regard to the one or more data items from the trusted party.

9. The medium of claim 8, wherein the liveness of the person is detected based on at least one of non-biometric and biometric means.

10. The medium of claim 9, wherein the biometric means for detecting the liveness of the person includes at least one of
  an iris based liveness detection method;
  a face based liveness detection method;
  a fingerprint based liveness detection method;
  a palm based liveness detection method;
  a vein based liveness detection method; and
  any combination thereof.

11. The medium of claim 8, wherein the iris based liveness detection method includes detecting liveness based on a measurement of the person in response to at least one of light strobing, displayed moving focus dots, a challenge, and an obfuscation protocol.

12. The medium of claim 11, wherein the face based liveness detection method includes detecting liveness based on a facial feature of the person in response to a challenge.

13. The medium of claim 10, wherein the fingerprint based liveness detection method includes detecting a pattern of blood flow of a vein inside of a finger of the person.

14. The medium of claim 10, wherein the palm based liveness detection method includes detecting a pattern of blood flow in a vein inside of a palm of the person.

15. A system for biometric authentication in secure data management, comprising:
  an authentication request processor configured for prior to a person, claiming to a record owner, generating a request to validate one or more data items related to the record owner in order to proceed with a transaction between the record owner and a service provider, initiating authentication of the person claiming to be the record owner;
  an authentication controller configured for conducting biometric based authentication of the person by
    detecting liveness of the person, and
    authenticating an identity of the person based on biometric information of the person; and
  a trusted party configured for
    after the identity of the person is authenticated, receiving, from the person, the request to validate the one or more data items related to the record owner in order to proceed with the transaction, and
    in response to the request, sending, via the person and to the service provider, a cloaked identifier obtained based on the request for validating the one or more data items, wherein
  the cloaked identifier is to be used by the service provider to seek a validation response with regard to the one or more data items from the trusted party.

16. The system of claim 15, wherein the liveness of the person is detected based on at least one of non-biometric and biometric means.

17. The system of claim 16, wherein the biometric means for detecting the liveness of the person includes at least one of
  an iris based liveness detection method;
  a face based liveness detection method;
  a fingerprint based liveness detection method;
  a palm based liveness detection method;
  a vein based liveness detection method; and
  any combination thereof.

18. The system of claim 17, wherein the iris based liveness detection method includes detecting liveness based on a measurement of the person in response to at least one of light strobing, displayed moving focus dots, a challenge, and an obfuscation protocol.

19. The system of claim 17, wherein the face based liveness detection method includes detecting liveness based on a facial feature of the person in response to a challenge.

20. The system of claim 17, wherein the fingerprint based liveness detection method includes detecting a pattern of blood flow of a vein inside of a finger of the person.

21. The system of claim 17, wherein the palm based liveness detection method includes detecting a pattern of blood flow in a vein inside of a palm of the person.

* * * * *